US012730657B2

(12) United States Patent
Li et al.

(10) Patent No.: US 12,730,657 B2
(45) Date of Patent: Sep. 8, 2026

(54) THEME WALLPAPER GENERATION METHOD AND ELECTRONIC DEVICE

(71) Applicant: HUAWEI TECHNOLOGIES CO., LTD., Shenzhen (CN)

(72) Inventors: Minhao Li, Shanghai (CN); Miao Wang, Shenzhen (CN); Changjian Chen, Nanjing (CN); Bo Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/576,360

(22) PCT Filed: Jun. 28, 2022

(86) PCT No.: PCT/CN2022/102006
§ 371 (c)(1),
(2) Date: Jan. 3, 2024

(87) PCT Pub. No.: WO2023/280021
PCT Pub. Date: Jan. 12, 2023

(65) Prior Publication Data

US 2025/0004799 A1 Jan. 2, 2025

(30) Foreign Application Priority Data

Jul. 9, 2021 (CN) ......................... 202110781615.2

(51) Int. Cl.
*G06F 3/04847* (2022.01)
*G06F 9/451* (2018.01)
*H04M 1/72427* (2021.01)

(52) U.S. Cl.
CPC .......... *G06F 9/451* (2018.02); *G06F 3/04847* (2013.01); *H04M 1/72427* (2021.01)

(58) Field of Classification Search
CPC . G06F 9/451; G06F 3/04847; H04M 1/72427
See application file for complete search history.

(56) References Cited

U.S. PATENT DOCUMENTS

2013/0038627 A1* 2/2013 Mujkic .................. G06F 9/451 345/619
2013/0305189 A1* 11/2013 Kim ................. H04M 1/72427 715/838

(Continued)

FOREIGN PATENT DOCUMENTS

CN 105930083 A 9/2016
CN 107317920 A 11/2017

(Continued)

*Primary Examiner* — Mahelet Shiberou

(57) ABSTRACT

In the method, an effect of dynamic linkage in a process of switching from an always on display screen to a lock screen interface and then to an unlock interface is presented to the user based on an image processing process customized by the user, such as detection and identification of the picture and image cropping of a target element in the picture, and different transition modes and transition animations that are set by the user and that are corresponding to the process of switching from the always on display screen to the lock screen interface and then to the unlock interface of the mobile phone, to provide smooth visual experience to the user.

19 Claims, 49 Drawing Sheets

(56) References Cited

U.S. PATENT DOCUMENTS

| | | | | |
|---|---|---|---|---|
| 2014/0132637 | A1 | 5/2014 | Yang et al. | |
| 2015/0113475 | A1* | 4/2015 | Xu | G06F 3/04883 715/798 |
| 2018/0246632 | A1* | 8/2018 | Tang | G06F 3/04817 |
| 2021/0105356 | A1* | 4/2021 | Yu | G06F 3/017 |
| 2021/0181923 | A1* | 6/2021 | Luo | G06F 3/04883 |
| 2021/0287593 | A1* | 9/2021 | Baek | G09G 3/007 |
| 2022/0174145 | A1* | 6/2022 | Wilson | G06F 3/0482 |
| 2023/0070880 | A1* | 3/2023 | Chen | G06F 1/1694 |
| 2024/0069936 | A1* | 2/2024 | Zhang | G06V 40/16 |
| 2024/0184597 | A1* | 6/2024 | Huang | G09G 5/373 |

FOREIGN PATENT DOCUMENTS

| | | | |
|---|---|---|---|
| CN | 107390993 | A | 11/2017 |
| CN | 110163949 | A | 8/2019 |
| CN | 111580904 | A | 8/2020 |
| CN | 111857511 | A | 10/2020 |

* cited by examiner

CONT. FROM FIG. 9(a)

CONT. FROM FIG. 9(b)

CONT. FROM FIG. 9(c)

Step 3: Perform zoom-in or zoom-out processing on a target element with a minimum bounding box based on a specific proportion, and display the target element in a target display area 10 on an always on display interface Step 4-1: Perform zoom-in or zoom-out processing on a target element with a minimum bounding box based on a specific proportion, and display the target element in a target display area 20 on a lock screen interface Step 4-2: Perform background filling on the lock screen interface

THEME WALLPAPER GENERATION METHOD AND ELECTRONIC DEVICE

CROSS-REFERENCE TO RELATED APPLICATIONS

This application is a national stage of International Application No. PCT/CN2022/102006, filed on Jun. 28, 2022, which claims priority to Chinese Patent Application No. 202110781615.2, filed on Jul. 9, 2021. Both of the aforementioned applications are hereby incorporated by reference in their entireties.

TECHNICAL FIELD

This application relates to the field of electronic technologies, and in particular, to a theme wallpaper generation method and an electronic device.

BACKGROUND

With intelligent development of electronic devices, users may have more expectations and requirements for theme wallpapers of the electronic device. A mobile phone is used as an example. A user may pursue a phone theme wallpaper, to meet personalized requirements of different users.

A phone theme wallpaper may be applied to an always on display screen, a lock screen interface, and an unlock interface of a mobile phone. In a possible implementation, a wallpaper of a lock screen interface and a wallpaper of an unlock interface of a mobile phone may be customized, to meet personalized requirements of different users for theme wallpapers of mobile phones. In this process, how to present a theme wallpaper with a better visual effect to a user based on a user-defined picture is a problem that needs to be urgently resolved currently.

SUMMARY

This application provides a theme wallpaper generation method and an electronic device, where a theme wallpaper of a mobile phone may be produced based on any picture, a plurality of pictures, or a video, to separately participate in a process of displaying an always on display screen, a wallpaper of a lock screen interface, and a wallpaper of an unlock interface, to present an effect of dynamic linkage in a process of switching from the always on display screen to the lock screen interface and then to the unlock interface to a user, thereby providing smooth visual experience to the user.

According to a first aspect, a theme wallpaper generation method is provided. The method is applied to an electronic device, and the method includes: obtaining a target picture for generating a theme wallpaper of the electronic device; determining a first display area of the target picture, and determining an unlock interface of the electronic device based on the first display area; detecting a target element in content of the first display area, and performing image cropping processing on the target element in the first display area to obtain the target element that undergoes image cropping; zooming out or zooming in, based on a first coefficient of proportionality, on the target element that undergoes image cropping as display content of an always on display screen of the electronic device, and determining the always on display screen; determining a second display area based on a position of the target element in the target picture, and determining a lock screen interface based on the second display area, where a wallpaper of the lock screen interface includes the target element that undergoes image cropping and that is zoomed out or zoomed in based on a second coefficient of proportionality; obtaining a first transition mode, a configuration parameter corresponding to the first transition mode, a second transition mode and a configuration parameter corresponding to the second transition mode that are in a process of switching from the lock screen interface to the unlock interface; displaying the always on display screen based on the display content of the always on display screen; receiving an unlock operation of a user, and in response to the unlock operation, performing, based on the configuration parameter corresponding to the first transition mode, switching from the always on display screen to the lock screen interface for display; and performing, based on the configuration parameter corresponding to the second transition mode, switching from the lock screen interface to the unlock interface for display, where a wallpaper of the unlock interface includes the content of the first display area.

It should be understood that the "target picture" may be any picture customized by the user. Optionally, the target picture may be from a local gallery of a mobile phone, or may be a picture requested from another electronic device, a server, or the like in another manner. A source of one or more pictures included in a picture list is not limited in this embodiment of this application.

It should be further understood that the "target picture" selected by the user is used as a picture on an always on display screen of the mobile phone, a wallpaper of a lock screen interface when the mobile phone is in a screen-on and screen-locked state, and a wallpaper of an unlock interface after the mobile phone is unlocked. In other words, in this embodiment of this application, a new theme wallpaper is generated for the mobile phone based on the "target picture" selected by the user.

It should be further understood that, in this embodiment of this application, "obtaining a target picture for generating a theme wallpaper of the electronic device" may also be referred to as "determining the target picture for generating the theme wallpaper of the electronic device". A trigger occasion of this step may be an operation of selecting a picture from a plurality of pictures as the target picture by the user and triggering the electronic device to generate the theme wallpaper based on the target picture. Optionally, the user may determine the target picture from the plurality of pictures through a theme wallpaper entry of a settings application, and trigger the electronic device to generate the theme wallpaper based on the target picture; or the user may find the target picture from a gallery, and then set the target picture to generate the theme wallpaper based on the target picture. An operation of triggering the electronic device to generate the theme wallpaper based on the target picture is not limited in this embodiment of this application.

It should be further understood that the "first display area" may be understood as an area for generating the wallpaper of the unlock interface of the electronic device, and the "second display area" may be understood as an area for generating the wallpaper of the lock screen interface of the electronic device. Optionally, the first display area and the second display area may be different areas or a same area. For example, the second display area may be a part of the first display area. This is not limited in this embodiment of this application.

According to the foregoing method, the user may set any picture as the theme wallpaper of the mobile phone based on a preference and a requirement of the user. In the method, an effect of dynamic linkage in a process of switching from an always on display screen to a lock screen interface and then to an unlock interface may be presented to the user based on an image processing process customized by the user, such as detection and identification of the picture and image cropping of a target element in the picture, and different transition modes and transition animations that are set by the user and that are corresponding to the process of switching from the always on display screen to the lock screen interface and then to the unlock interface of the mobile phone, to provide smooth visual experience to the user.

With reference to the first aspect, in some implementations of the first aspect, the obtaining a target picture for generating a theme wallpaper of the electronic device includes: displaying a first interface, where the first interface includes one or more pictures; and receiving a first operation of the user, and in response to the first operation, determining, from the one or more pictures, the target picture for generating the theme wallpaper of the electronic device.

With reference to the first aspect and the foregoing implementation, in some implementations of the first aspect, the one or more pictures are pictures stored in a local gallery of the electronic device, or the one or more pictures are picture frames from one or more video clips.

With reference to the first aspect and the foregoing implementations, in some implementations of the first aspect, the target picture is at least one of the one or more pictures.

With reference to the first aspect and the foregoing implementations, in some implementations of the first aspect, the detecting a target element in content of the first display area includes: receiving a slide operation of the user in the first display area, and determining a third display area based on a start point and an end point of a sliding track corresponding to the slide operation; and determining an element included in the third display area as the target element.

In a possible implementation, the user may manually select the display area of the target picture, that is, the "third display area". For example, the user may circle a display area by using a finger slide operation, and the electronic device may determine an element in the display area as the target element based on the display area circled by the user.

Optionally, the user may preset a shape of the display area, and the shape of the display area may be a regular pattern such as a rectangle, a circle, an ellipse, or a diamond.

Alternatively, the user may preset a shape of the display area as an irregular pattern following a finger sliding track of the user. Specifically, the user may slide on the target picture, and determine an irregular area as the display area based on the sliding track of the user. This is not limited in this embodiment of this application.

In another possible implementation, in an image cropping processing process, the electronic device in this embodiment of this application may process image pixels of the target element based on an AI deep learning algorithm, an edge detection algorithm, an image segmentation algorithm, a noise reduction processing algorithm, an image filtering algorithm, an image cropping algorithm, and the like, to obtain the target element that undergoes image cropping and that is with a clear edge and a clear contour. This process is not limited in this embodiment of this application.

According to the foregoing method, the user may manually circle the third display area, and the electronic device may determine an element in the third display area as the target element. A process of determining the target element more meets a display requirement of the user, to more accurately locate the target element that the user expects to display.

With reference to the first aspect and the foregoing implementations, in some implementations of the first aspect, the target element is fixed content set by the user; the target element is content that repeatedly appears most frequently in one or more pictures stored on the electronic device; the target element is content that is marked or added to favorites by the user most frequently in one or more pictures stored on the electronic device; and/or the target element is content with a highest display priority in a preset element set, where the preset element set includes one or more types of elements, and each type of element corresponds to a different display priority.

In a possible implementation, the electronic device may automatically detect content or an element included in the target picture (or the first display area), and automatically determine the target element for the user based on the identified content or element included in the target picture (or the first display area) and according to a preset rule.

Optionally, the target element may include one or more elements, for example, include one character or two characters. This is not limited in this embodiment of this application.

Optionally, the "fixed content" may include a fixed user, such as an owner user or a family member, set by the user, or include a preset type of element set by the user. For example, when detecting that the "target picture" includes facial information, the electronic device determines, based on the facial information, whether the user is an owner user. If the "target picture" includes the owner user, the owner user may be determined as the target element. The electronic device may determine, as the owner user, a user corresponding to the facial information that is entered by the user and that is for unlocking and identity verification. Alternatively, for example, the user sets the "target element" as a character. When the mobile phone detects that the target picture includes a plurality of types such as a character, an animal, and a plant, the mobile phone may determine the character as the "target element".

Optionally, the "target element" may be content that repeatedly appears most frequently in one or more pictures stored on the mobile phone. For example, the mobile phone detects that a pet of the user repeatedly appears most frequently in N pictures stored in a local gallery. If it is detected that the target picture includes the pet of the user, the pet of the user is determined as the "target element". Alternatively, the mobile phone obtains facial features that appear in a plurality of albums such as a family album and a friend album in the local gallery, and sorts the facial features in descending order of occurrence times of each facial feature. When detecting that the target picture includes a plurality of characters, the mobile phone may query a quantity of occurrence times of the plurality of characters in the local gallery, and determine a character that appears most frequently as the target element.

Optionally, the "target element" may be content that is marked or added to favorites by the user most frequently in one or more pictures stored on the mobile phone. For example, the mobile phone detects that, in N pictures stored in a local gallery, a pet of the user is included in all of a plurality of pictures marked or added to favorites by the user. If it is detected that the target picture includes the pet of the user, the pet of the user is determined as the "target element".

Optionally, the "target element" may be content with a highest display priority in a preset element set, where the preset element set includes one or more types of elements, and each type of element corresponds to a different display priority. For example, the user sets priorities of a character, an animal, a building, a plant, and the like in descending order. If priorities corresponding to a plurality of elements included in the target picture are detected, an element with a highest priority is determined as the "target element".

It should be understood that the plurality of preset rules listed above may also correspond to different priority orders. For example, the electronic device may preferentially determine the target element according to one of the rules. When the rule does not meet a current scenario, the electronic device may determine the target element according to another rule. This is not limited in this embodiment of this application.

According to the foregoing method, in a process of generating the mobile phone theme based on the target picture selected by the user, a plurality of possible methods may be used. For example, the mobile phone may automatically detect and identify the target element in the target picture, or determine the target element in the target picture based on an operation of the user. The target element may be used as a display element on the always on display screen, or may be used as a prominent display element on the lock screen interface. A display process of the target element may better meet a display requirement of the user, thereby improving user experience.

With reference to the first aspect and the foregoing implementations, in some implementations of the first aspect, the zooming out or zooming in, based on a first coefficient of proportionality, on the target element that undergoes image cropping as display content of an always on display screen of the electronic device, and determining the always on display screen includes: determining a height and a width of the target element that undergoes image cropping; obtaining a first preset area on the always on display screen and a height and a width of the first preset area; determining the first coefficient of proportionality based on a ratio of the height of the target element to the height of the first preset area when the height of the target element that undergoes image cropping is greater than the width of the target element that undergoes image cropping; or determining the first coefficient of proportionality based on a ratio of the width of the target element to the width of the first preset area when the height of the target element that undergoes image cropping is less than or equal to the width of the target element that undergoes image cropping; and zooming out or zooming in, based on the first coefficient of proportionality, on the target element that undergoes image cropping, and displaying the target element in the first preset area on the always on display screen.

With reference to the first aspect and the foregoing implementations, in some implementations of the first aspect, the determining a second display area based on a position of the target element in the target picture, and determining a lock screen interface based on the second display area includes: determining the height and the width of the target element that undergoes image cropping and position information of the target element in the target picture; determining, as the second display area based on the position information of the target element in the target picture and by using the target element as a center, an area that is in the target picture and that is at a distance within a preset range from the target element; obtaining a second preset area on the lock screen interface, and a height and a width of the second preset area; determining the second coefficient of proportionality based on a ratio of the height of the target element to the height of the second preset area when the height of the target element that undergoes image cropping is greater than the width of the target element that undergoes image cropping; or determining the second coefficient of proportionality based on a ratio of the width of the target element to the width of the second preset area when the height of the target element that undergoes image cropping is less than or equal to the width of the target element that undergoes image cropping; and determining the lock screen interface based on content of the second display area and the target element that is zoomed out or zoomed in based on the second coefficient of proportionality.

In a possible implementation, a display height n and a display width m of the target element "little girl" are obtained by cropping the original target picture, where m and n may have the following relationships: $n>m$, $n<m$, and $n=m$. In this embodiment of this application, a rule for determining a zoom ratio of the target element may be referred to as a "long-side matching rule", and the "long-side matching rule" may be understood as follows: The electronic device determines the zoom ratio (that is, the first coefficient of proportionality and the second coefficient of proportionality) of the target element depending on a larger value of n and m, and then displays a target element "little girl" obtained through zoom processing in a target display area on the lock screen interface and a target display area on the unlock interface.

In the foregoing process, a user-defined picture (that is, the "target picture") is used as an example to describe a process of separately generating the always on display screen, the lock screen interface, and the unlock interface of the mobile phone based on the picture. In a possible implementation, the user may select a plurality of pictures, and generate the always on display screen, the lock screen interface, and the unlock interface of the mobile phone based on the plurality of pictures.

Optionally, the plurality of pictures may be from a local gallery of the mobile phone, or from a plurality of frames of pictures of a video clip. Sources of the plurality of pictures are not limited in this embodiment of this application.

With reference to the first aspect and the foregoing implementations, in some implementations of the first aspect, the determining a first display area of the target picture includes: determining a fixed area of the target picture as the first display area; or receiving a second operation of the user, and determining the first display area of the target picture in response to the second operation.

With reference to the first aspect and the foregoing implementations, in some implementations of the first aspect, the first transition mode and the second transition mode are preset manners, or are manually set by the user.

With reference to the first aspect and the foregoing implementations, in some implementations of the first aspect, the configuration parameter corresponding to the first transition mode includes one or more of the following parameters: a parameter corresponding to a display area of the target picture, and size parameters, coordinate parameters, and position parameters of the target element at different moments in a process of switching from the always on display screen to the lock screen interface; and the configuration parameter corresponding to the second transition mode includes one or more of the following parameters: a parameter corresponding to the display area of the target picture, and size parameters, coordinate parameters, and position parameters of the target element at different moments in a process of switching from the lock screen interface to the unlock interface.

In conclusion, according to the method described above, the user may set any photo, a plurality of photos, or a video as the theme wallpaper of the mobile phone based on a preference and a requirement of the user, to separately implement, based on the photo or the video, a process of displaying the always on display screen, the wallpaper of the lock screen interface, and the wallpaper of the unlock interface, that is, generate the always on display screen, the lock screen interface, and the unlock interface of the mobile phone based on the photo or the video. In addition, different animation effects are added to a process of switching from the always on display screen to the lock screen interface and then to the unlock interface, to generate a theme wallpaper with a dynamic change effect for the user, present a smooth playback effect to the user, and provide the user with unlimited theme selections. In this way, the user not only can rely on a theme preset by a system to share the target element in the process of switching from the always on display screen to the lock screen interface and then to the unlock interface, but also can implement a dynamic linkage effect of continuous playback, thereby meeting different use requirements of the user, and improving user experience.

According to a second aspect, a theme wallpaper generation method is provided. The method is applied to an electronic device, and the method includes: displaying a first interface, where the first interface includes one or more pictures; receiving a first operation of a user, and in response to the first operation, determining, from the one or more pictures, a target picture for generating a theme wallpaper of the electronic device; determining a first display area of the target picture, and displaying a preview window of a wallpaper of an unlock interface of the electronic device based on the first display area; receiving a second operation of the user, determining a target element in content of the first display area in response to the second operation, and performing image cropping processing on the target element in the first display area to obtain the target element that undergoes image cropping; receiving a third operation of the user, and displaying a preview window of an always on display screen of the electronic device in response to the third operation, where the preview window of the always on display screen includes the target element that undergoes image cropping and that is zoomed out or zoomed in based on a first coefficient of proportionality; receiving a fourth operation of the user, and in response to the fourth operation, obtaining a first transition mode and a configuration parameter corresponding to the first transition mode that are in a process of switching from the always on display screen to a lock screen interface for display; receiving a fifth operation of the user, and in response to the fifth operation, displaying a preview window of a wallpaper of the lock screen interface of the electronic device, where the wallpaper of the lock screen interface includes content in a second display area of the target picture and the target element that undergoes image cropping and that is zoomed out or zoomed in based on a second coefficient of proportionality; receiving a sixth operation of the user, and in response to the sixth operation, obtaining a second transition mode and a configuration parameter corresponding to the second transition mode that are in a process of switching from the lock screen interface to the unlock interface for display; displaying the always on display screen; receiving an unlock operation of the user, and in response to the unlock operation, performing, based on the configuration parameter corresponding to the first transition mode, switching from the always on display screen to the lock screen interface for display; and performing, based on the configuration parameter corresponding to the second transition mode, switching from the lock screen interface to the unlock interface for display, where the wallpaper of the unlock interface includes the content of the first display area.

With reference to the second aspect, in some implementations of the second aspect, the determining a target element in content of the first display area includes: receiving a slide operation of the user in the first display area, and determining a third display area based on a start point and an end point of a sliding track corresponding to the slide operation; and determining an element included in the third display area as the target element.

With reference to the second aspect and the foregoing implementations, in some implementations of the second aspect, the target element is fixed content set by the user; the target element is content that repeatedly appears most frequently in one or more pictures stored on the electronic device; the target element is content that is marked or added to favorites by the user most frequently in one or more pictures stored on the electronic device; and/or the target element is content with a highest display priority in a preset element set, where the preset element set includes one or more types of elements, and each type of element corresponds to a different display priority.

With reference to the second aspect and the foregoing implementations, in some implementations of the second aspect, the displaying the always on display screen includes: determining a height and a width of the target element that undergoes image cropping; obtaining a first preset area on the always on display screen and a height and a width of the first preset area; determining the first coefficient of proportionality based on a ratio of the height of the target element to the height of the first preset area when the height of the target element that undergoes image cropping is greater than the width of the target element that undergoes image cropping; or determining the first coefficient of proportionality based on a ratio of the width of the target element to the width of the first preset area when the height of the target element that undergoes image cropping is less than or equal to the width of the target element that undergoes image cropping; and zooming out or zooming in, based on the first coefficient of proportionality, on the target element that undergoes image cropping, and displaying the target element in the first preset area on the always on display screen.

With reference to the second aspect and the foregoing implementations, in some implementations of the second aspect, the performing switching from the always on display screen to the lock screen interface for display includes: determining the height and the width of the target element that undergoes image cropping and position information of the target element in the target picture; determining, as the second display area based on the position information of the target element in the target picture and by using the target element as a center, an area that is in the target picture and that is at a distance within a preset range from the target element; obtaining a second preset area on the lock screen interface, and a height and a width of the second preset area; determining the second coefficient of proportionality based on a ratio of the height of the target element to the height of the second preset area when the height of the target element that undergoes image cropping is greater than the width of the target element that undergoes image cropping; or determining the second coefficient of proportionality based on a ratio of the width of the target element to the width of the second preset area when the height of the target element that undergoes image cropping is less than or equal to the width of the target element that undergoes image cropping; and determining the lock screen interface based on content of the second display area and the target element that is zoomed out or zoomed in based on the second coefficient of proportionality.

With reference to the second aspect and the foregoing implementations, in some implementations of the second aspect, the determining a first display area of the target picture includes: determining a fixed area of the target picture as the first display area; or receiving a second operation of the user, and determining the first display area of the target picture in response to the second operation.

With reference to the second aspect and the foregoing implementations, in some implementations of the second aspect, the first transition mode and the second transition mode are preset manners, or are manually set by the user.

With reference to the second aspect and the foregoing implementations, in some implementations of the second aspect, the configuration parameter corresponding to the first transition mode includes one or more of the following parameters: a parameter corresponding to a display area of the target picture, and size parameters, coordinate parameters, and position parameters of the target element at different moments in a process of switching from the always on display screen to the lock screen interface; and the configuration parameter corresponding to the second transition mode includes one or more of the following parameters: a parameter corresponding to the display area of the target picture, and size parameters, coordinate parameters, and position parameters of the target element at different moments in a process of switching from the lock screen interface to the unlock interface.

According to a third aspect, an electronic device is provided, and includes: a display, one or more processors, one or more memories, and a module installed with a plurality of application programs. The memory stores one or more programs; and when the one or more programs are executed by the processor, the electronic device is enabled to perform the following steps: obtaining a target picture for generating a theme wallpaper of the electronic device; determining a first display area of the target picture, and determining an unlock interface of the electronic device based on the first display area; detecting a target element in content of the first display area, and performing image cropping processing on the target element in the first display area to obtain the target element that undergoes image cropping; zooming out or zooming in, based on a first coefficient of proportionality, on the target element that undergoes image cropping as display content of an always on display screen of the electronic device, and determining the always on display screen; determining a second display area based on a position of the target element in the target picture, and determining a lock screen interface based on the second display area, where a wallpaper of the lock screen interface includes the target element that undergoes image cropping and that is zoomed out or zoomed in based on a second coefficient of proportionality; obtaining a first transition mode, a configuration parameter corresponding to the first transition mode, a second transition mode and a configuration parameter corresponding to the second transition mode that are in a process of switching from the lock screen interface to the unlock interface; displaying the always on display screen based on the display content of the always on display screen; receiving an unlock operation of the user, and in response to the unlock operation, performing, based on the configuration parameter corresponding to the first transition mode, switching from the always on display screen to the lock screen interface for display; and performing, based on the configuration parameter corresponding to the second transition mode, switching from the lock screen interface to the unlock interface for display, where the wallpaper of the unlock interface includes the content of the first display area.

With reference to the third aspect, in some implementations of the third aspect, when the one or more programs are executed by the processor, the electronic device is enabled to perform the following steps: receiving a slide operation of the user in the first display area, and determining a third display area based on a start point and an end point of a sliding track corresponding to the slide operation; and determining an element included in the third display area as the target element.

With reference to the third aspect and the foregoing implementations, in some implementations of the third aspect, the target element is fixed content set by the user; the target element is content that repeatedly appears most frequently in one or more pictures stored on the electronic device; the target element is content that is marked or added to favorites by the user most frequently in one or more pictures stored on the electronic device; and/or the target element is content with a highest display priority in a preset element set, where the preset element set includes one or more types of elements, and each type of element corresponds to a different display priority.

With reference to the third aspect and the foregoing implementations, in some implementations of the third aspect, when the one or more programs are executed by the processor, the electronic device is enabled to perform the following steps: determining a height and a width of the target element that undergoes image cropping; obtaining a first preset area on the always on display screen and a height and a width of the first preset area; determining the first coefficient of proportionality based on a ratio of the height of the target element to the height of the first preset area when the height of the target element that undergoes image cropping is greater than the width of the target element that undergoes image cropping; or determining the first coefficient of proportionality based on a ratio of the width of the target element to the width of the first preset area when the height of the target element that undergoes image cropping is less than or equal to the width of the target element that undergoes image cropping; and zooming out or zooming in, based on the first coefficient of proportionality, on the target element that undergoes image cropping, and displaying the target element in the first preset area on the always on display screen.

With reference to the third aspect and the foregoing implementations, in some implementations of the third aspect, when the one or more programs are executed by the processor, the electronic device is enabled to perform the following steps: determining the height and the width of the target element that undergoes image cropping and position information of the target element in the target picture; determining, as the second display area based on the position information of the target element in the target picture and by using the target element as a center, an area that is in the target picture and that is at a distance within a preset range from the target element; obtaining a second preset area on the lock screen interface, and a height and a width of the second preset area; determining the second coefficient of proportionality based on a ratio of the height of the target element to the height of the second preset area when the height of the target element that undergoes image cropping is greater than the width of the target element that undergoes image cropping; or determining the second coefficient of proportionality based on a ratio of the width of the target element to the width of the second preset area when the height of the target element that undergoes image cropping is less than or equal to the width of the target element that undergoes image cropping; and determining the lock screen interface based on content of the second display area and the target element that is zoomed out or zoomed in based on the second coefficient of proportionality.

With reference to the third aspect and the foregoing implementations, in some implementations of the third aspect, when the one or more programs are executed by the processor, the electronic device is enabled to perform the following steps: displaying a first interface, where the first interface includes one or more pictures; receiving a first operation of the user, and in response to the first operation, determining, from the one or more pictures, the target picture for generating the theme wallpaper of the electronic device.

With reference to the third aspect and the foregoing implementations, in some implementations of the third aspect, when the one or more programs are executed by the processor, the electronic device is enabled to perform the following steps: determining a fixed area of the target picture as the first display area; or receiving a second operation of the user, and determining the first display area of the target picture in response to the second operation.

With reference to the third aspect and the foregoing implementations, in some implementations of the third aspect, the first transition mode and the second transition mode are preset manners, or are manually set by the user.

With reference to the third aspect and the foregoing implementations, in some implementations of the third aspect, the configuration parameter corresponding to the first transition mode includes one or more of the following parameters: a parameter corresponding to a display area of the target picture, and size parameters, coordinate parameters, and position parameters of the target element at different moments in a process of switching from the always on display screen to the lock screen interface; and the configuration parameter corresponding to the second transition mode includes one or more of the following parameters: a parameter corresponding to the display area of the target picture, and size parameters, coordinate parameters, and position parameters of the target element at different moments in a process of switching from the lock screen interface to the unlock interface.

According to a fourth aspect, a graphical user interface system on an electronic device is provided. The electronic device includes a display, one or more memories, and one or more processors. The one or more processors are configured to execute one or more computer programs stored in the one or more memories. The graphical user interface system includes a graphical user interface displayed when the electronic device performs the method according to any one of the first aspect and the implementations of the first aspect, and the method according to any one of the second aspect and the implementations of the second aspect.

According to a fifth aspect, an apparatus is provided. The apparatus is included in an electronic device, and the apparatus has a function of implementing behavior of the electronic device in the method according to any one of the first aspect and the implementations of the first aspect and in the method according to any one of the second aspect and the implementations of the second aspect. This function may be implemented by using hardware, or may be implemented by executing corresponding software by hardware. The hardware or the software includes one or more modules or units corresponding to the foregoing function, for example, a display module or unit, a detection module or unit, or a processing module or unit.

According to a sixth aspect, a computer-readable storage medium is provided. The computer-readable storage medium stores computer instructions. When the computer instructions are run on an electronic device, the electronic device is enabled to perform the method according to any one of the first aspect and the implementations of the first aspect and the method according to any one of the second aspect and the implementations of the second aspect.

According to a seventh aspect, a computer program product is provided. When the computer program product runs on an electronic device, the electronic device is enabled to perform the method according to any one of the first aspect or the possible implementations of the first aspect, and the method according to any one of the second aspect and the possible implementations of the second aspect.

DESCRIPTION OF EMBODIMENTS

Figure 1A:
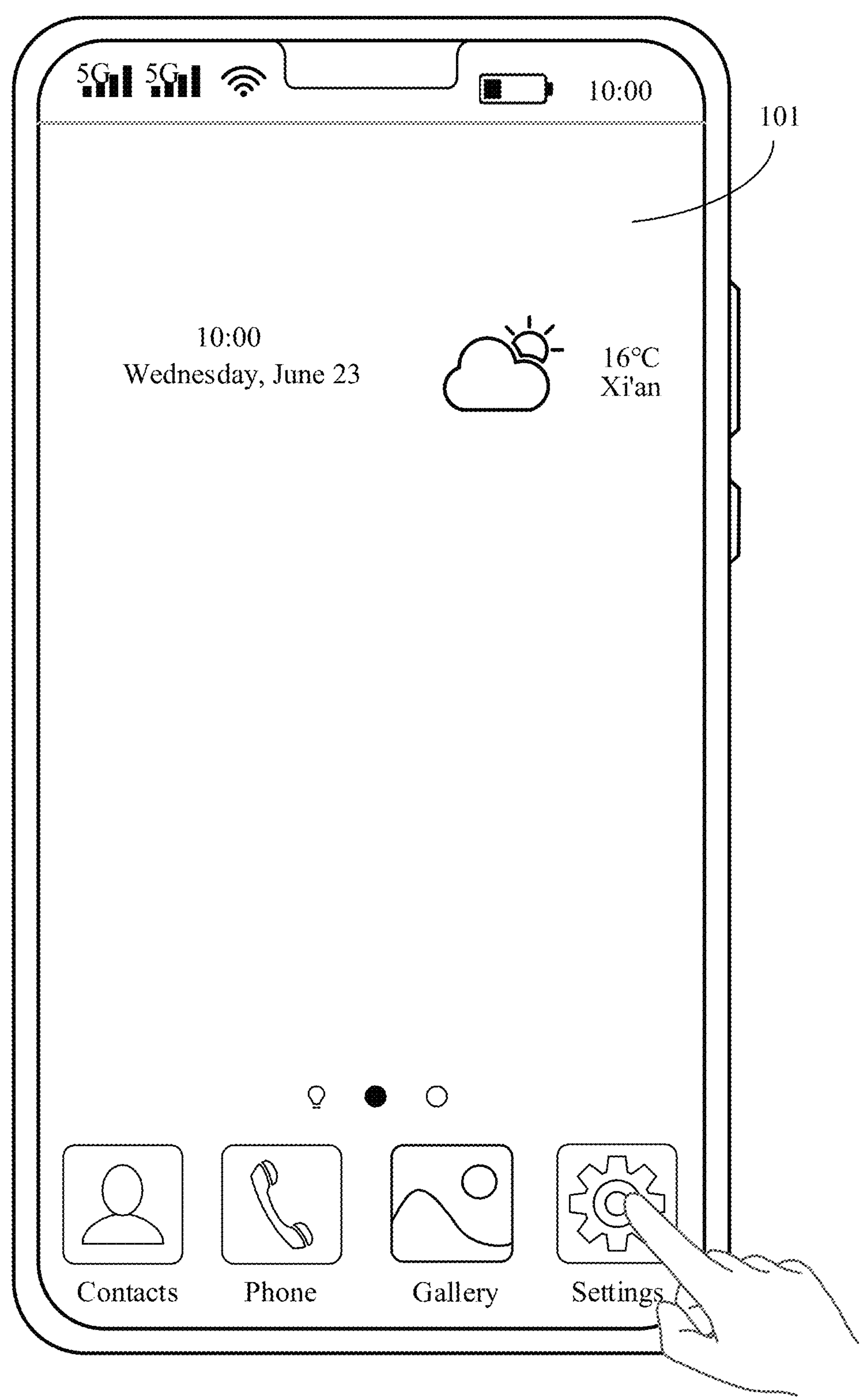
FIGS. 1(*a*) to 1(*i*) are schematic diagrams of example of a user interface on which a user sets an always on display screen of a mobile phone by using a settings application.
Figure 1B:
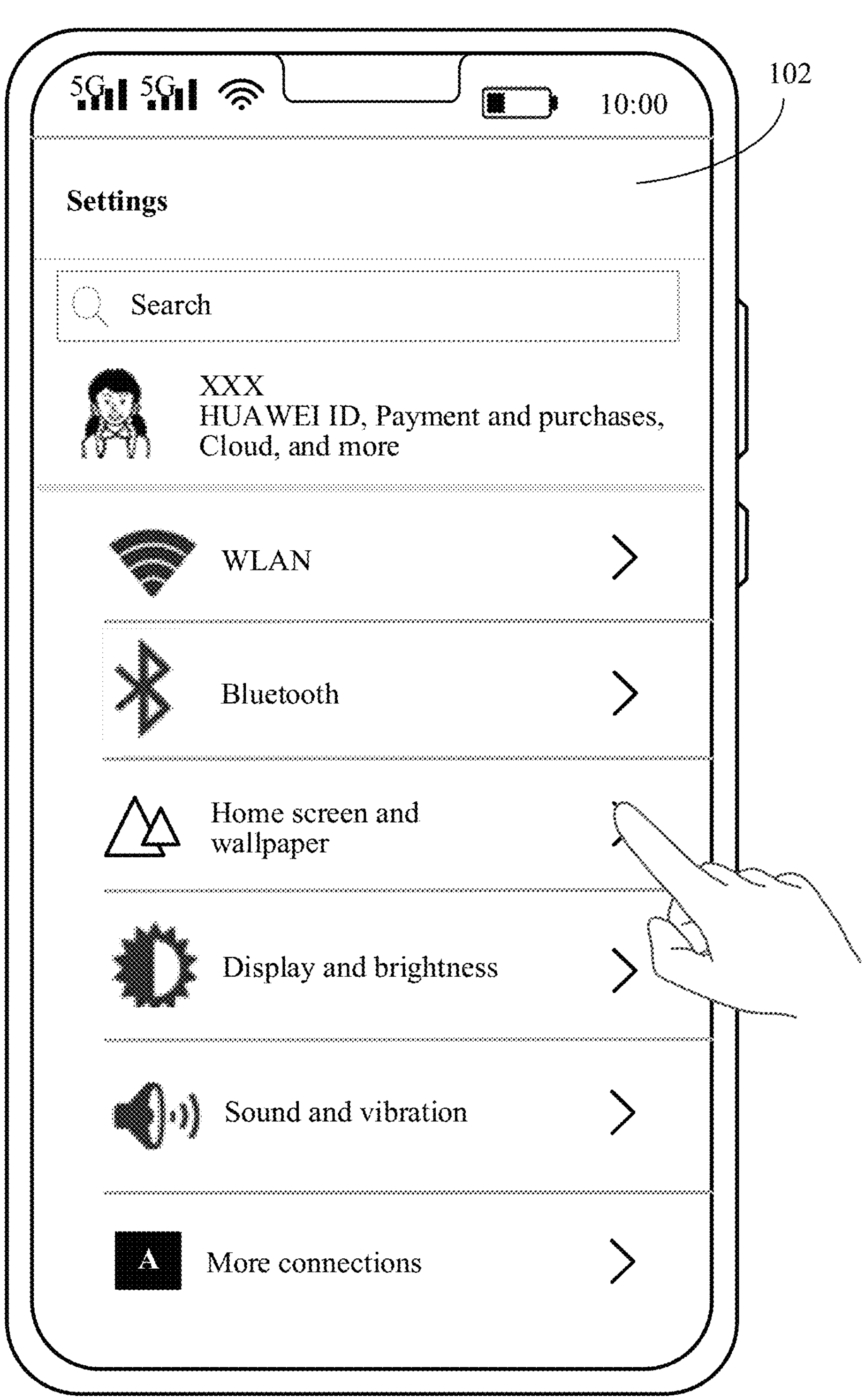
Figure 1C:
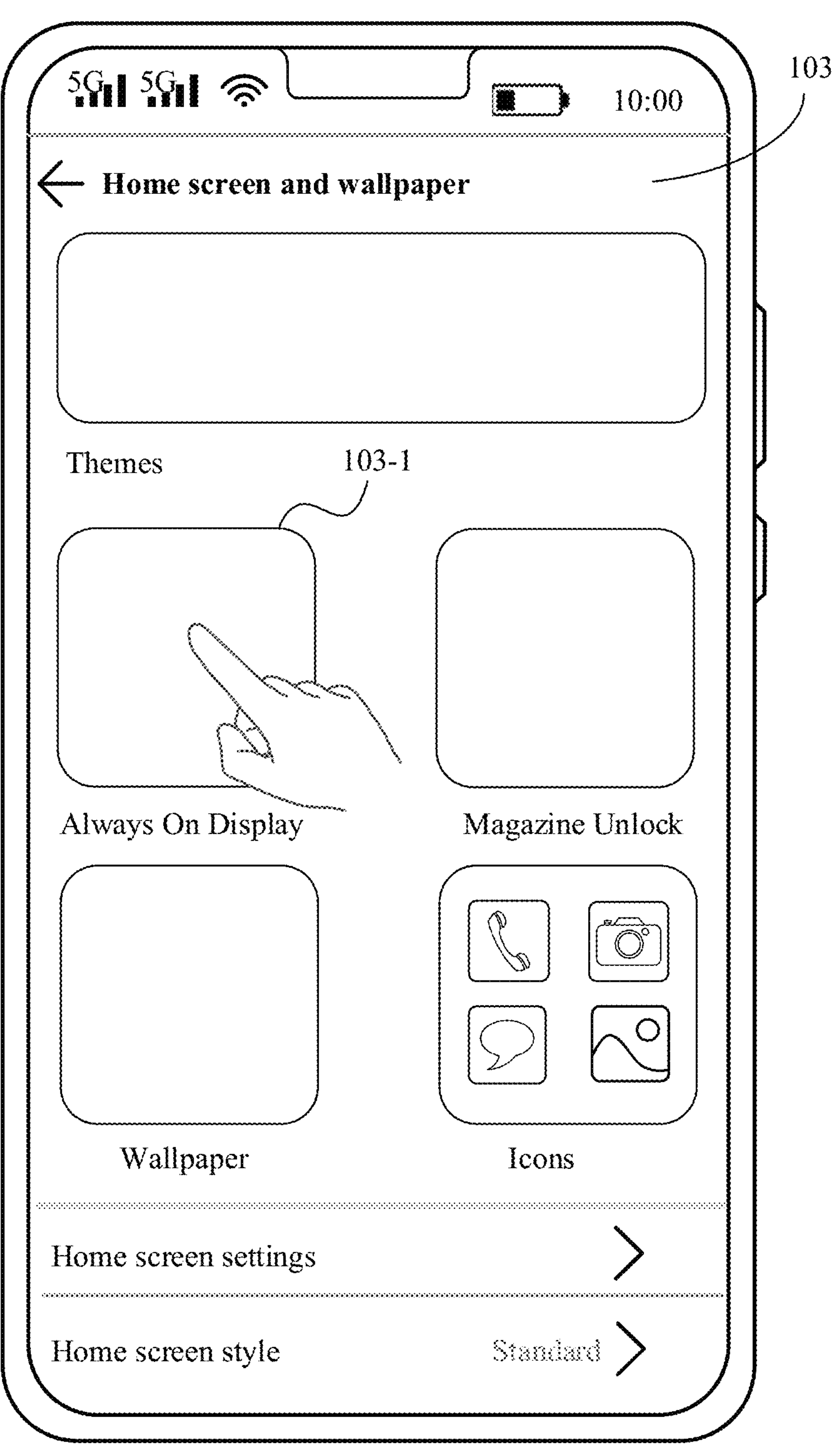
Figure 1D:
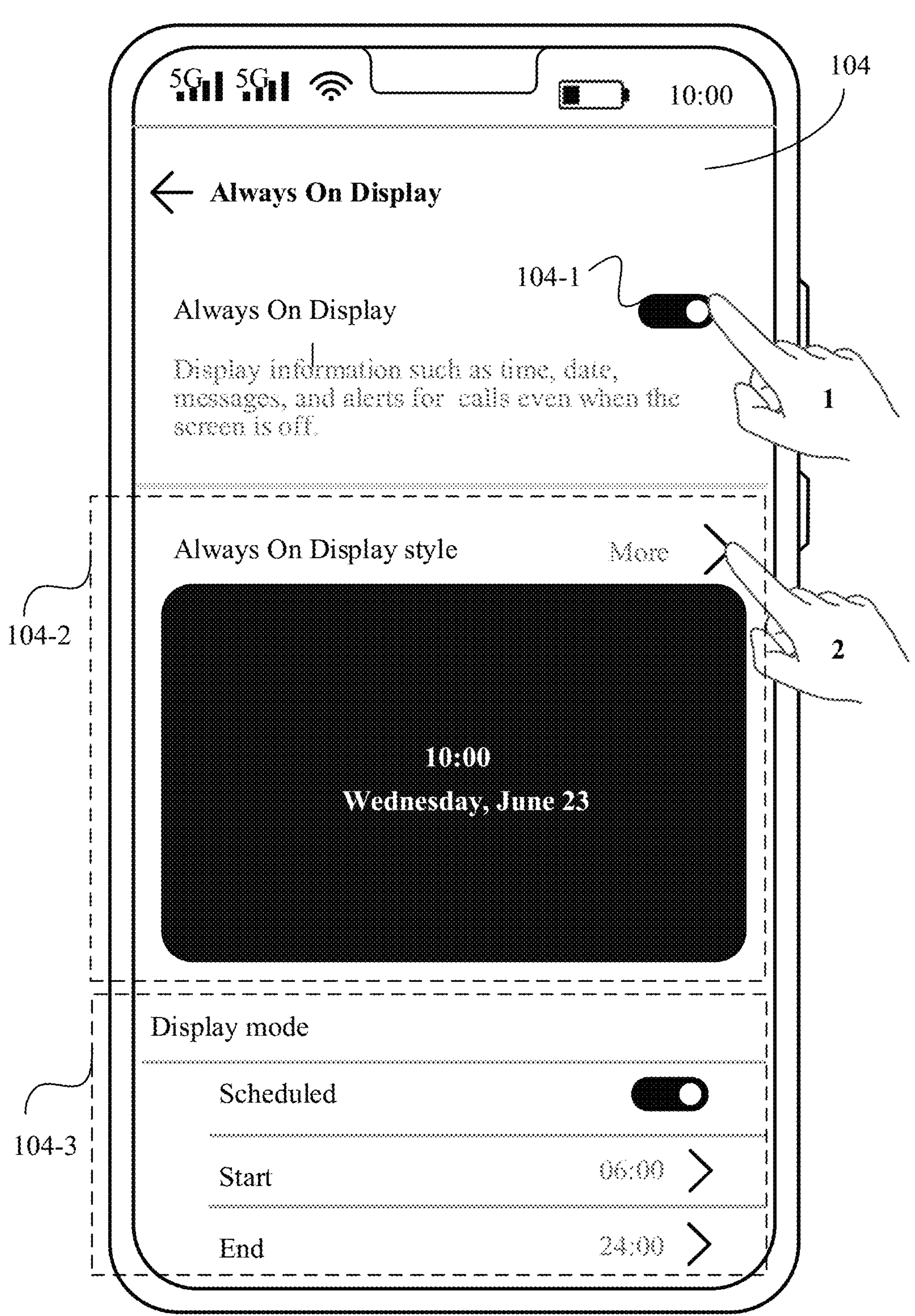
Figure 1E:
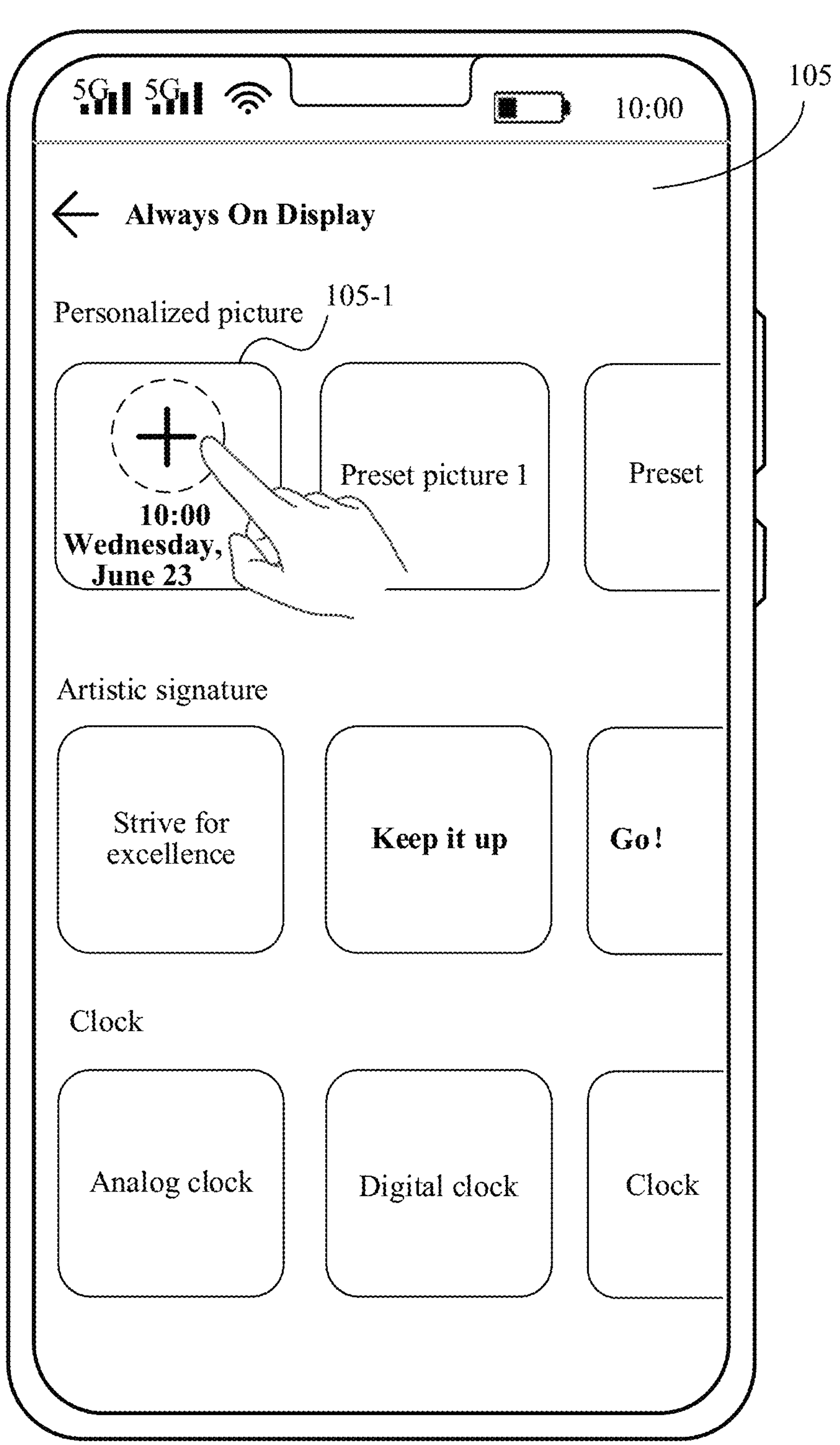
Figure 1F:
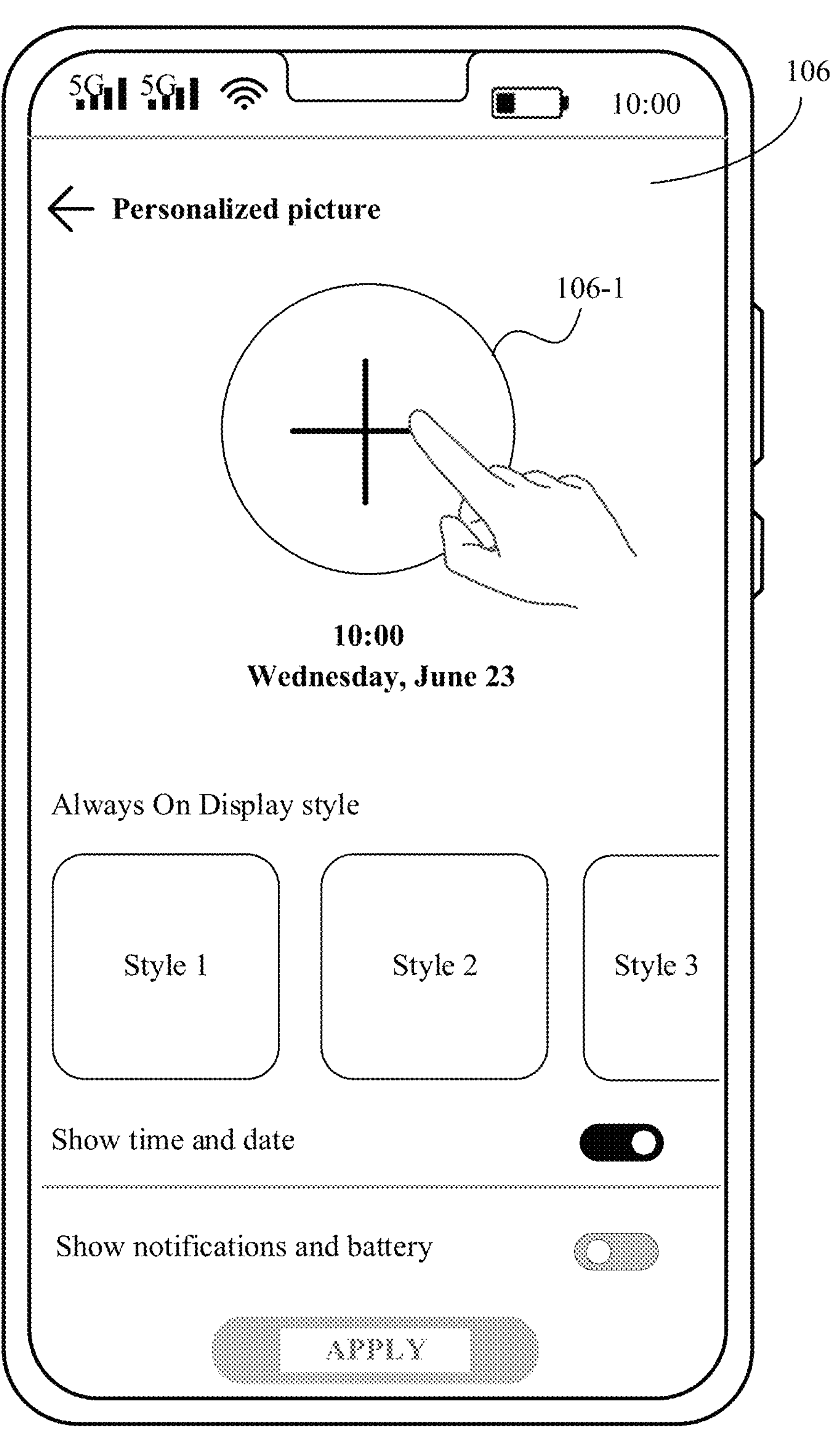
Figure 1G:
Figure 1H:
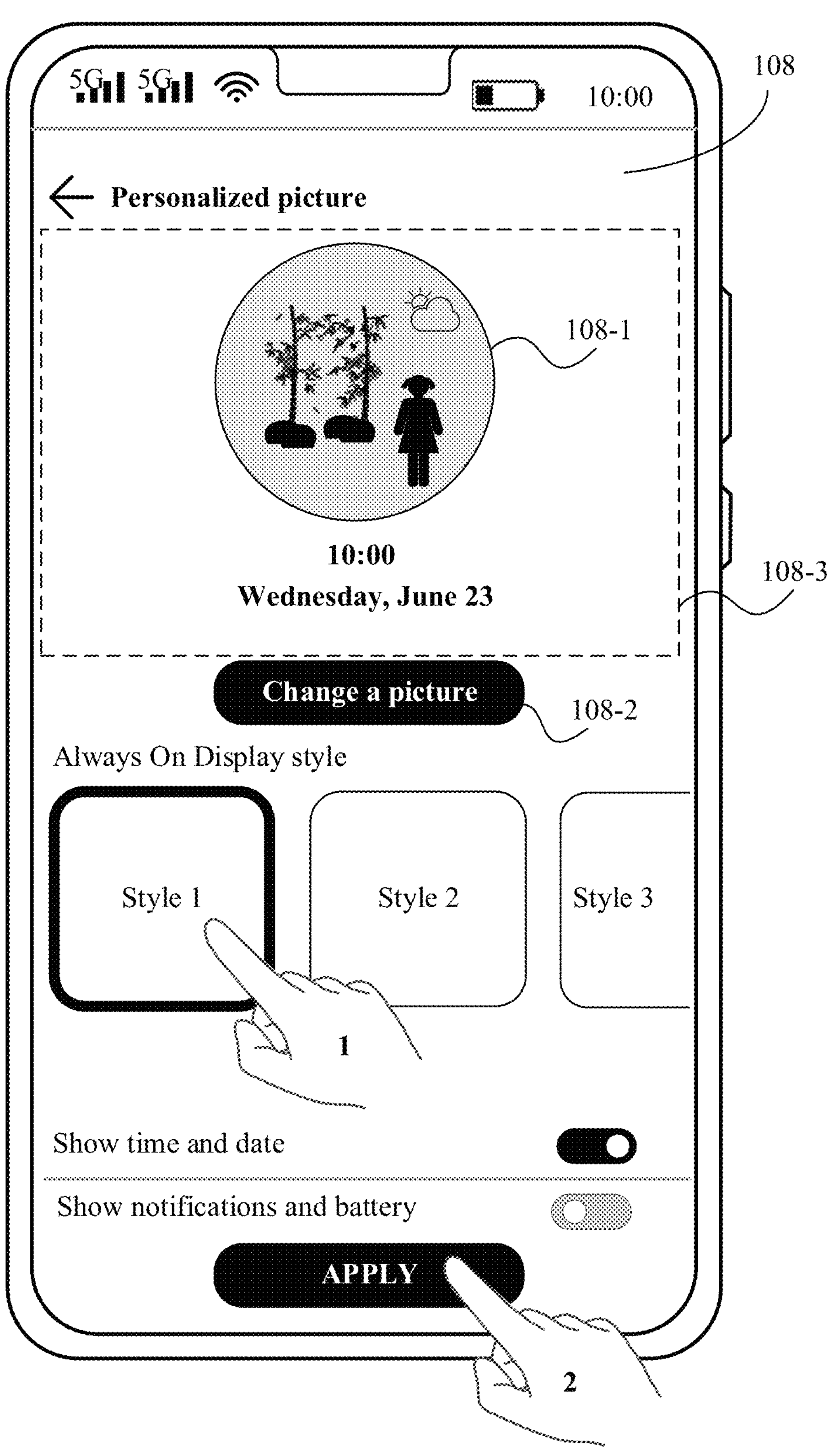
Figure 1I:

A mobile phone is used as an example. A theme wallpaper of the mobile phone may be applied to an always on display screen, a lock screen interface, and an unlock interface of the mobile phone. The theme wallpaper of the mobile phone can be set to meet personalized requirements of different users.

The "always on display screen" refers to an interface displayed when the mobile phone is in a screen-locked and blackout (or off-screen) state. The "always on display screen" may also be referred to as an "always on display (always on display, AOD) interface", a "screen-off interface", an "off-screen interface", or the like.

Optionally, the "always on display screen" of the mobile phone may include different display content. For example, the "always on display screen" of the mobile phone may display one or more of a text such as time and date, a user-defined picture, an icon of a current battery level, an icon of an SMS message, an icon of a missed call, and the like.

The "lock screen interface" refers to an interface displayed when the mobile phone is in a screen-on and screen-locked state. Optionally, the "lock screen interface" of the mobile phone may be: The mobile phone displays, on a wallpaper of the lock screen interface, one or more of a text such as time and date, prompt information such as "a face is being identified", a lock screen icon, and icons of some applications.

The "unlock interface" refers to an interface displayed when the mobile phone is in a screen-on state and the mobile phone has been unlocked. It should be understood that, after the mobile phone is unlocked, an interface before the mobile phone is locked may continue to be displayed, where the interface may be a running interface of any application or a home screen of the mobile phone. In this embodiment of this application, a home screen 101 of a mobile phone shown in FIG. 1(*a*) is used as the "unlock interface". Optionally, the "unlock interface" may be that the mobile phone displays one or more of a clock and weather control, icons of one or more applications (application, App), and the like on a wallpaper of the unlock interface. This is not limited in this embodiment of this application.

For display of the "always on display screen", the user may add a customized picture to the "always on display screen", to display, on the "always on display screen", content expected by the user.

FIGS. 1(*a*) to 1(*i*) are schematic diagrams of examples of a graphical user interface (graphical user interface, GUI) on which a user sets, by using a settings application, display of an always on display screen of a mobile phone. For example, FIG. 1(*a*) shows an interface 101 currently displayed on the mobile phone in an unlock mode. The interface 101 displays content such as a weather and clock control and icons of a plurality of application programs. The application programs may include Address book, Phone, Gallery, Settings, and the like. It should be understood that the interface 101 may further include more other application programs. This is not limited in this embodiment of this application.

As shown in FIG. 1(*a*), the user taps an icon of the settings application, and in response to the tap operation of the user, the mobile phone displays a home screen 102 of the settings application shown in FIG. 1(*b*). The home screen 102 of the settings application may display different function areas and menus, for example, a search box, a user account, a wireless local area network (wireless local area network, WLAN) menu, a Bluetooth menu, a home screen and wallpaper menu, a display and brightness menu, a sound and vibration menu, and a more connections menu.

Optionally, the user taps a home screen and wallpaper menu. In response to the tap operation of the user, the mobile phone displays an interface 103 shown in FIG. 1(*c*). The interface 103 may display a themes control, an always on display control, a magazine unlock control, a wallpaper control, an icons control, and the like. The interface 103 may further include a home screen settings option, a home screen style option, and the like. The home screen settings option may be for setting a layout of a mobile phone home screen, a layout of icons of application programs, and the like. The home screen style option is for setting a standard style of the mobile phone home screen (that is, display all applications on a home page), a drawer style (that is, display all applications on a drawer interface), and the like. Details are not listed one by one.

When the user expects to set a display style and a display mode of the always on display screen of the mobile phone, the user may perform an operation shown in FIG. 1(*c*), and tap an always on display control 103-1. In response to the tap operation of the user, the mobile phone displays an interface 104 shown in FIG. 1(*d*). The interface 104 may include content such as an always on display switch 104-1, a display style preview area 104-2 on the always on display screen, and a display mode setting area 104-3. The display mode setting area 104-3 is for setting a time period displayed on the always on display screen of the mobile phone, for example, 06:00 to 24:00. Details are not described herein again.

In a possible implementation, the user may first perform an operation 1 shown in FIG. 1(*d*), and tap an always on display switch, so that the always on display switch is switched from an off (or "OFF") state to an on (or "ON") state. In response to an operation of turning on the always on display switch by the user, a possible always on display style may be displayed in the display style preview area 104-2 of the always on display screen. For example, the always on display style may be a default always on display style, or a style previously set by the user. This is not limited in this embodiment of this application. When the user expects to modify a current always on display style of the mobile phone, the user may perform an operation 2 shown in FIG. 1(*d*), and tap a "more" option for the always on display style. In response to the tap operation of the user, the mobile phone displays an interface 105 shown in FIG. 1(*e*). The interface 105 may include a plurality of function areas, for example, a personalized-picture selection area, an artistic signature selection area, and a clock selection area. The personalized-picture selection area may be for adding a picture to the always on display screen of the mobile phone, for example, a user-defined picture or a system preset picture. The artistic signature selection area may be for adding personalized signatures of different fonts and different styles, such as "Strive for excellence", "Keep it up", and "Go!", to the always on display screen of the mobile phone. The clock selection area may be for selecting different clock styles for the always on display screen of the mobile phone, for example, different clock styles such as a watch face clock and a digital clock. Details are not described herein again.

Optionally, the user may set, based on a requirement and a habit of the user by using different function areas on the interface 105, a plurality of display styles that may be available on the always on display screen of the mobile phone.

For example, the personalized-picture selection area is used as an example. The personalized-picture selection area may provide a user with a plurality of system preset pictures, for example, a preset picture 1. The personalized picture selection area may be further for providing a manner of adding a picture in a customized manner for the user, for example, an add control 105-1 shown in FIG. 1(*e*). As shown in FIG. 1(*e*), the user may tap any area of the add control 105-1. In response to the tap operation of the user, the mobile phone may further display an interface 106 shown in FIG. 1(*f*).

Optionally, the interface 106 may include a control 106-1, an always on display style selection area, a "show time and date" switch, a "show notifications and battery" switch, and the like. The "show time and date" switch is for controlling display of current time and date on the always on display screen of the mobile phone. The "show notifications and battery" switch is for controlling display of current remaining power on the always on display screen of the mobile phone. Details are not described herein again.

As shown in FIG. 1(*f*), the user taps the control 106-1. In response to the tap operation of the user, the mobile phone displays a picture selection interface 107 shown in FIG. 1(*g*).

The interface 107 may display a picture list. The user may tap a selection box of any picture in the picture list, and select the picture as a target picture on the always on display screen of the mobile phone. One or more pictures included in the picture list may be from a local gallery of the mobile phone, or may be requested from another electronic device, a server, or the like in another manner. A source of the one or more pictures included in the picture list is not limited in this embodiment of this application.

It should be understood that, in this embodiment of this application, "the picture is used as a target picture on the always on display screen of the mobile phone" may be understood as: Content of an area on the target picture is captured as display content on the always on display screen, where the area may be a part or all of an area on the target picture.

For example, when the user performs an operation 1 shown in FIG. 1(*g*), to be specific, taps and selects a selection box of the target picture, and performs an operation 2 shown in FIG. 1(*g*), to be specific, taps an "OK" option, in response to the operations of the user, the mobile phone displays an interface 108 shown in FIG. 1(*h*).

Optionally, compared with the interface 106 shown in FIG. 1(*e*), in the interface 108, content of the target picture selected by the user is added to a control 108-1 in the interface 108. In addition, the interface 108 may further display a control 108-2. When the user expects to modify the target picture on the always on display screen, the user may tap the control 108-2 to enter the picture selection interface 107 shown in FIG. 1(*g*), and reselect a target picture. Details are not described herein again.

Optionally, the control 108-1 may have different shapes and sizes such as a circle, an ellipse, a rectangle, and a square. In this embodiment of this application, a circular control is used as an example for description. Correspondingly, the target picture selected by the user may be filled in the circular control 108-1.

It should be understood that the circular control 108-1 may display content of a part or all of an area of the target picture selected by the user, and the user may perform a plurality of possible operations on the control 108-1. For example, the user may drag the target picture in the control 108-1 to change a display area of the target picture, to change display content in the control 108-1. Alternatively, the user may perform an operation of selecting the target picture with two fingers and pinching the target picture or selecting the target picture with two fingers and expanding the target picture, to zoom out or zoom in on the target picture, to change a display area of the target picture, to change display content in the control 108-1. Alternatively, the user may perform an operation of selecting and rotating the target picture by using two fingers, to change a placement angle of the target picture in the control 108-1. This is not limited in this embodiment of this application.

It should be further understood that, in this embodiment of this application, "displaying the target picture on the always on display screen" means displaying content of a part or all of an area of the target picture in a preset area or a control of a preset shape on the always on display screen, or displaying an element in a part or all of an area of the target picture. Details are not described subsequently. For example, as shown in FIG. 1(*i*), the preset area is a circular area in a position above a center of the display, or the control of the preset shape is a circular control, or the like In a possible implementation, when the user performs an operation 1 shown in FIG. 1(*h*), to be specific, taps and selects a style 1, keeps a "show time and date" switch in an on (or "ON") state and a "show notifications and battery" switch in an off (or "OFF") state, and then performs an operation 2 shown in FIG. 1(*h*), to be specific, taps an "apply" option. In response to the user operations, the mobile phone may subsequently display, on the always on display screen based on settings of the user, current time and date, and content included in a part or all of the user-defined target picture. In other words, in this embodiment of this application, the "display content of the always on display screen" may include content of an area of the target picture, and time and date.

For example, after completing setting of the always on display screen according to FIG. 1(*h*), the user may tap any position in an area 108-3 shown by a dashed-line box on the interface 108, to preview a display effect of the always on display screen. In other words, the mobile phone may display an always on display screen 109 shown in FIG. 1(*i*). Alternatively, after the user presses a screen locking mechanical button of the mobile phone to lock the screen of the mobile phone, the always on display screen 109 shown in FIG. 1(*i*) may be displayed. This is not limited in this embodiment of this application.

For example, in this embodiment of this application, the always on display screen 109 shown in FIG. 1(*i*) is used as an example. Content that may be displayed on the always on display screen 109 includes content of a circular area on the target picture, and current time and date. Specifically, the content of the circular area on the target picture is displayed in a circular control of the always on display screen 109, and a circular control area, a time display area, and a date display area may have a position relationship shown in FIG. (i). This is not limited in this embodiment of this application.

Figure 2A:
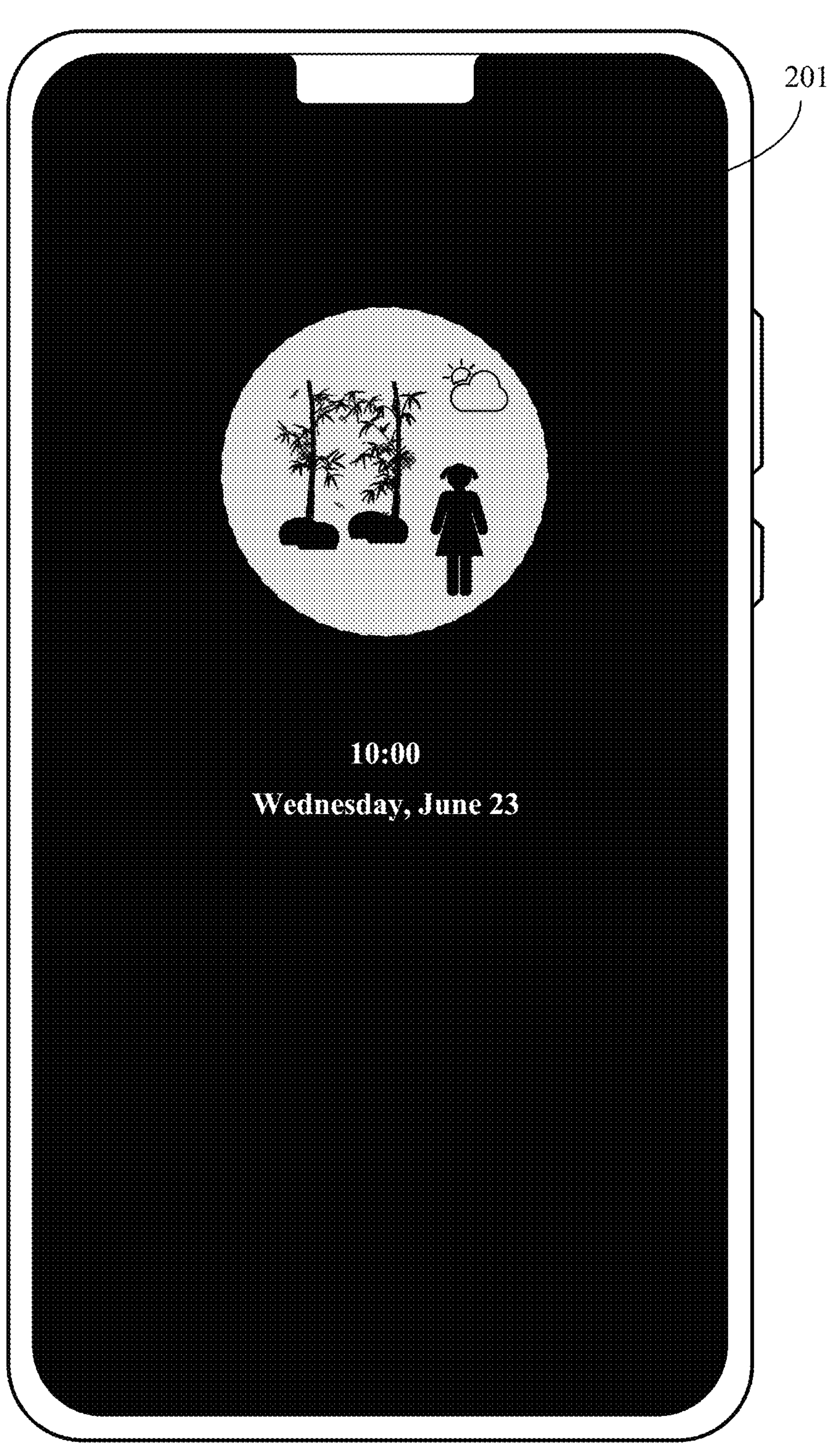
FIGS. 2(*a*) to 2(*c*) are schematic diagrams of examples of a presentation effect of a mobile phone from an always on display screen to an unlock interface.
Figure 2B:
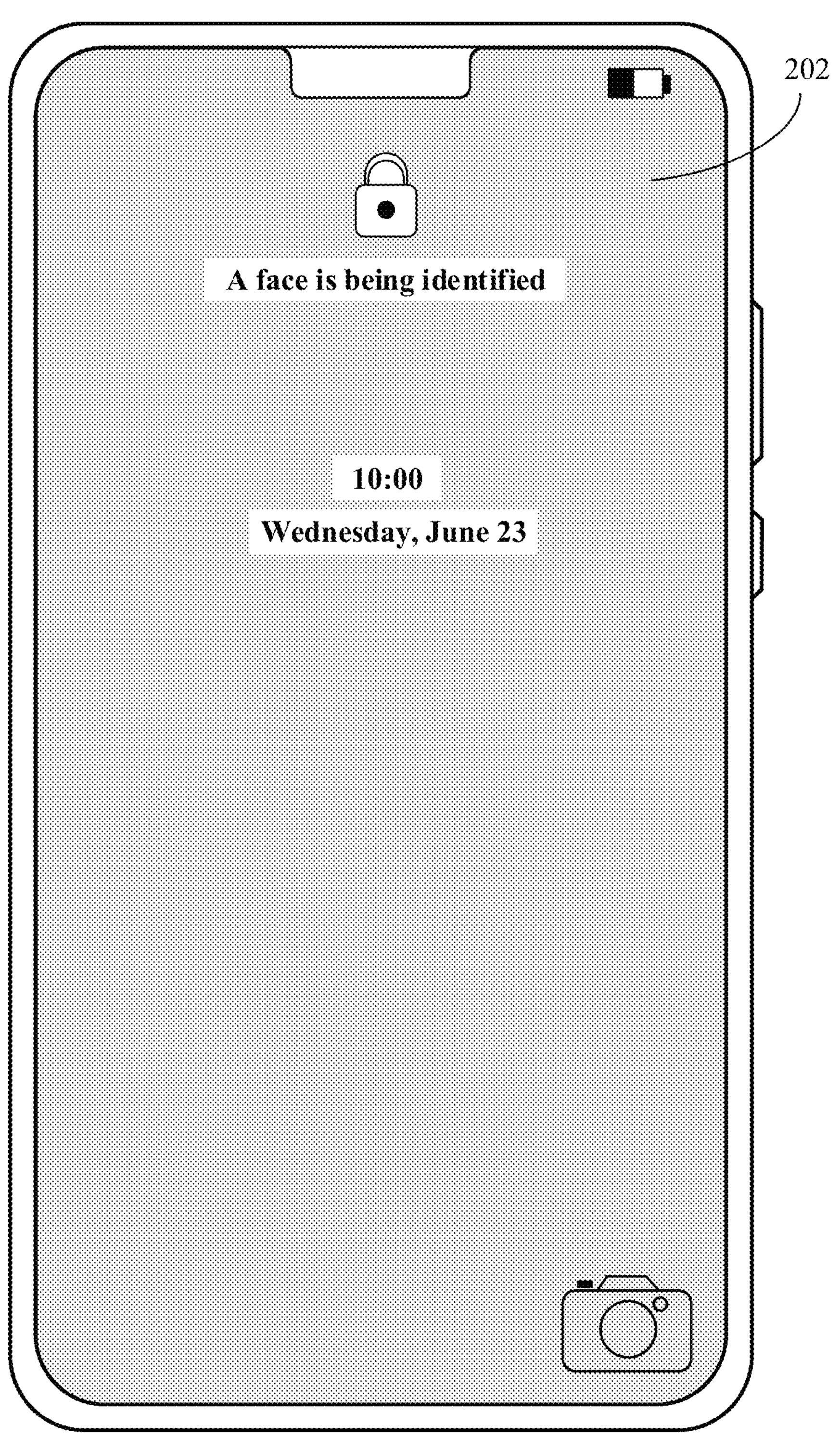
Figure 2C:
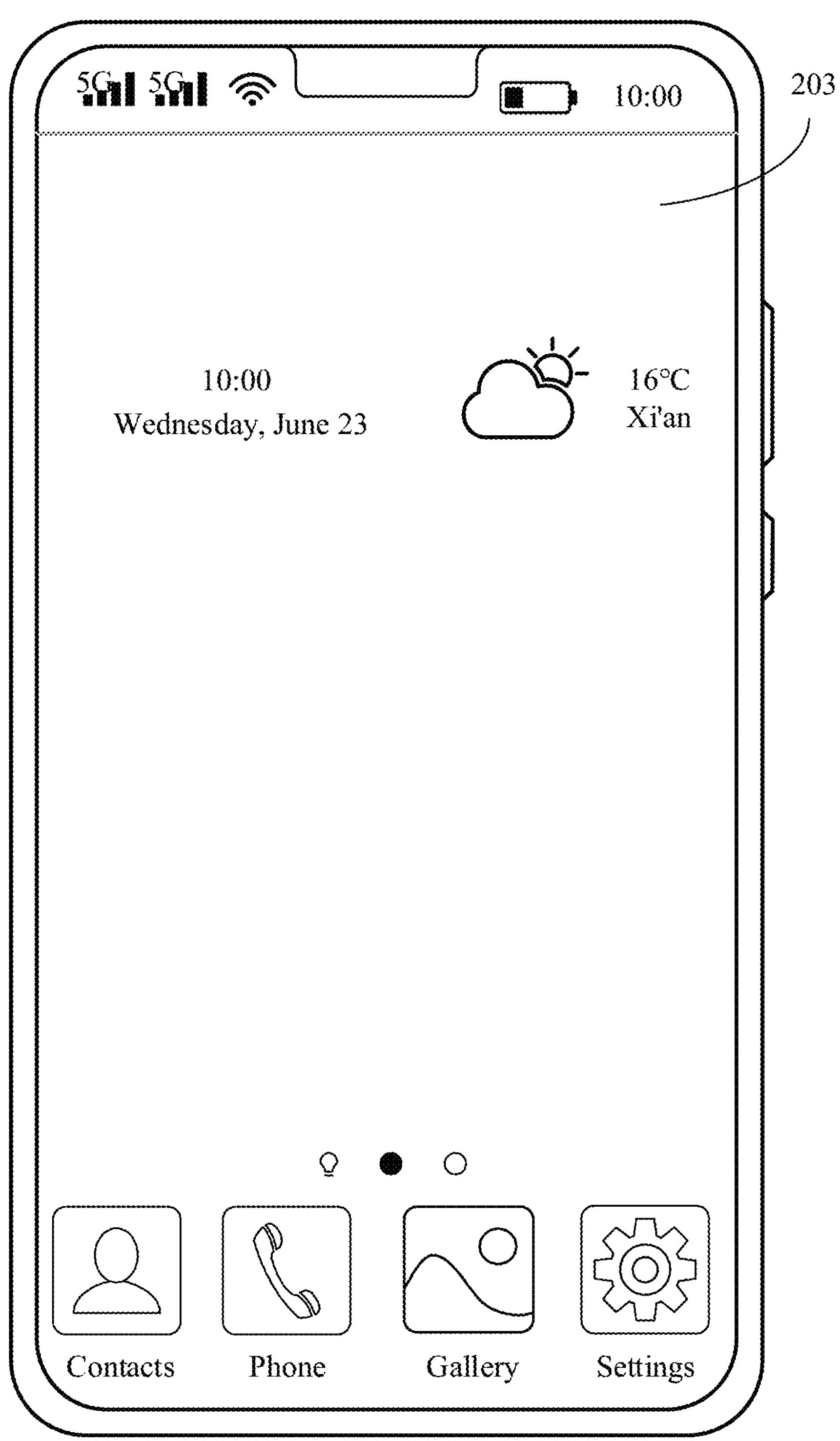
Figure 3A:
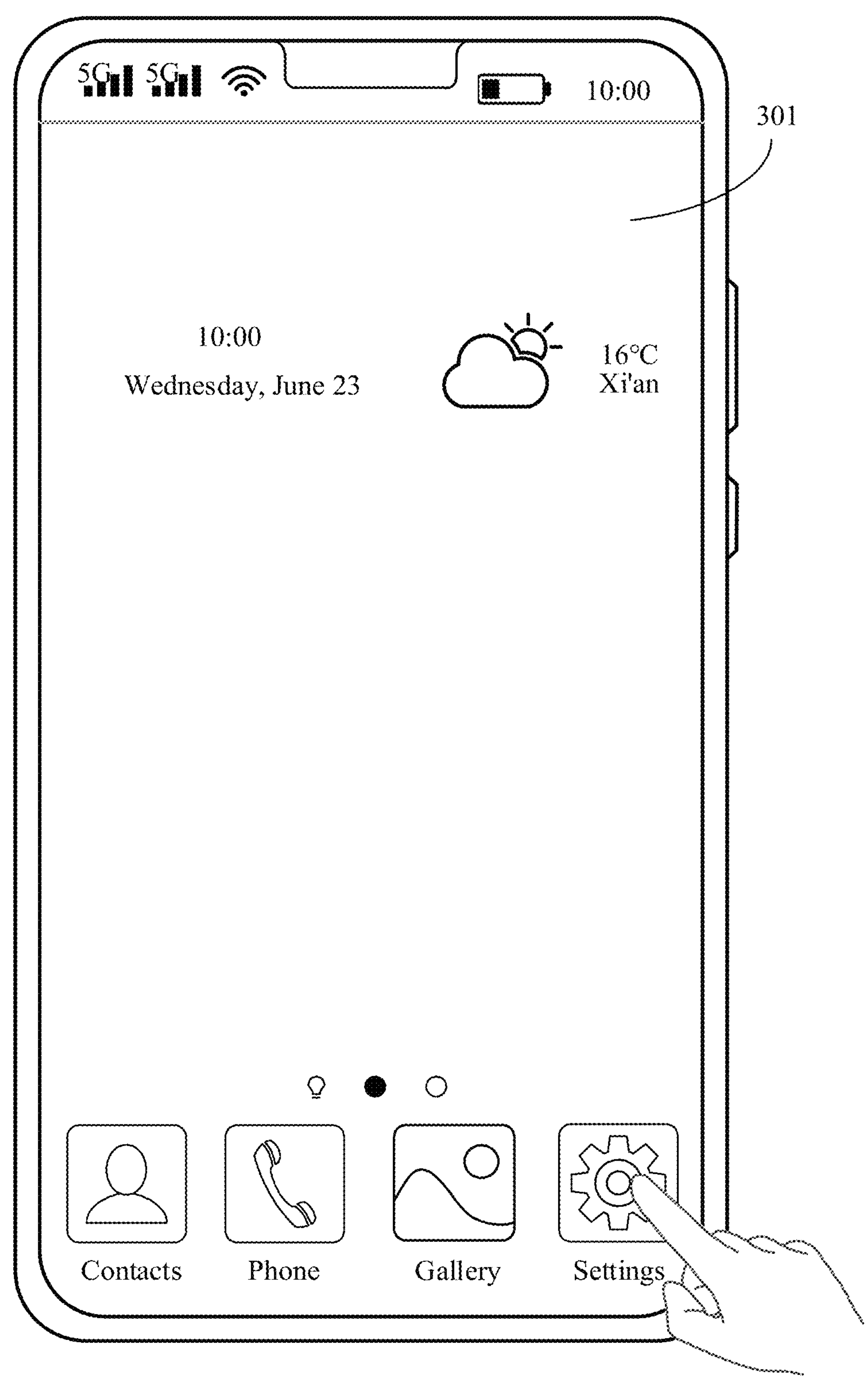
FIGS. 3(*a*) to 3(*e*) are schematic diagrams of other examples in which a user sets a mobile phone theme by using a settings application.
Figure 3B:
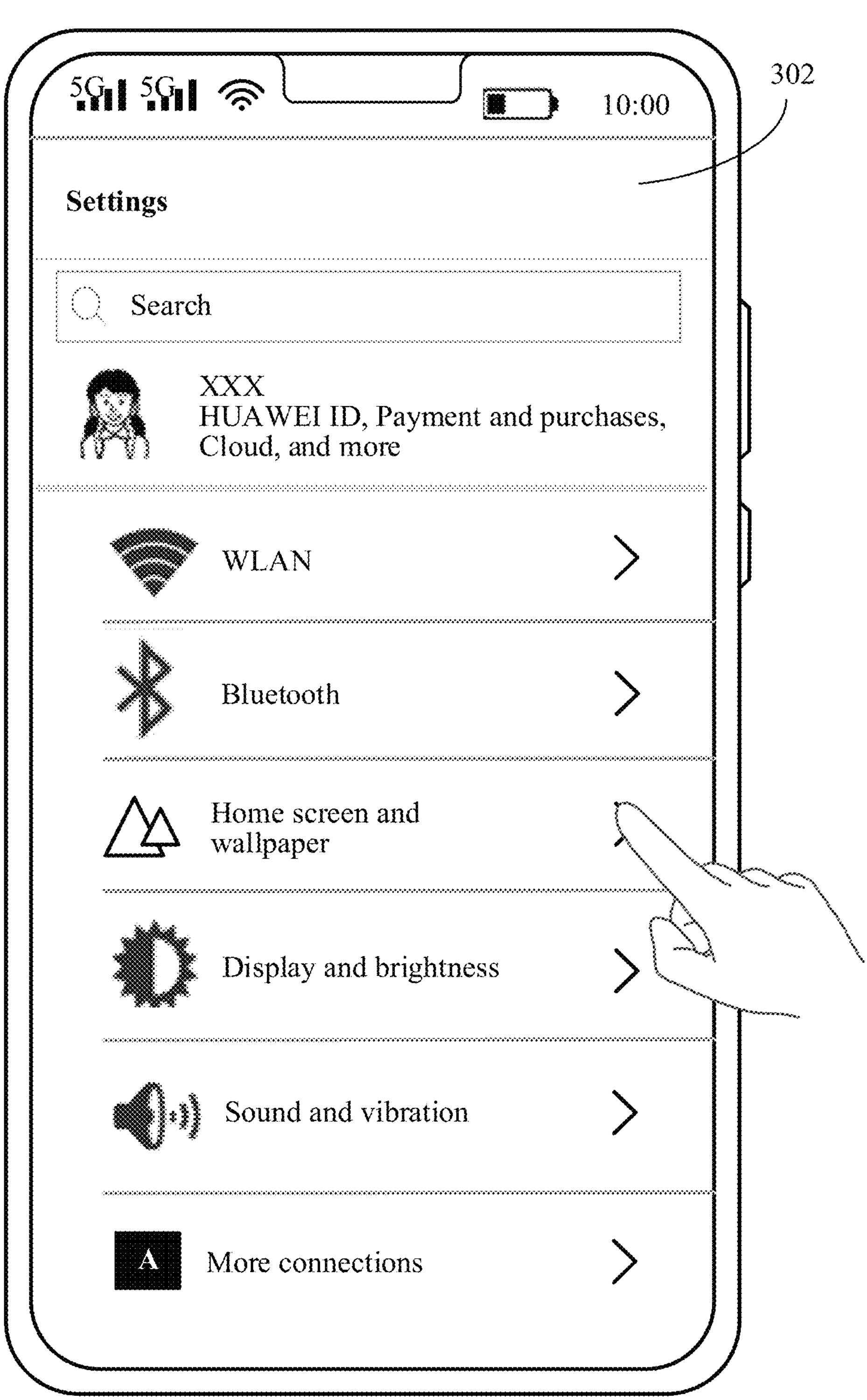
Figure 3C:
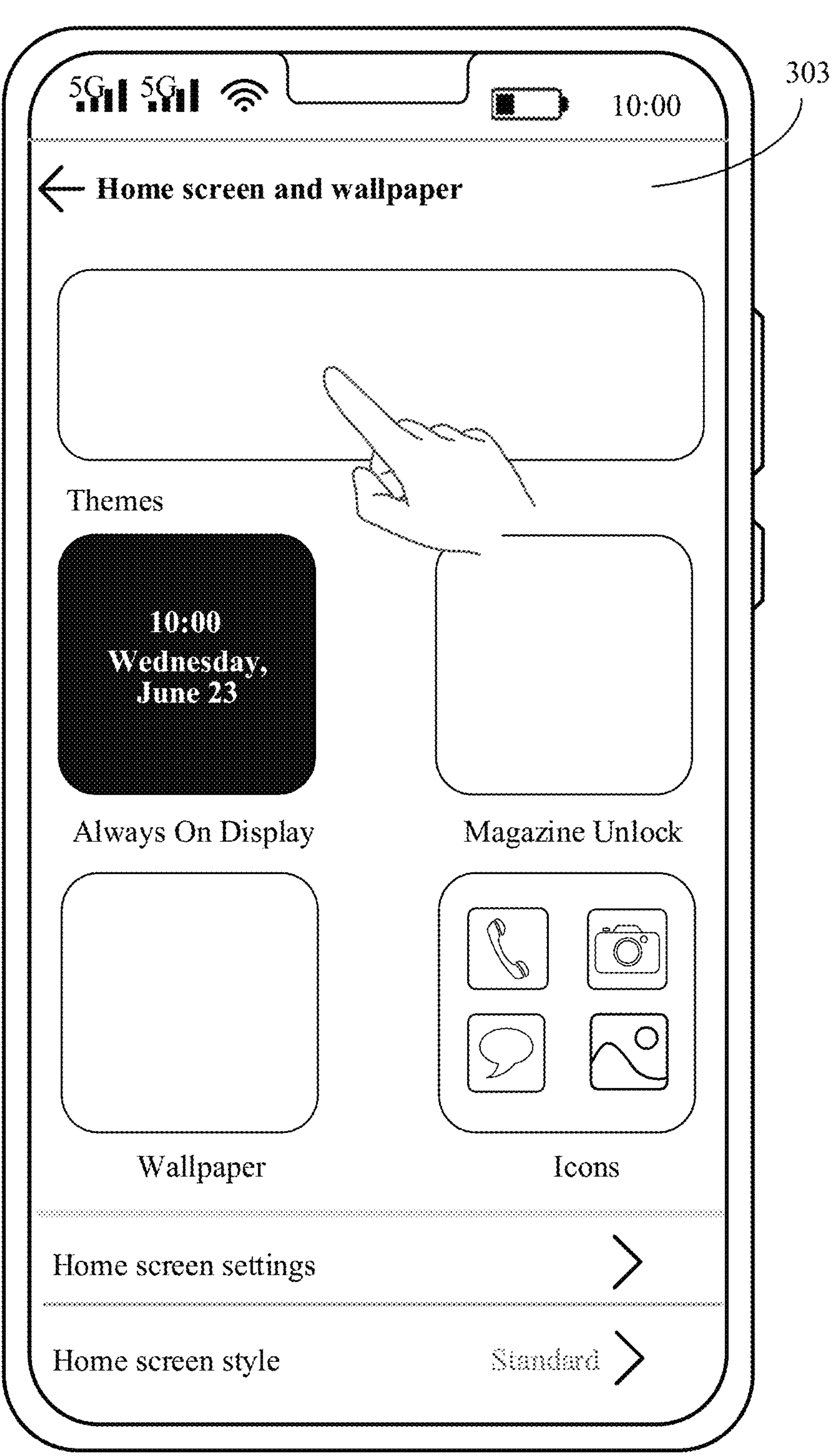
Figure 3D:
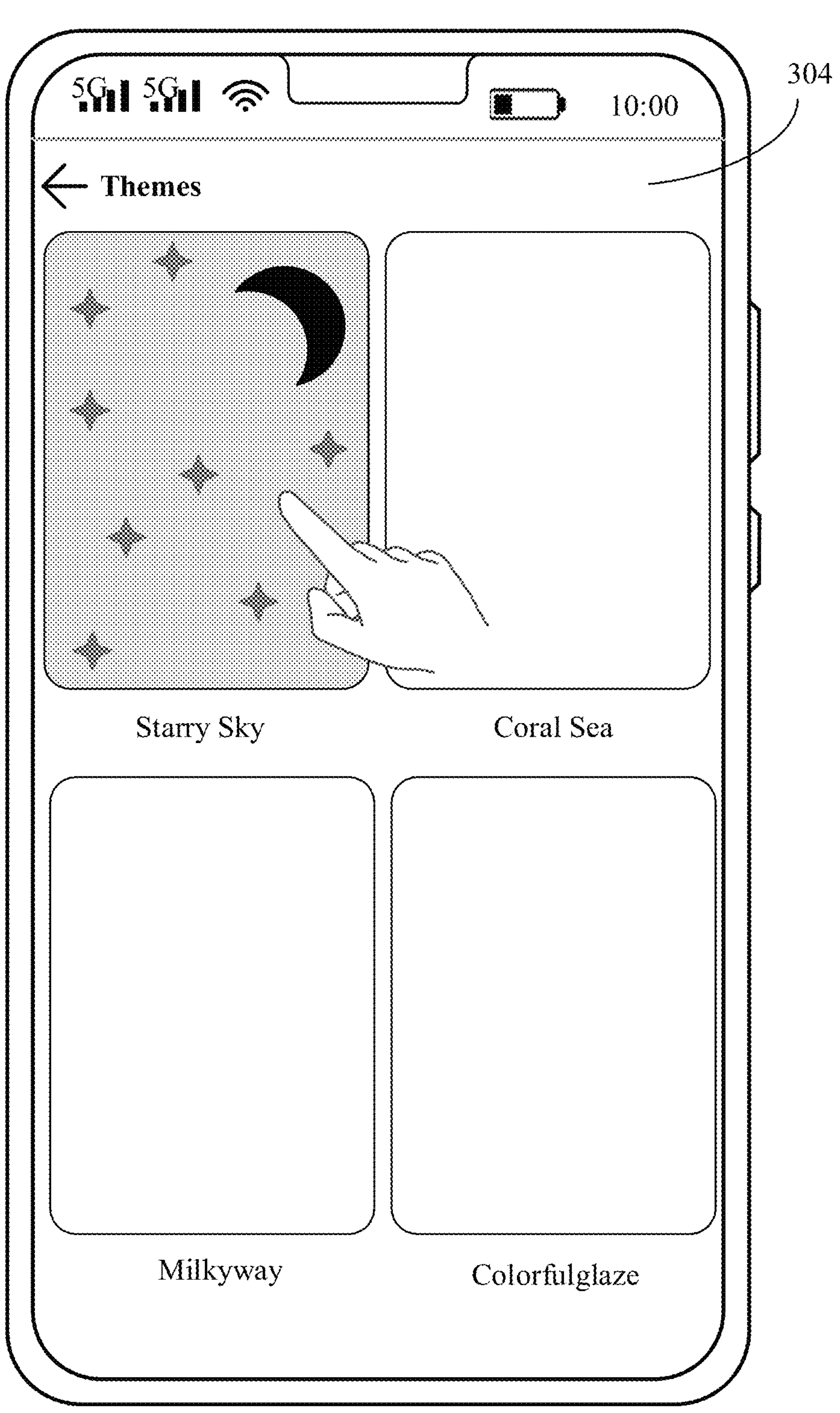
Figure 3E:
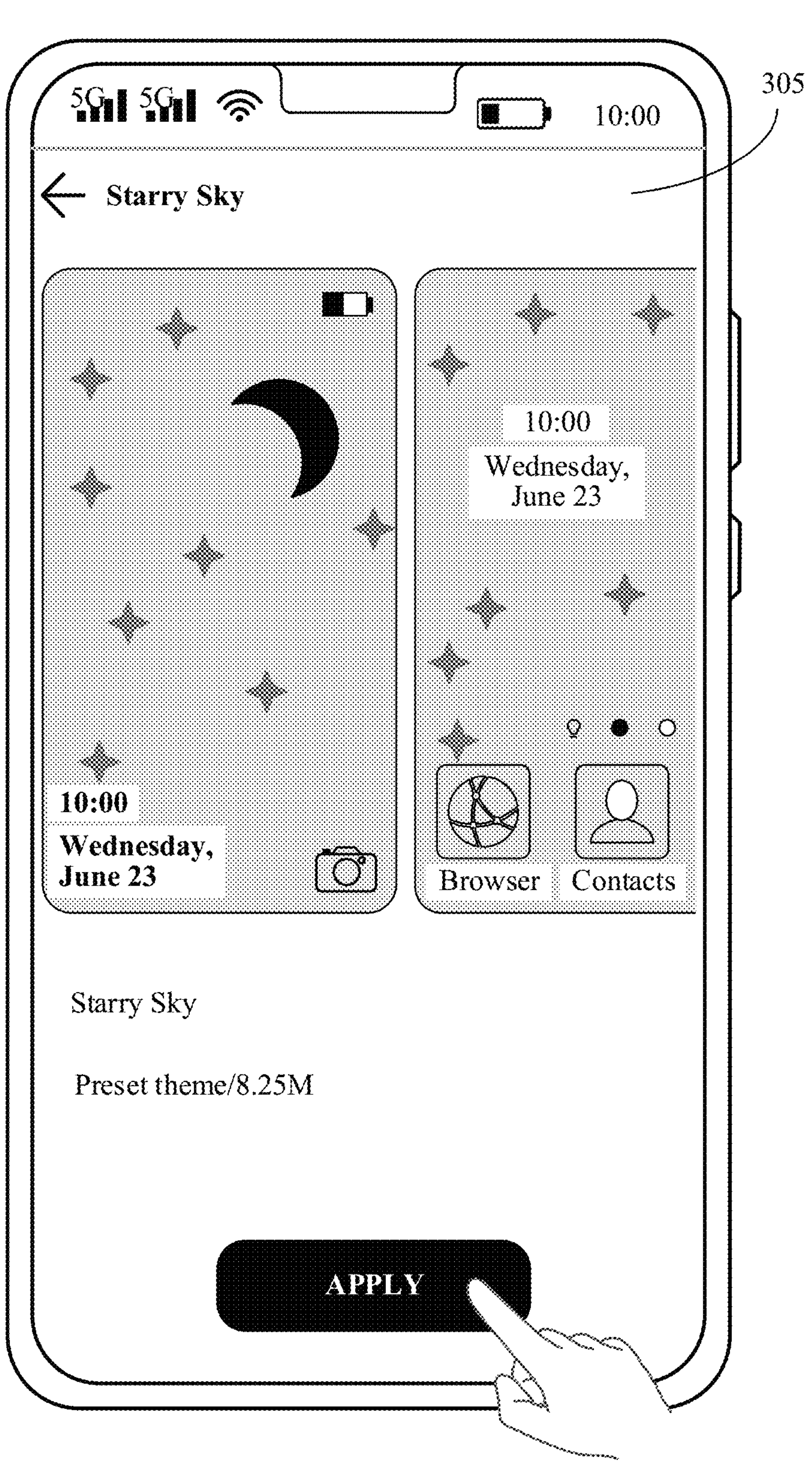

FIGS. 2(*a*) to 2(*c*) are schematic diagrams of examples of a presentation effect of a mobile phone from an always on display screen to an unlock interface.

After the user completes setting of the always on display screen according to FIG. 1(*a*) to 1(*h*), the mobile phone may display, in an always on display state, an always on display screen 201 shown in FIG. 2(*a*). When the mobile phone is in the always on display state, and the user triggers the mobile phone to start facial identification and start unlocking, the mobile phone may be turned on and display a lock screen interface 202 shown in FIG. 2(*b*). The lock screen interface 202 may display a lock screen icon, prompt information indicating that "a face is being identified", current time and date, and a camera application icon. After face information verification succeeds, the mobile phone may be unlocked and display an unlock interface 203 shown in FIG. 2(*c*).

First, in the foregoing process, for the always on display screen 201, the user-defined target picture is filled in the circular control of the always on display screen 201. As a result, picture content displayed in the circular control and a black always on display area form a large visual difference, and the picture content in the circular control and the black always on display area are spliced or transited hard. Therefore, a display effect is not beautiful, and visual experience of the user is poor.

In addition, based on the process shown from FIG. 2(*a*) to 2(*b*) and then to 2(*c*), in a process of switching from the always on display screen to the lock screen interface and then to the unlock interface, the mobile phone may present an interface change, but cannot present an effect of a transition animation from the always on display screen to the lock screen interface and then to the unlock interface to the user. In other words, if the user sets the target picture on the always on display screen 201 of the mobile phone, a wallpaper of the lock screen interface 202, and a wallpaper of the unlock interface 203 to be different pictures, in a process of switching from the always on display screen to the lock screen interface and then to the unlock interface, the mobile phone can present only an interface change, and switch from one interface to another content-irrelevant interface, resulting in poor visual experience of the user. If the user sets the target picture on the always on display screen 201 of the mobile phone, the wallpaper of the lock screen interface 202, and the wallpaper of the unlock interface 203 to be a same picture, regardless of whether the picture is used as the target picture on the always on display screen 201, the wallpaper of the lock screen interface 202, or the wallpaper of the unlock interface 203, the user sets a fixed area or fixed content for displaying the picture. In this case, the mobile phone may present switching from fixed content to other fixed content on the interface, an effect of a transition animation from the always on display screen to the lock screen interface and then to the unlock interface cannot be presented to the user, and visual experience of the user is poor.

In another possible implementation, the user may set a theme of the mobile phone, so that the mobile phone presents an effect of dynamically changing from the always on display screen to the lock screen interface and then to the unlock interface.

FIGS. 3(*a*) to 3(*e*) are schematic diagrams of other examples in which a user sets a mobile phone theme by using a settings application; Optionally, the user may further set the theme of the mobile phone through a home screen and wallpaper menu in a settings application.

For example, as shown in FIG. 3(*a*), the user taps an icon of a settings application on a home screen 301 of the mobile phone, and the mobile phone displays a home screen 302 of a settings application shown in FIG. 3(*b*). The user then taps a home screen and wallpaper menu on the interface 302, and the mobile phone displays an interface 303 shown in FIG. 3(*c*). The user taps a themes control on the interface 303. In response to the tap operation of the user, the mobile phone may display a themes interface 304 shown in FIG. 3(*d*). The themes interface 304 may include one or more preset themes, for example, a starry sky theme, a coral sea theme, a milky way theme, and a colorful glaze theme shown in FIG. 3(*d*).

As shown in FIG. 3(*d*), the user taps a control of the starry sky theme. In response to the tap operation of the user, the mobile phone displays a starry sky theme details interface 305 shown in FIG. 3(*e*). The user may perform an operation such as sliding left or sliding right on the interface 305, to preview an effect presented by the starry sky theme. When the user taps an "apply" option of the interface 305, in response to the tap operation of the user, the mobile phone may change the theme to the starry sky theme. Optionally, the starry sky theme preset on the mobile phone may present an effect of dynamic linkage from the always on display screen to the lock screen interface and then to the unlock interface to the user.

Figure 4A:
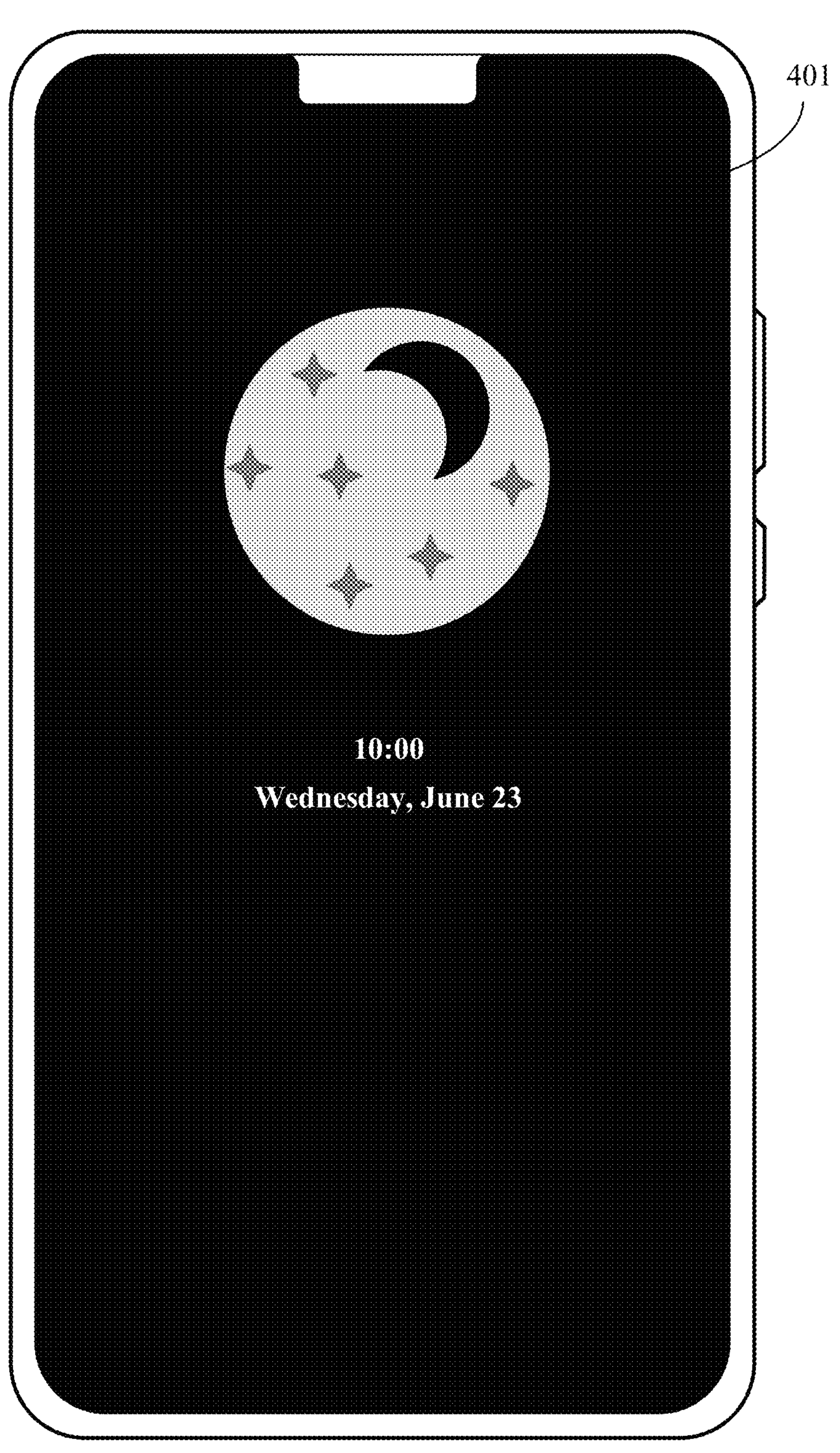
FIGS. 4(*a*) to 4(*c*) are schematic diagrams of other examples of a presentation effect of a mobile phone from an always on display screen to an unlock interface.
Figure 4B:
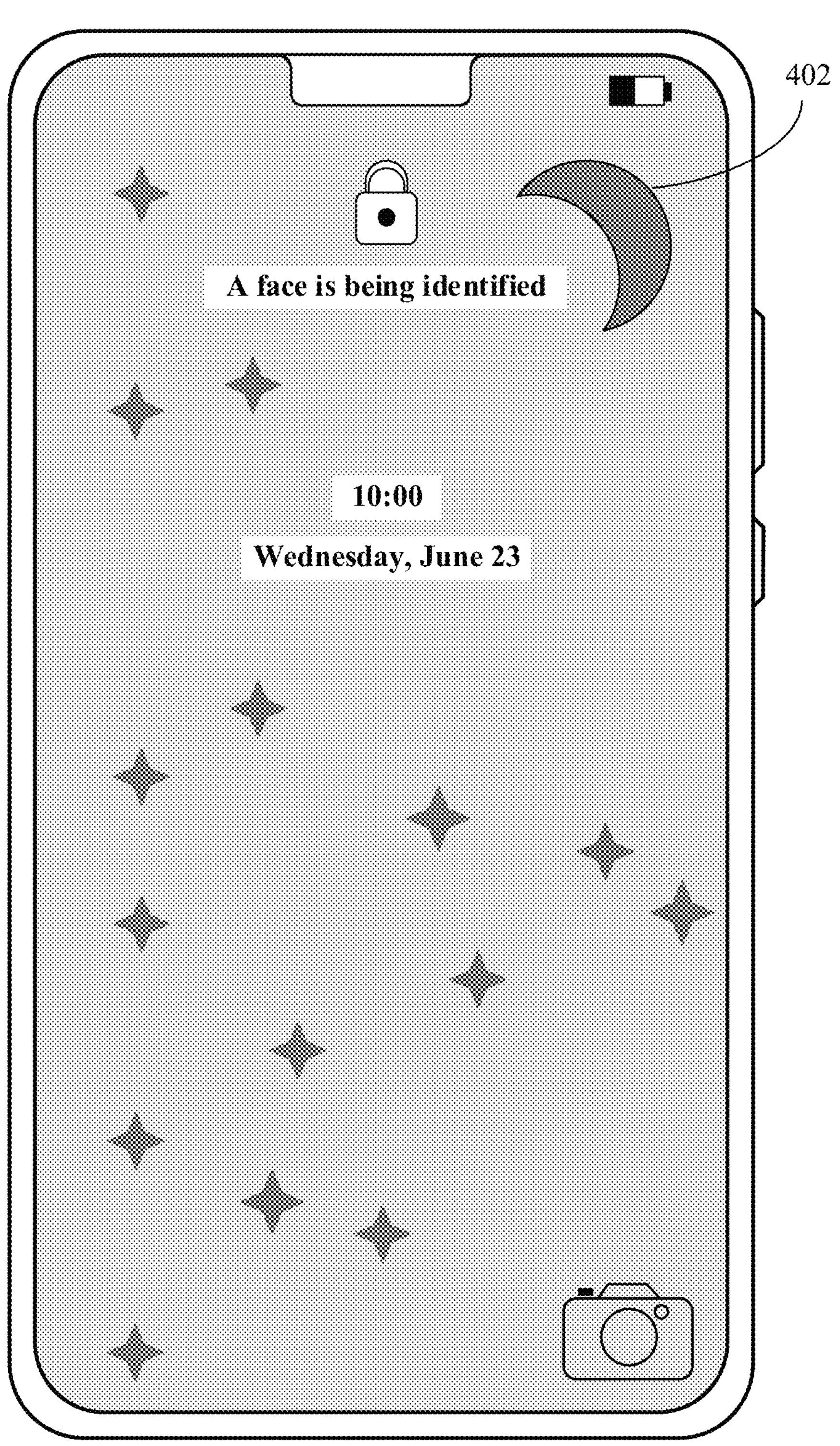
Figure 4C:
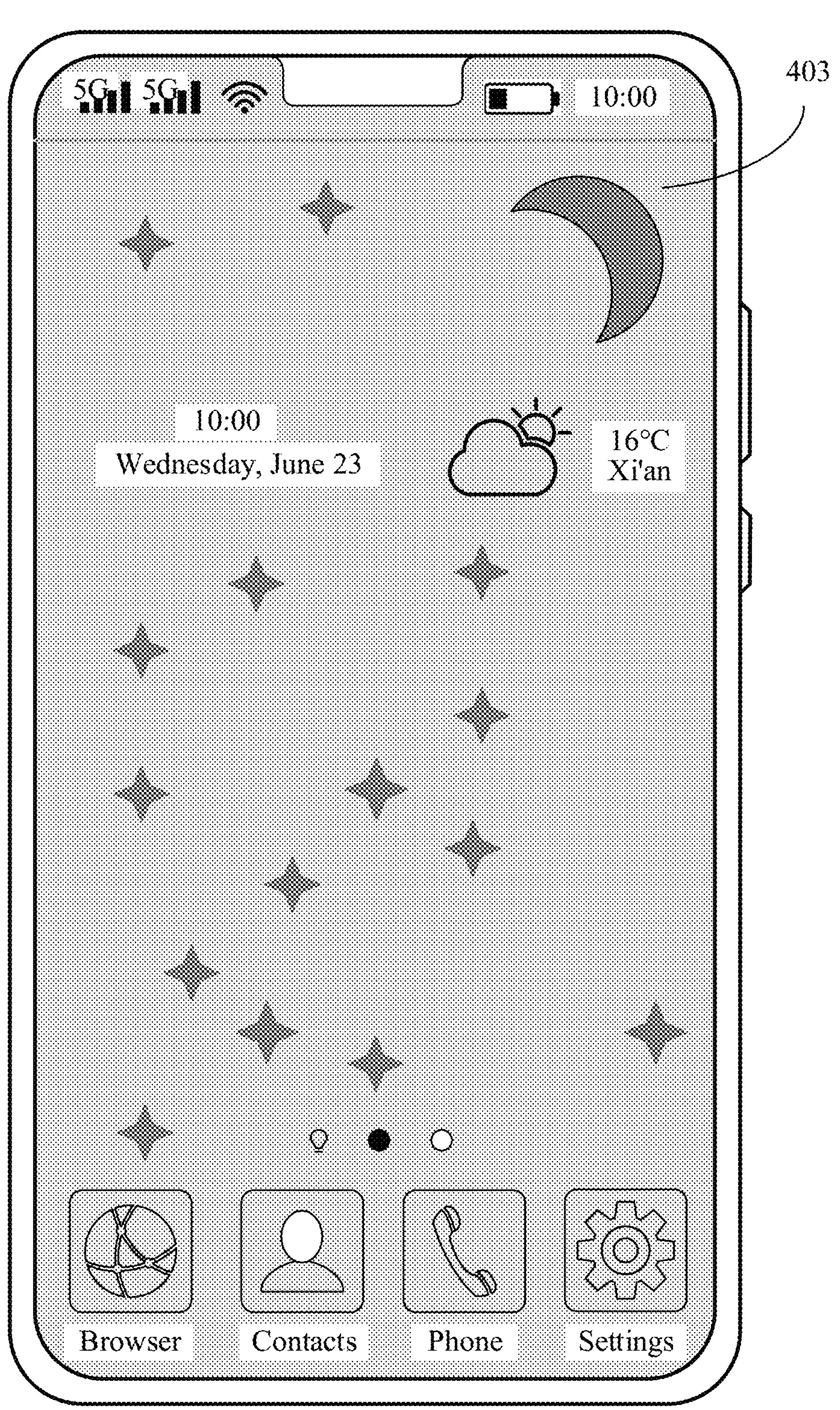

FIGS. 4(*a*) to 4(*c*) are schematic diagrams of other examples of a presentation effect of a mobile phone from an always on display screen to an unlock interface; When the user sets the mobile phone to apply the starry sky theme, the mobile phone may display, in an always on display state, an always on display screen 401 shown in FIG. 4(*a*), and starry sky content may be displayed in a circular control of the always on display screen 401. When the mobile phone is in the always on display state, and the user triggers the mobile phone to start facial identification and start unlocking, the mobile phone may be turned on and display a lock screen interface 402 shown in FIG. 4(*b*). The lock screen interface 402 uses the starry sky content as a wallpaper and displays a lock screen icon, prompt information indicating that "a face is being identified", current time and date, and a camera application icon. After face information verification succeeds, the mobile phone is unlocked successfully, and displays an unlock interface 403 shown in FIG. 4(*c*). The unlock interface 403 may also use the starry sky content as a wallpaper.

Optionally, in a process of changing from the always on display screen to the lock screen interface and then to the unlock interface shown in FIG. 4(*a*) to 4(*b*) and then to 4(*c*), the following may be presented: A picture of the star sky is dynamically expanded from a smaller area to full-screen display, and the process may present a dynamic effect of conversion of the spectacular star sky. In this process, a dynamic effect of a content change from the always on display screen to the lock screen interface and then to the unlock interface may be presented to the user, but the effect may be only for several themes preset on the mobile phone. A picture taken by the user or a picture preferred by the user cannot be applied to a theme wallpaper, that is, a dynamic effect of content from the always on display screen to the lock screen interface and then to the unlock interface cannot be implemented based on a user-defined picture, and a personalized requirement of the user cannot be met.

Therefore, to improve visual experience of the user in an unlocking process, an embodiment of this application provides a theme wallpaper generation method. In the method, a user-defined picture may be applied to a theme wallpaper of an electronic device, to implement a dynamic linkage effect of content of an always on display screen, a lock screen interface, and an unlock interface, thereby improving visual experience of the user. The following describes the technical solutions in embodiments of this application with reference to the accompanying drawings in embodiments of this application.

First, it should be noted that, in the descriptions of embodiments of this application, "/" means "or" unless otherwise specified. For example, A/B may represent A or B.

In this specification, "and/or" is only a description of an association relationship between associated objects, and means that there may be three types of relationships. For example, A and/or B may mean that A exists alone, both A and B exist, and B exists alone. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

The theme wallpaper generation method provided in embodiments of this application may be applied to an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 5:
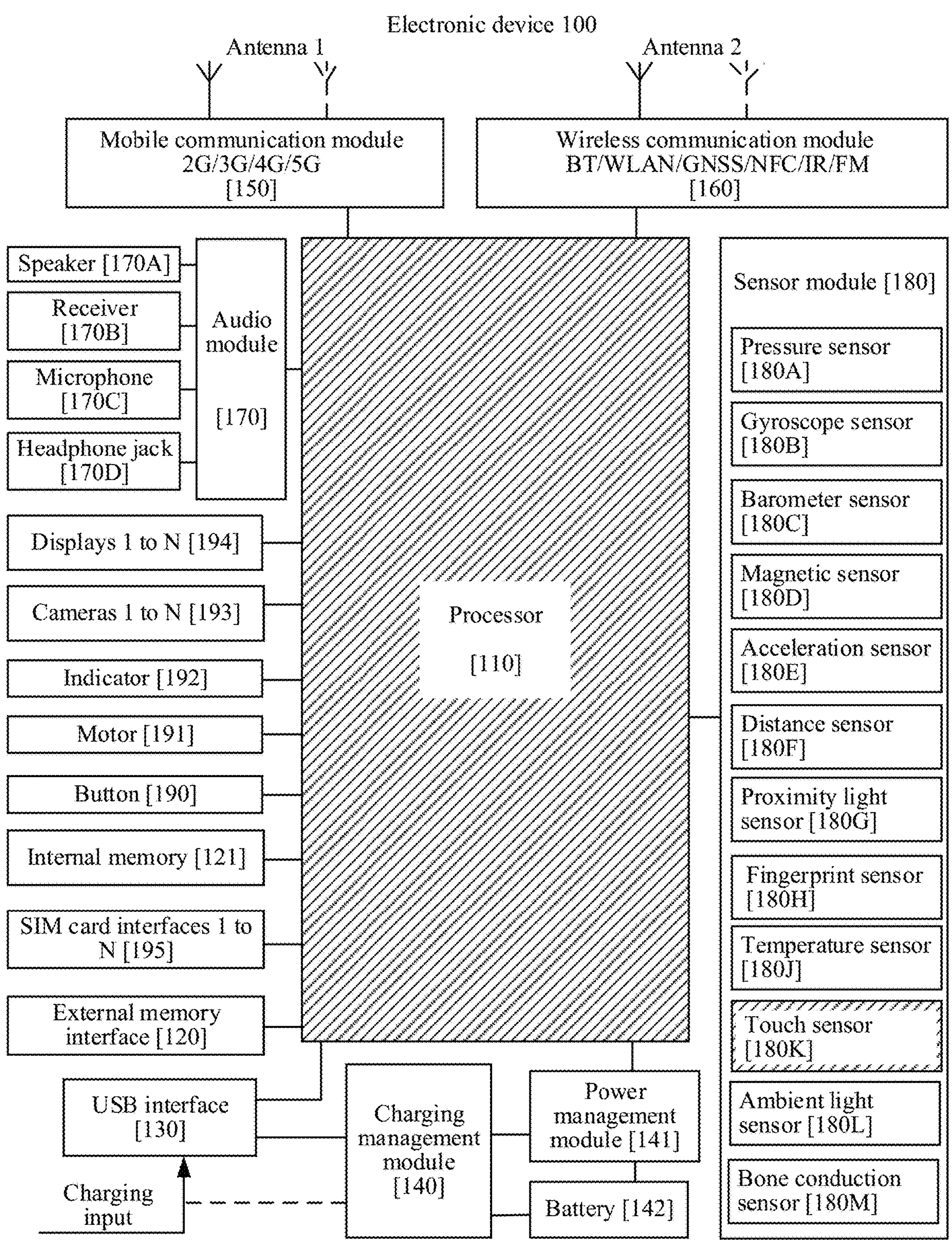
FIG. 5 is a schematic diagram of a structure of an example of an electronic device according to an embodiment of this application.

For example, FIG. 5 is a schematic diagram of a structure of an example of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a timing signal to complete control of reading and executing instructions.

A memory may also be provided in the processor 110 for storing instructions and data. In some embodiments, the memory in the processor 110 is a cache memory. The memory may store instructions or data that has just been used or recycled by the processor 110. If the processor 110 needs to use the instructions or the data again, the processor can directly invoke them from the memory. Repeated access is avoided, and waiting time of the processor 110 is reduced, thereby improving efficiency of the system.

In embodiments of this application, the processor 110 stores a program or instructions corresponding to the theme wallpaper generation method in embodiments of this application, and the method may control the electronic device 100 to: determine a target picture customized by a user, perform an image processing process such as detecting and identifying the target picture and performing image cropping on a target element in the picture, and determine different transition modes and transition animations that correspond to a process of switching from an always on display screen to a lock screen interface and then to an unlock interface of a mobile phone and that are set by the user, to present, to the user, a smooth animation effect of dynamic linkage in a process of switching from the always on display screen to the lock screen interface and then to the unlock interface, that is, generate a dynamic theme wallpaper for the user based on the target picture selected by the user.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 through the DSI interface to realize the display function of the electronic device 100.

GPIO interface can be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the second electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be reused as a diversity antenna in a wireless local area network. In some other embodiments, the antenna may be used in combination with a tuning switch.

The mobile communication module 150 may provide a wireless communication solution that is applied to the electronic device 100 and that includes 2G/3G/4G/5G/6G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and connects the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

In embodiments of this application, when the electronic device 100 is the mobile phone shown in FIG. 1(*a*) to 1(*i*), the display 194 of the mobile phone may receive an operation of the user, and present, to the user, an effect of dynamic linkage in the process of switching from the always on display screen to the lock screen interface and then to the unlock interface.

In addition, the user may further perform an operation such as tap, double-tap, or slide on the display 194. Content displayed on the display 194 of the electronic device 100 is displayed as different interfaces in response to the operation of the user. Details are not described herein again.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information based on a structure of a biological neural network, for example, based on a transfer mode between human brain neurons; and may further continuously perform self-learning. Applications such as intelligent cognition of the electronic device 100 may be implemented through the NPU, for example, image identification, facial identification, speech identification, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a position different from that of the display 194.

In embodiments of this application, the touch sensor 180K may detect an operation of the user, such as touch, tap, double-tap, or slide, and transfer the user operation to the processor 110, so that the processor 110 responds.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In this embodiment of this application, an Android system with the layered architecture is used as an example to illustrate a software structure of the electronic device 100.

Figure 6:
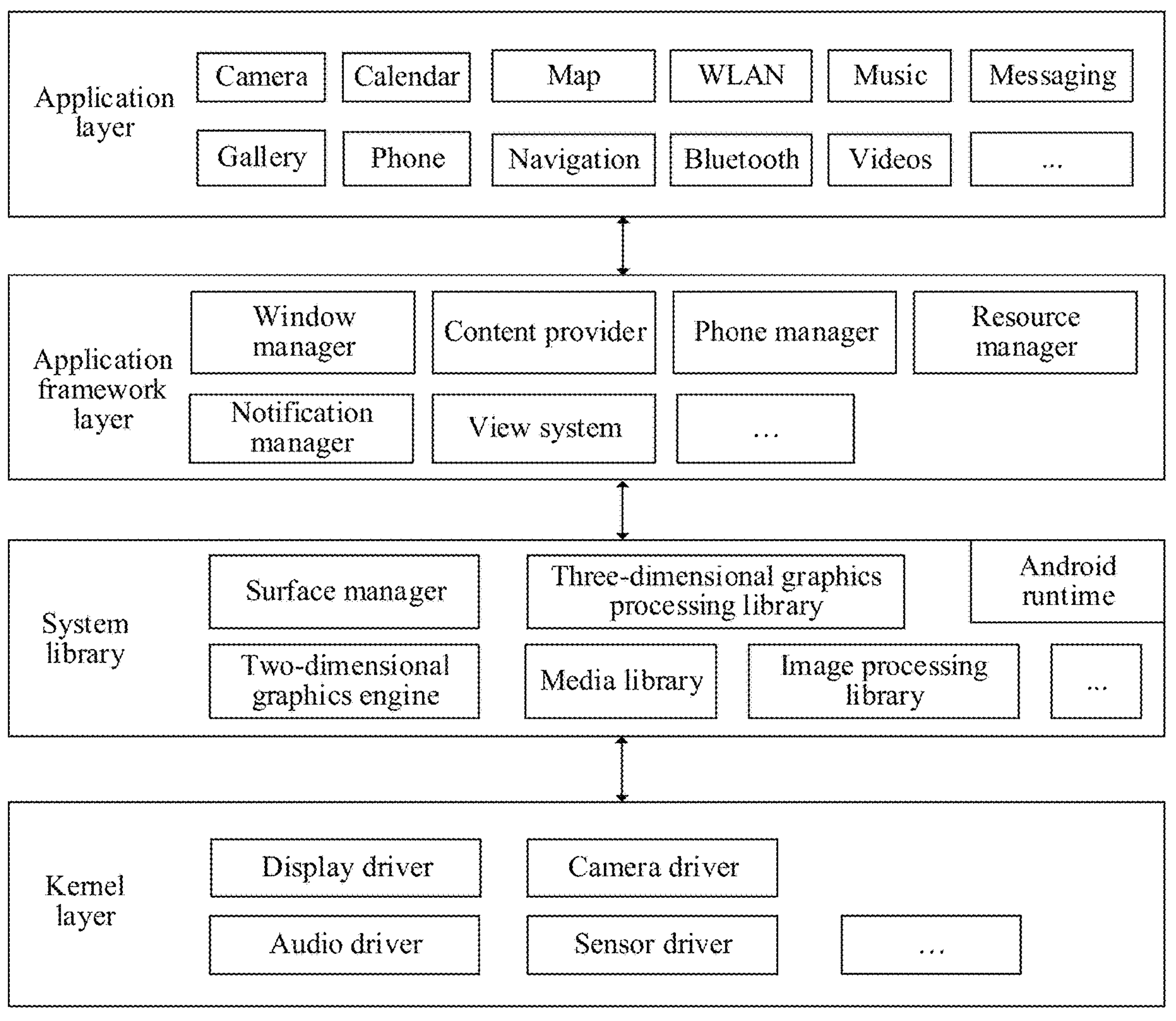
FIG. 6 is a block diagram of a software structure of an example of an electronic device according to an embodiment of this application.
Figure 7A:
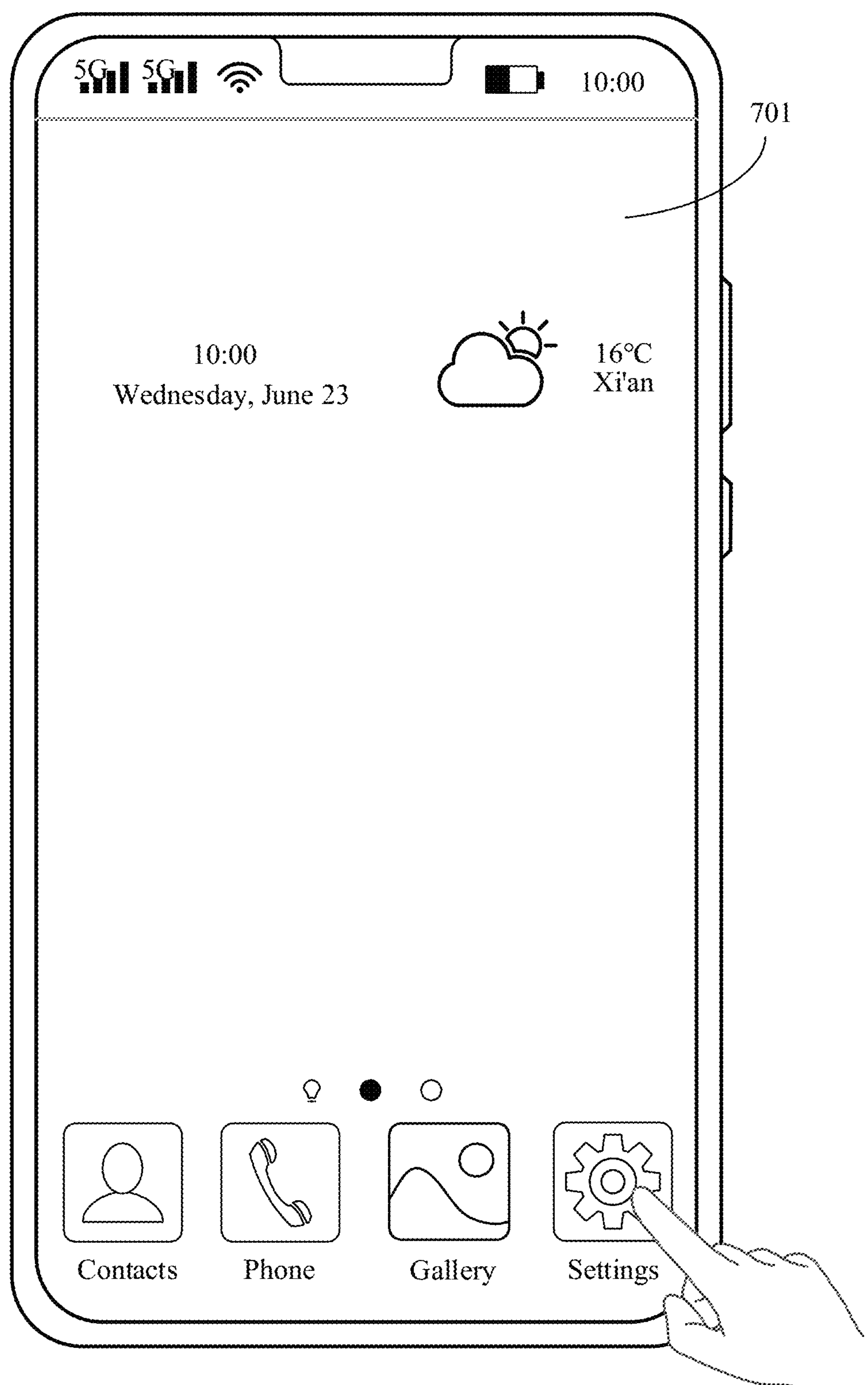
FIGS. 7(*a*) to 7(*i*) are schematic diagrams of examples in which a user sets a theme wallpaper of a mobile phone by using a settings application according to an embodiment of this application.
Figure 7B:
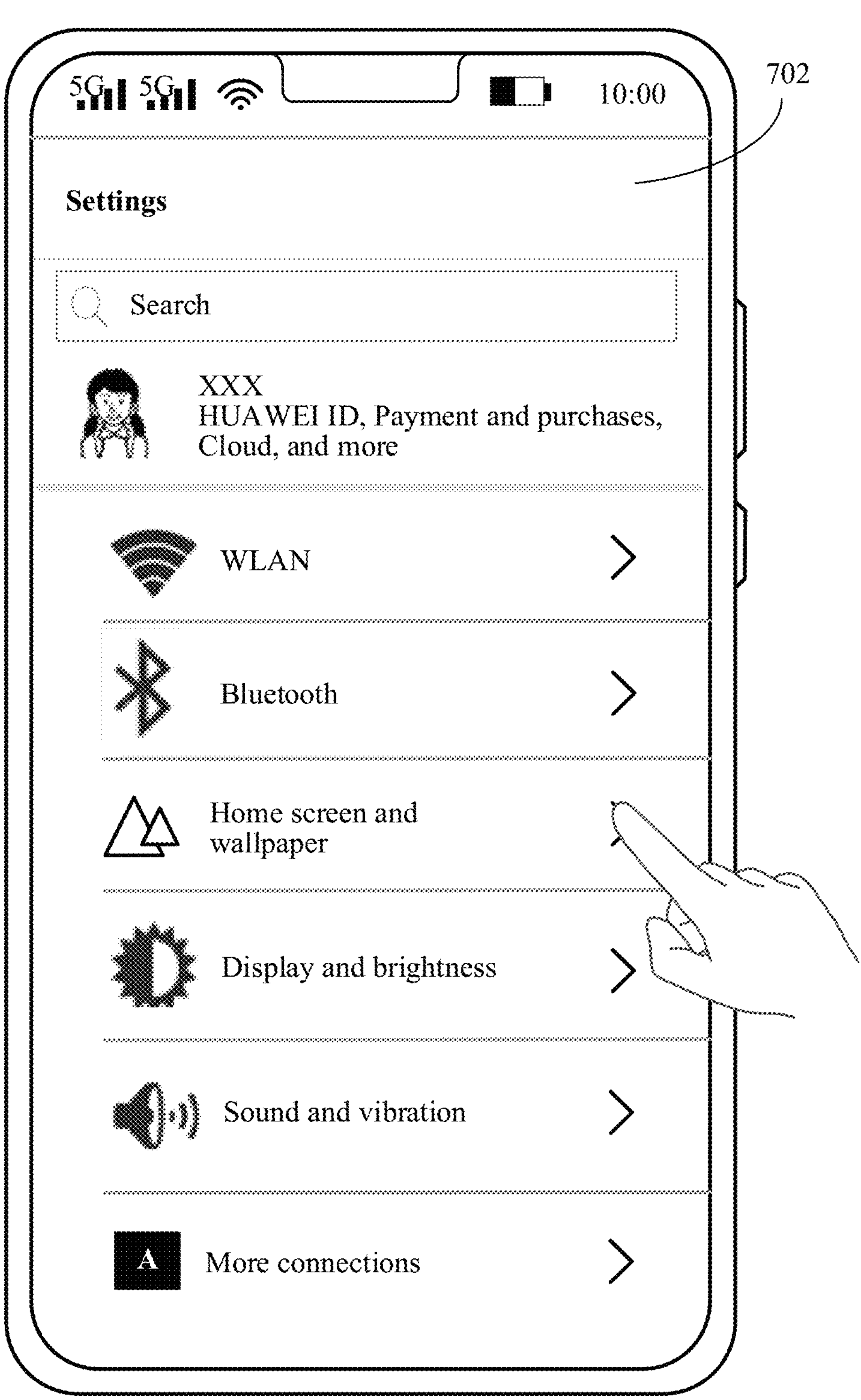
Figure 7C:
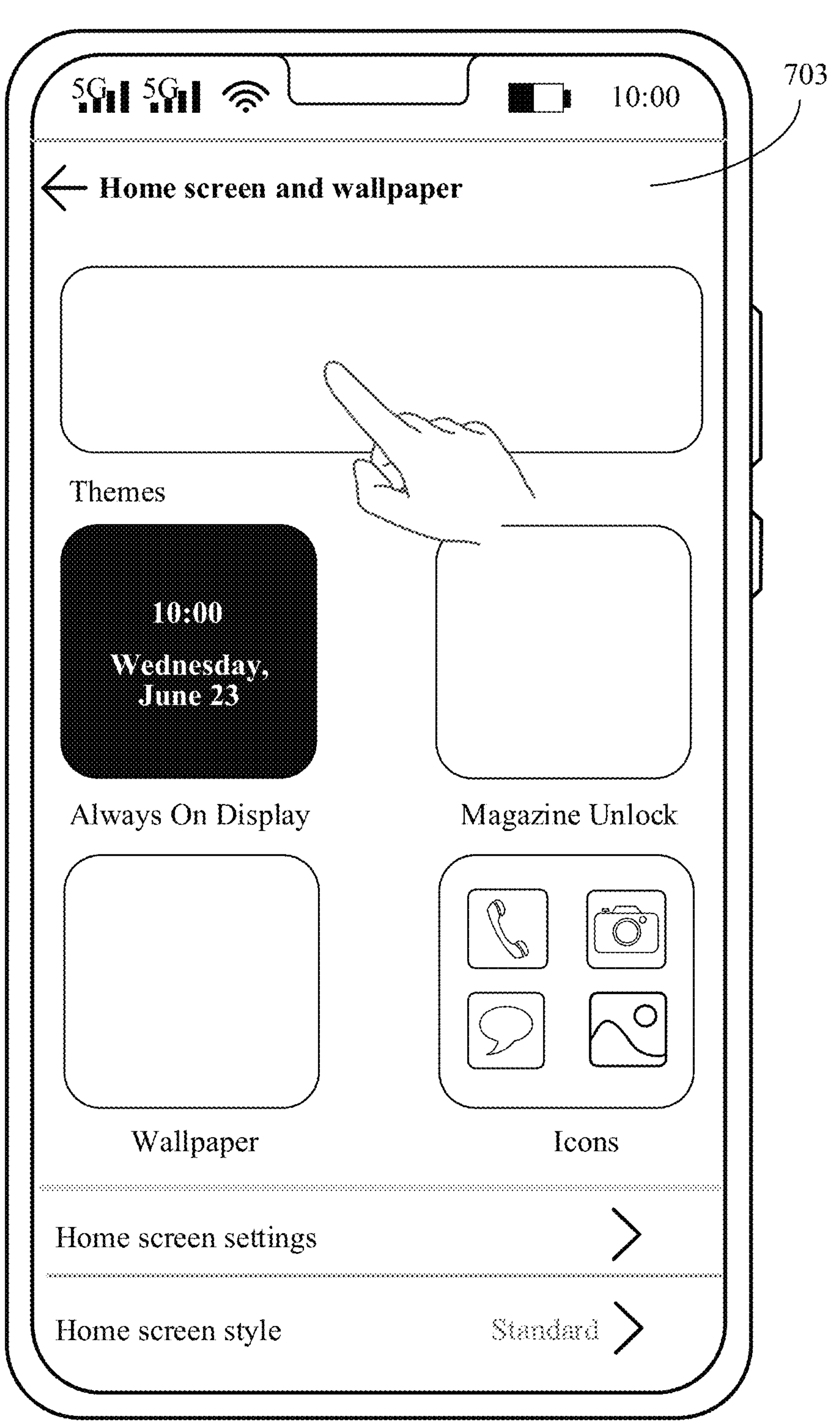
Figure 7D:
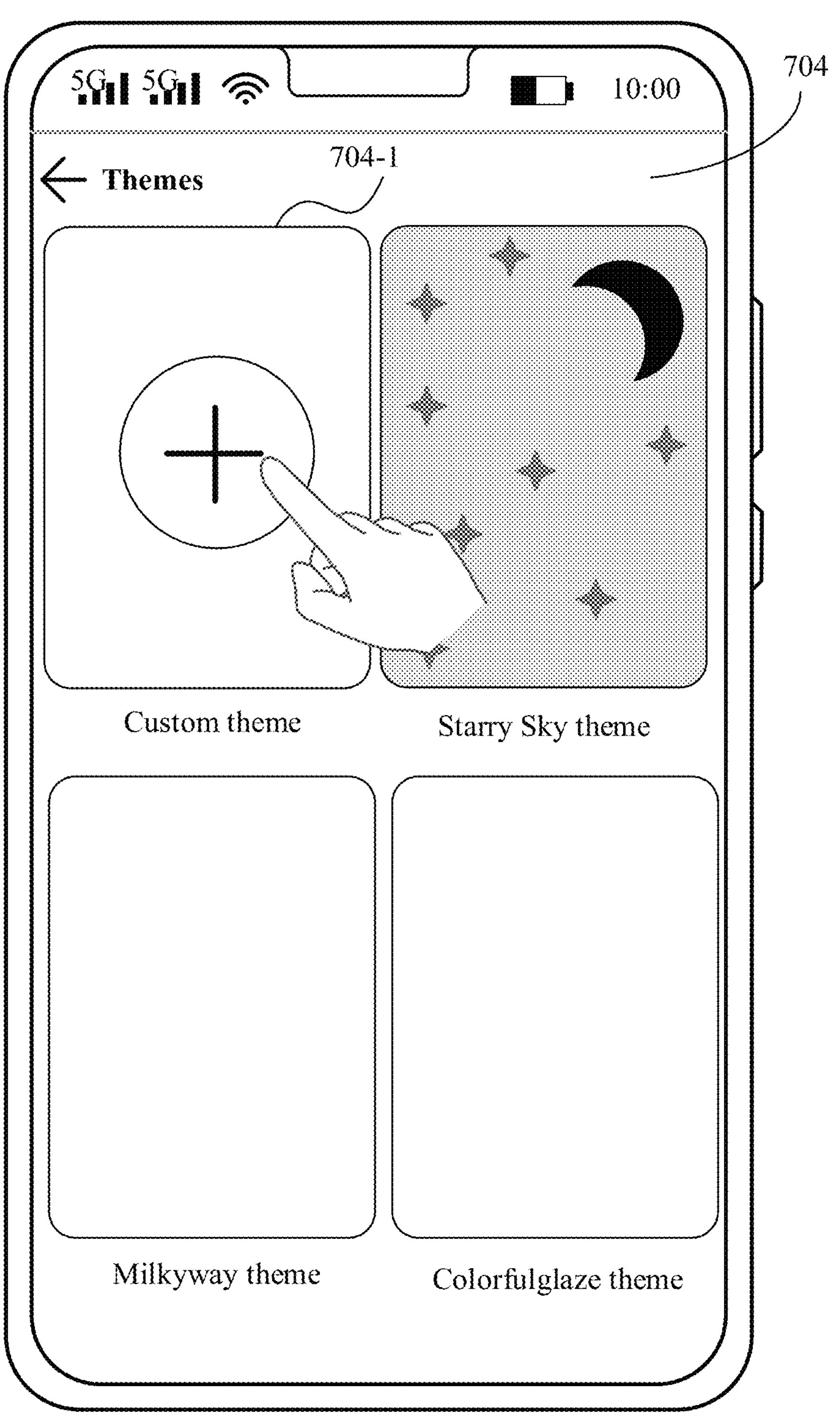
Figure 7E:
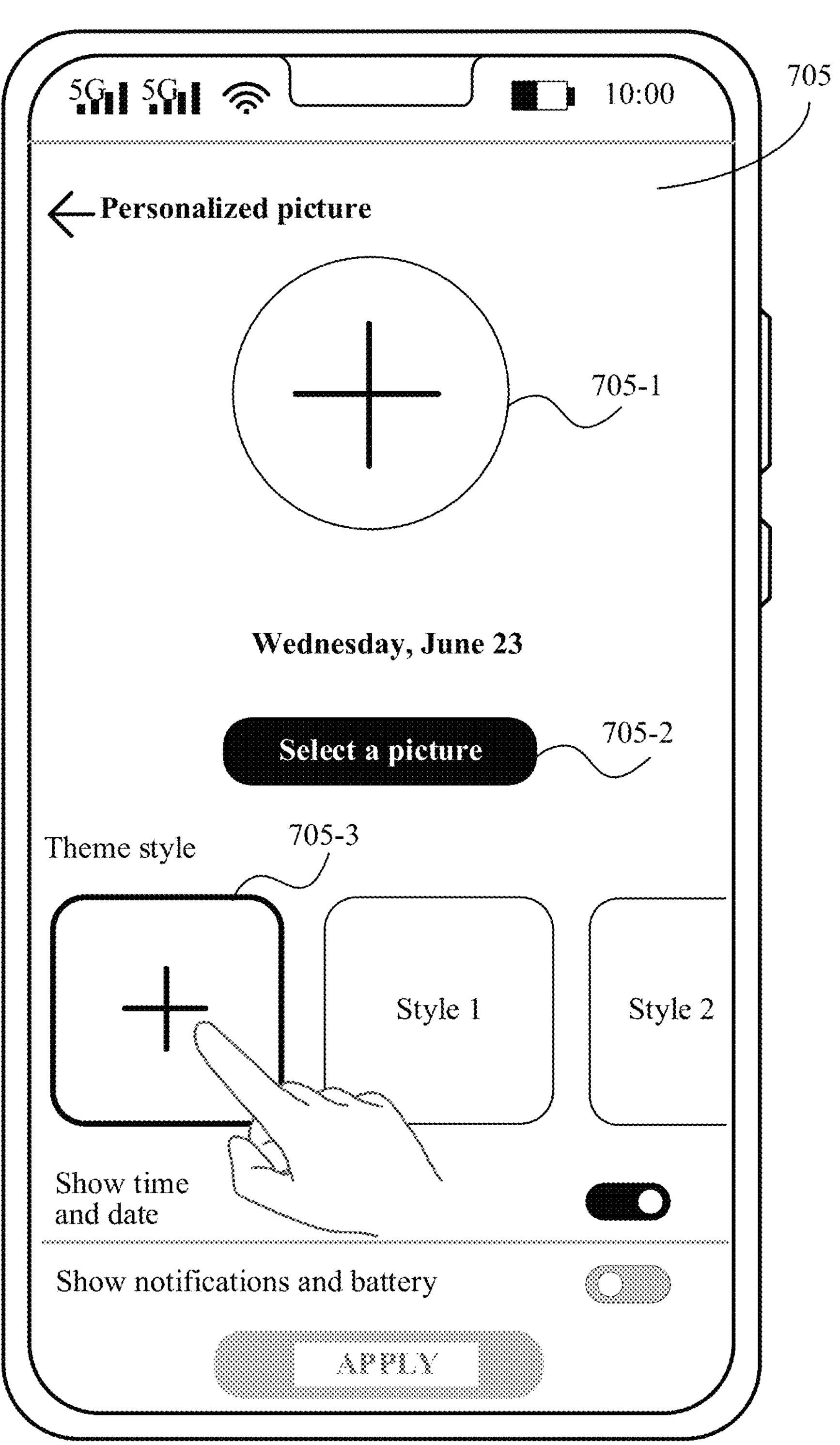
Figure 7F:
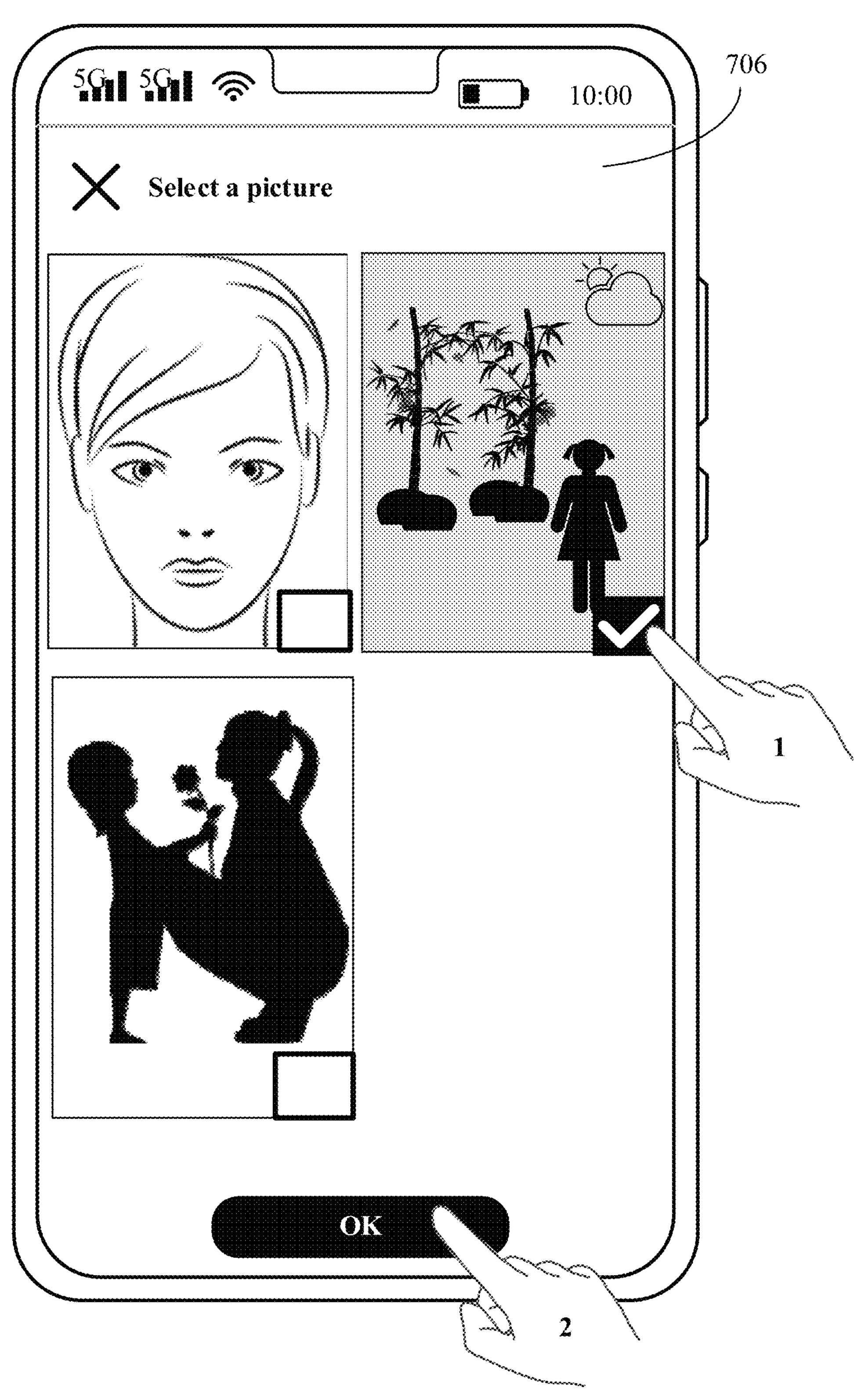
Figure 7G:
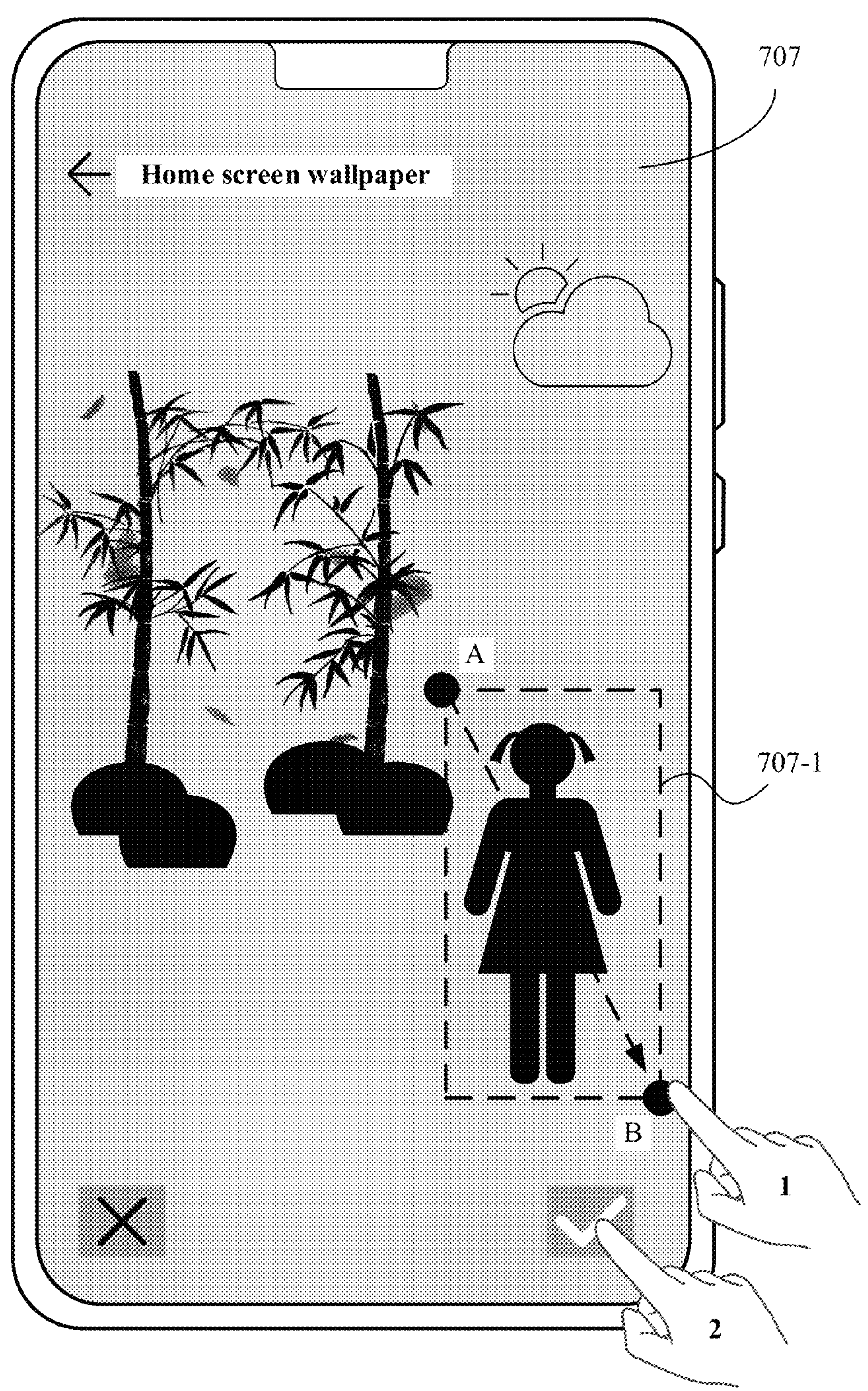
Figure 7H:
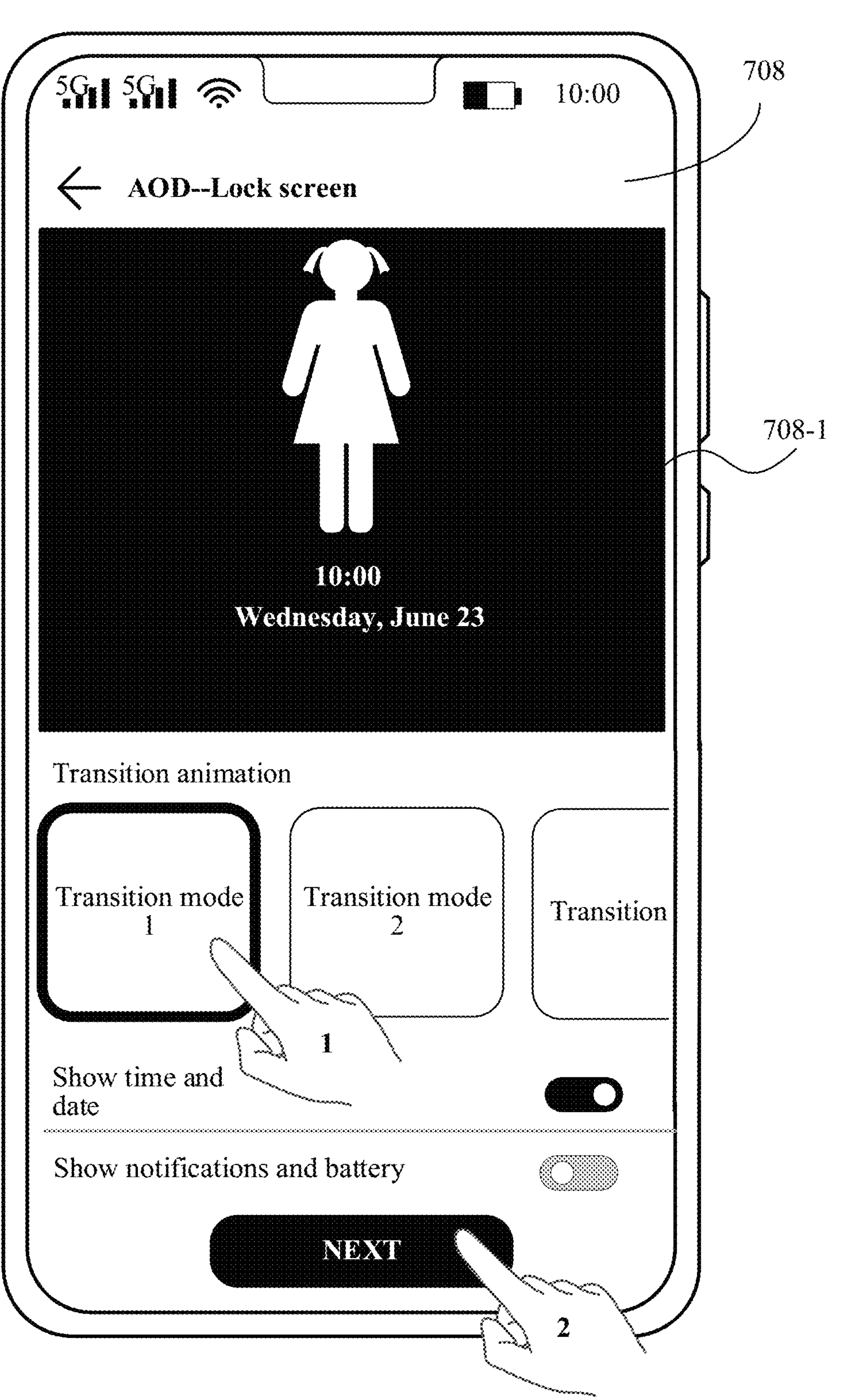
Figure 7I:
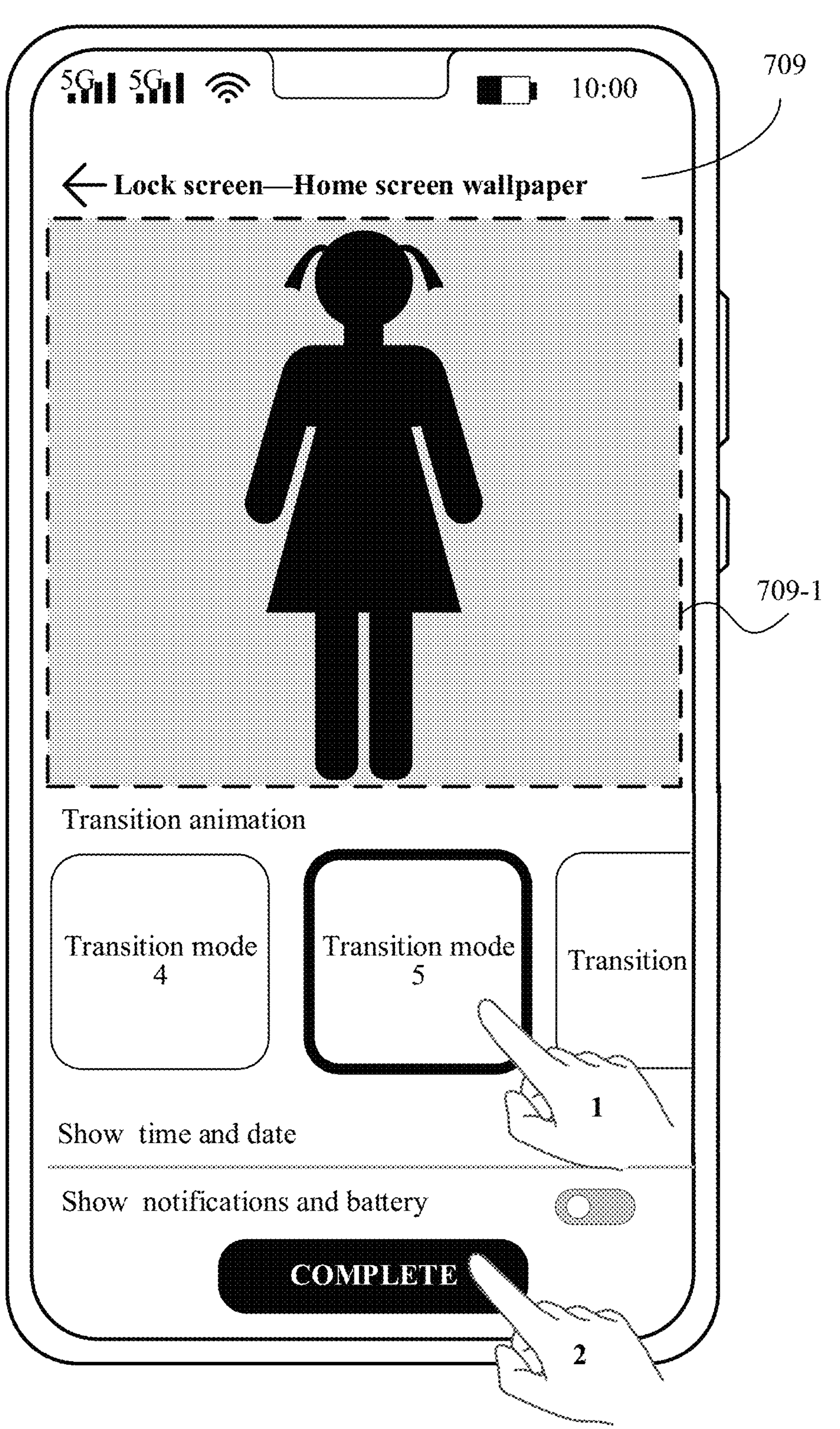
Figure 8A:
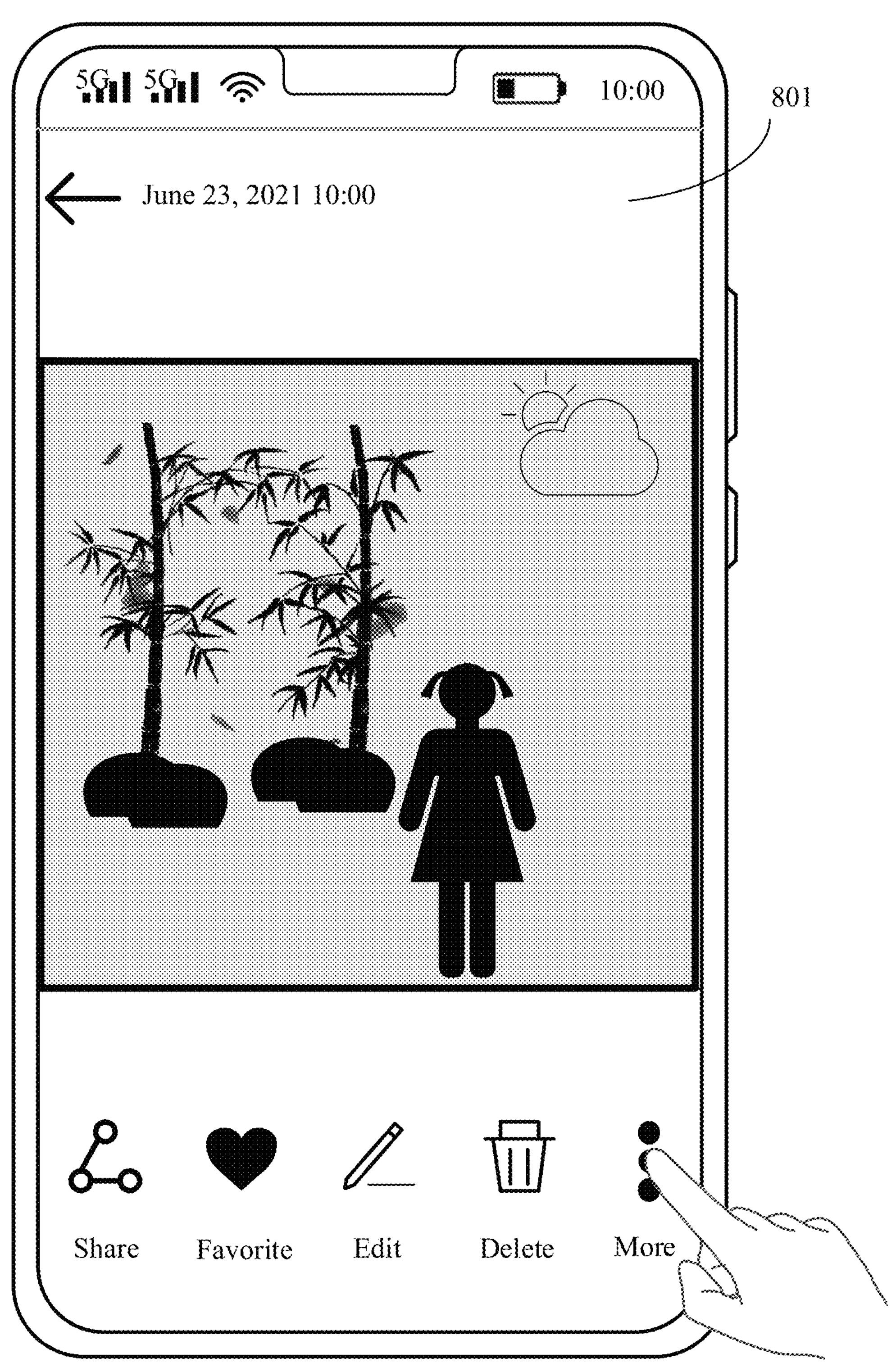
FIGS. 8(*a*) to 8(*f*) are schematic diagrams of other examples in which a user sets a theme wallpaper of a mobile phone by using a gallery application according to an embodiment of this application.
Figure 8B:
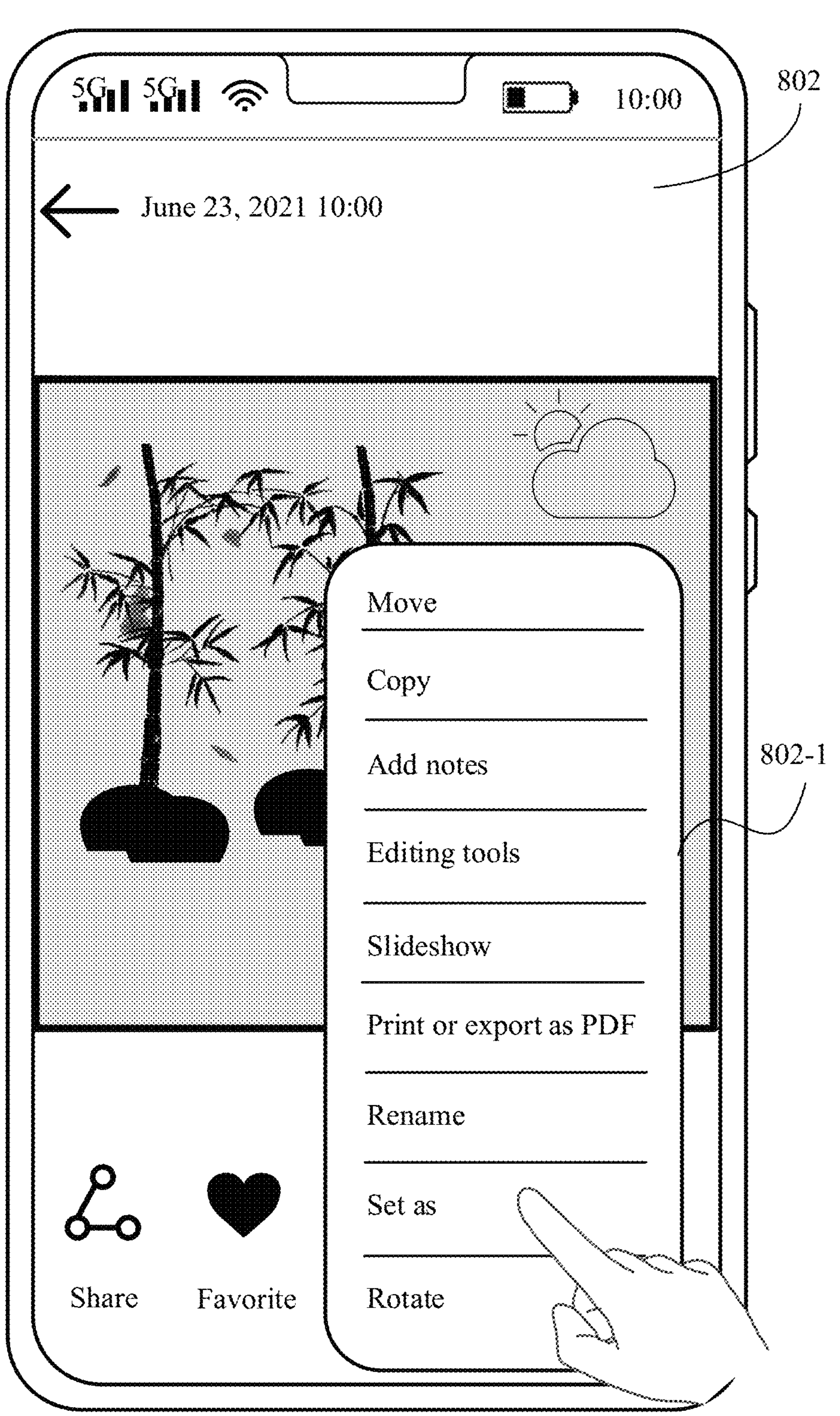
Figure 8C:
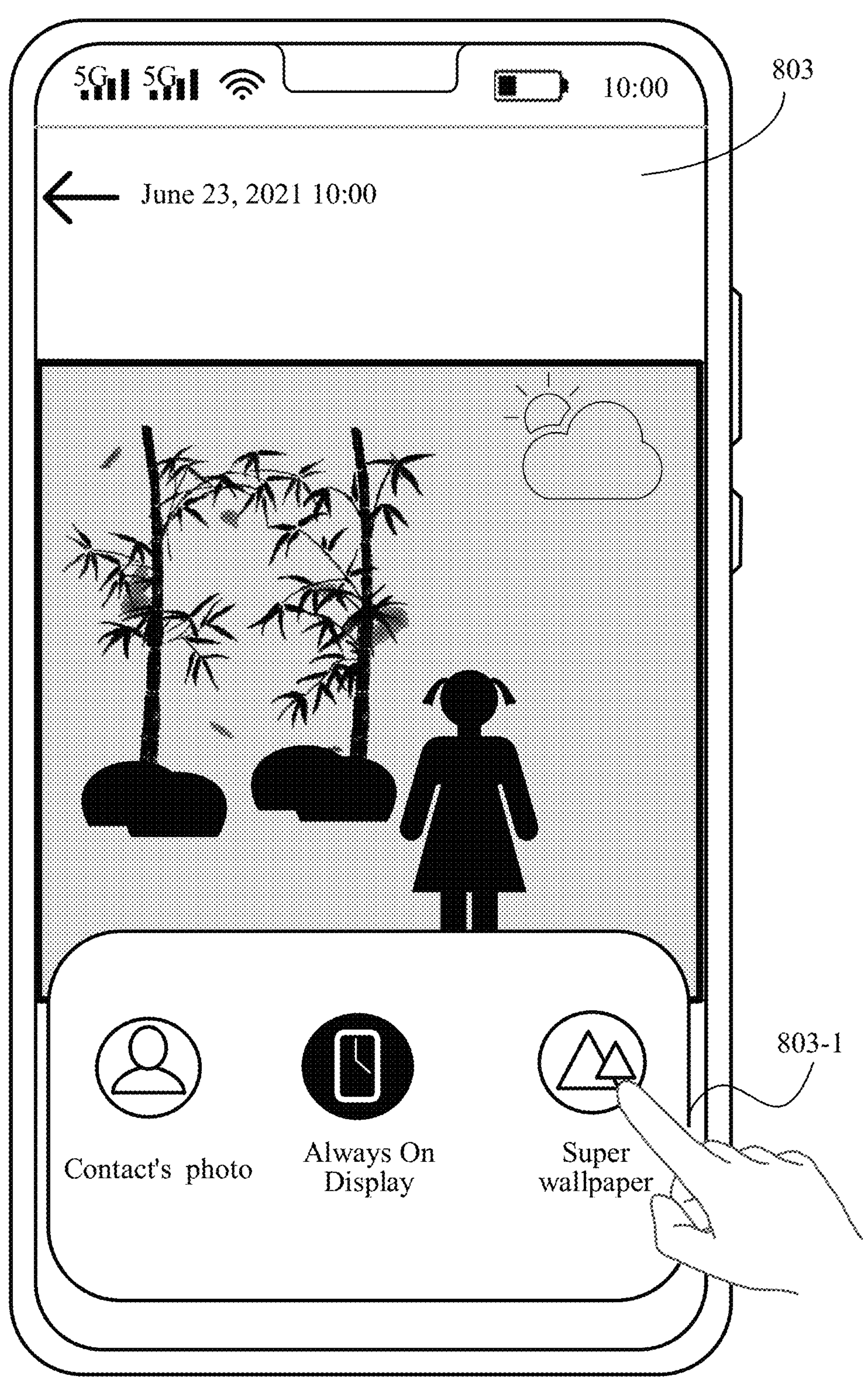
Figure 8D:
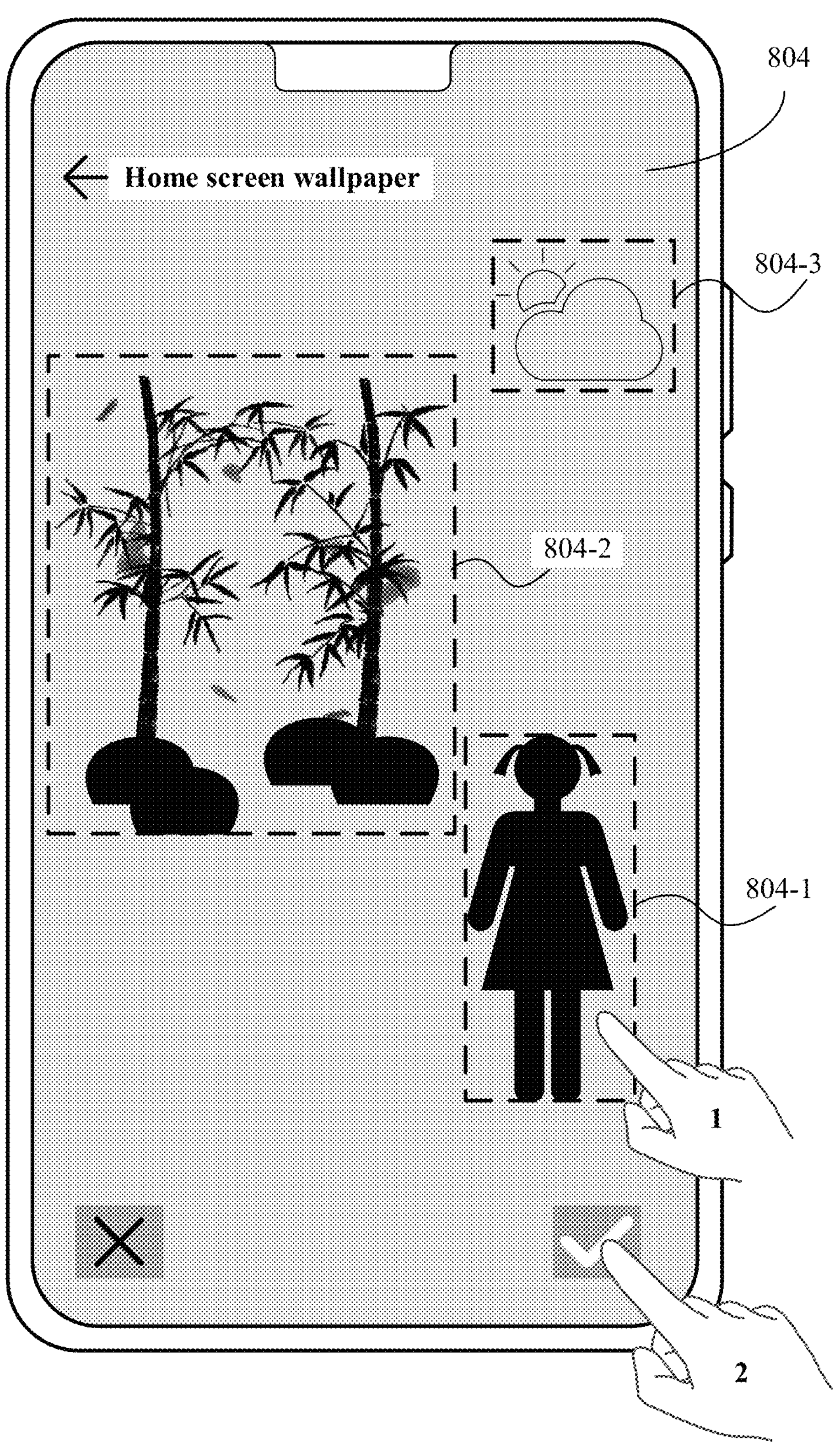
Figure 8E:
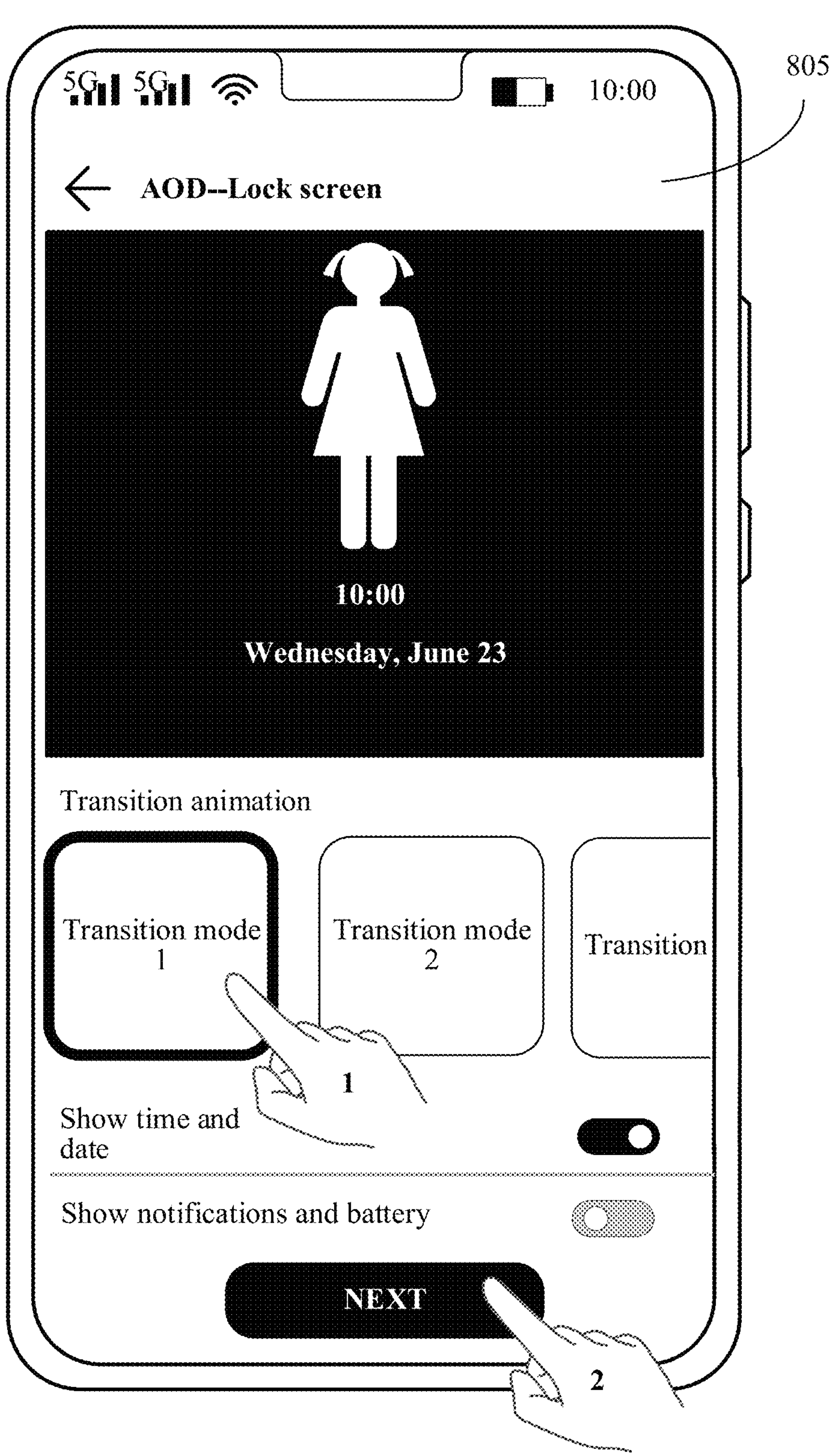
Figure 8F:
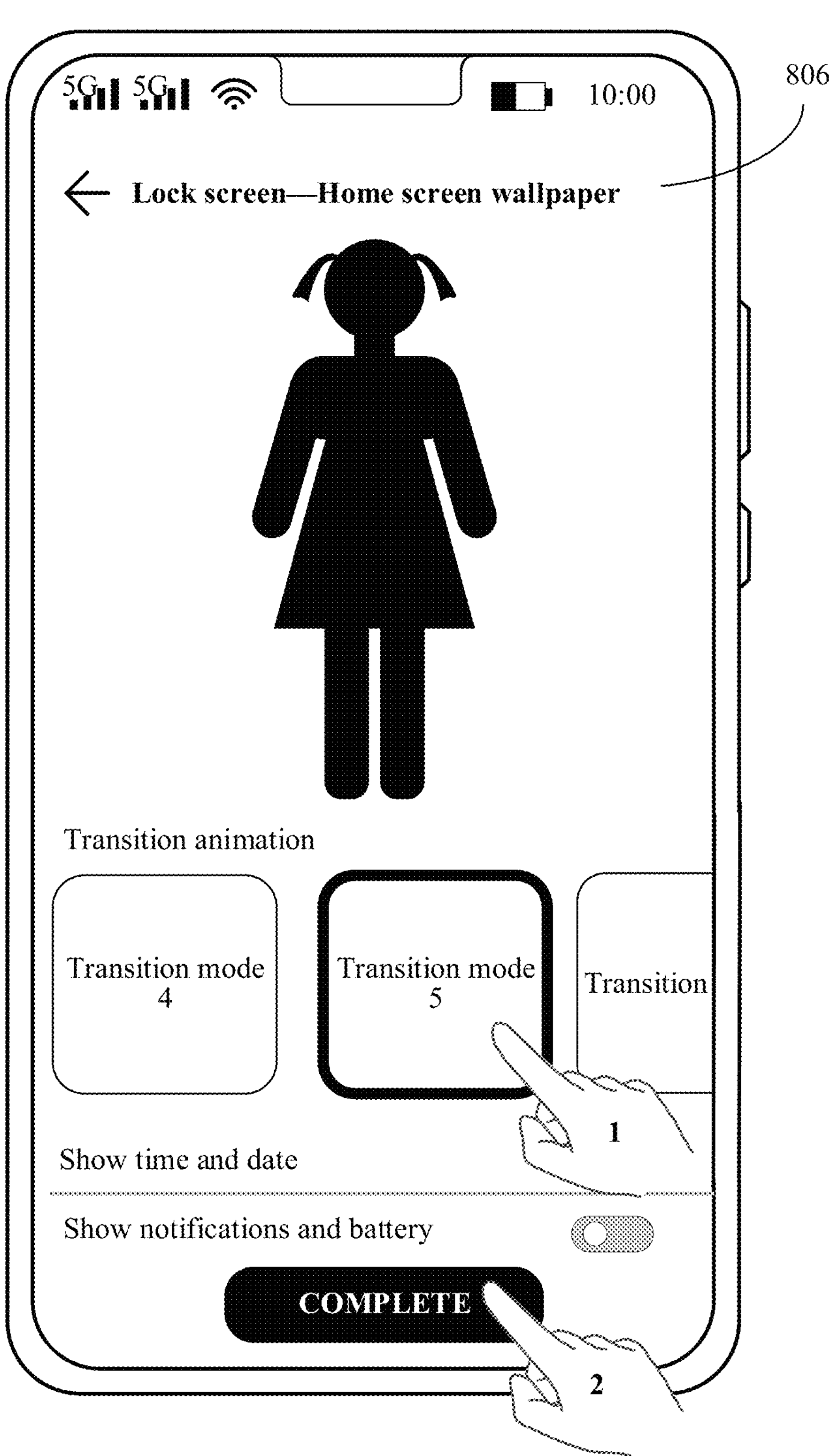
Figure 9A:
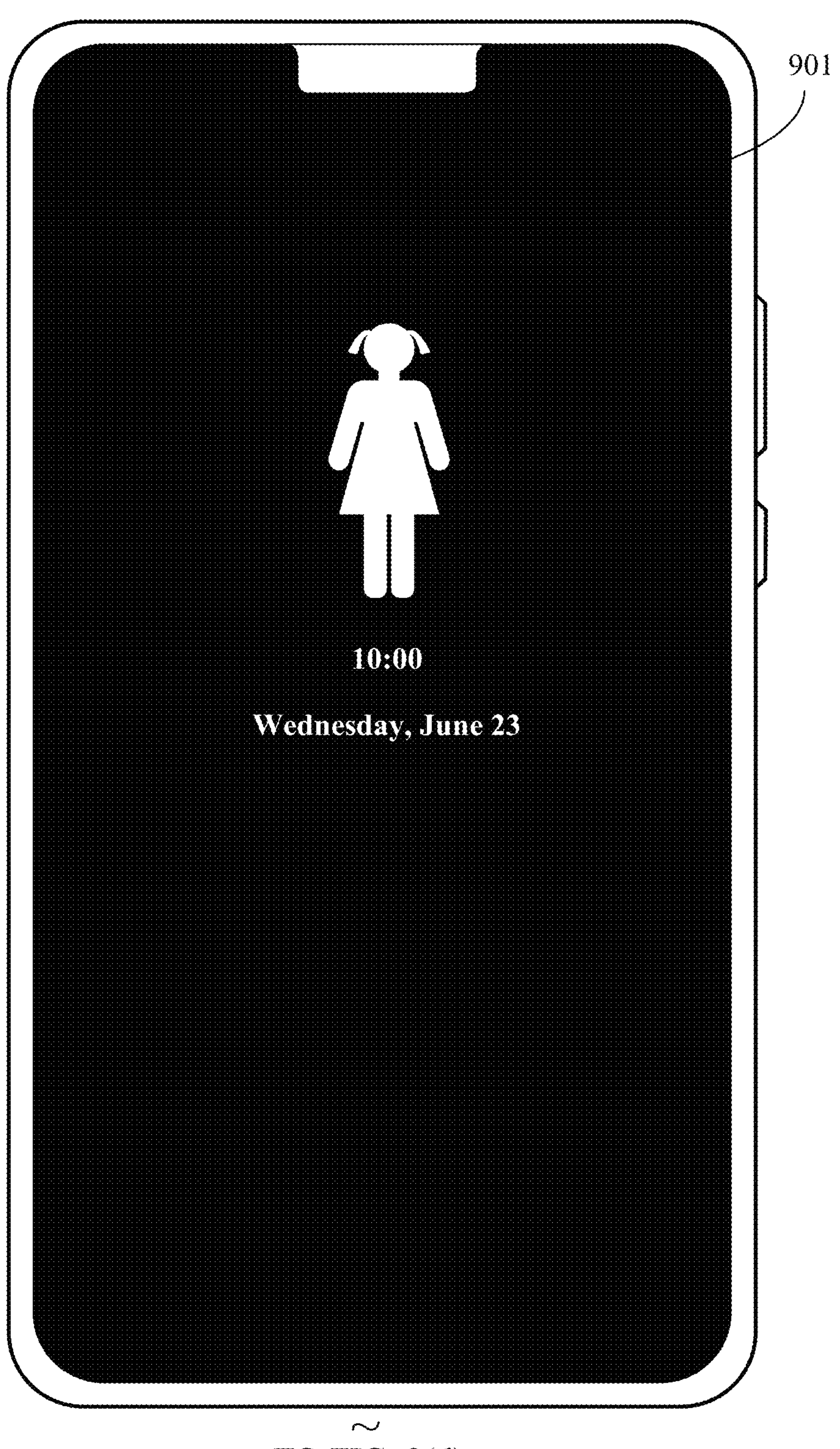
FIGS. 9(*a*) to 9(*f*) are schematic diagrams of examples of a presentation effect of a mobile phone from an always on display screen to an unlock interface according to an embodiment of this application.
Figure 9B:
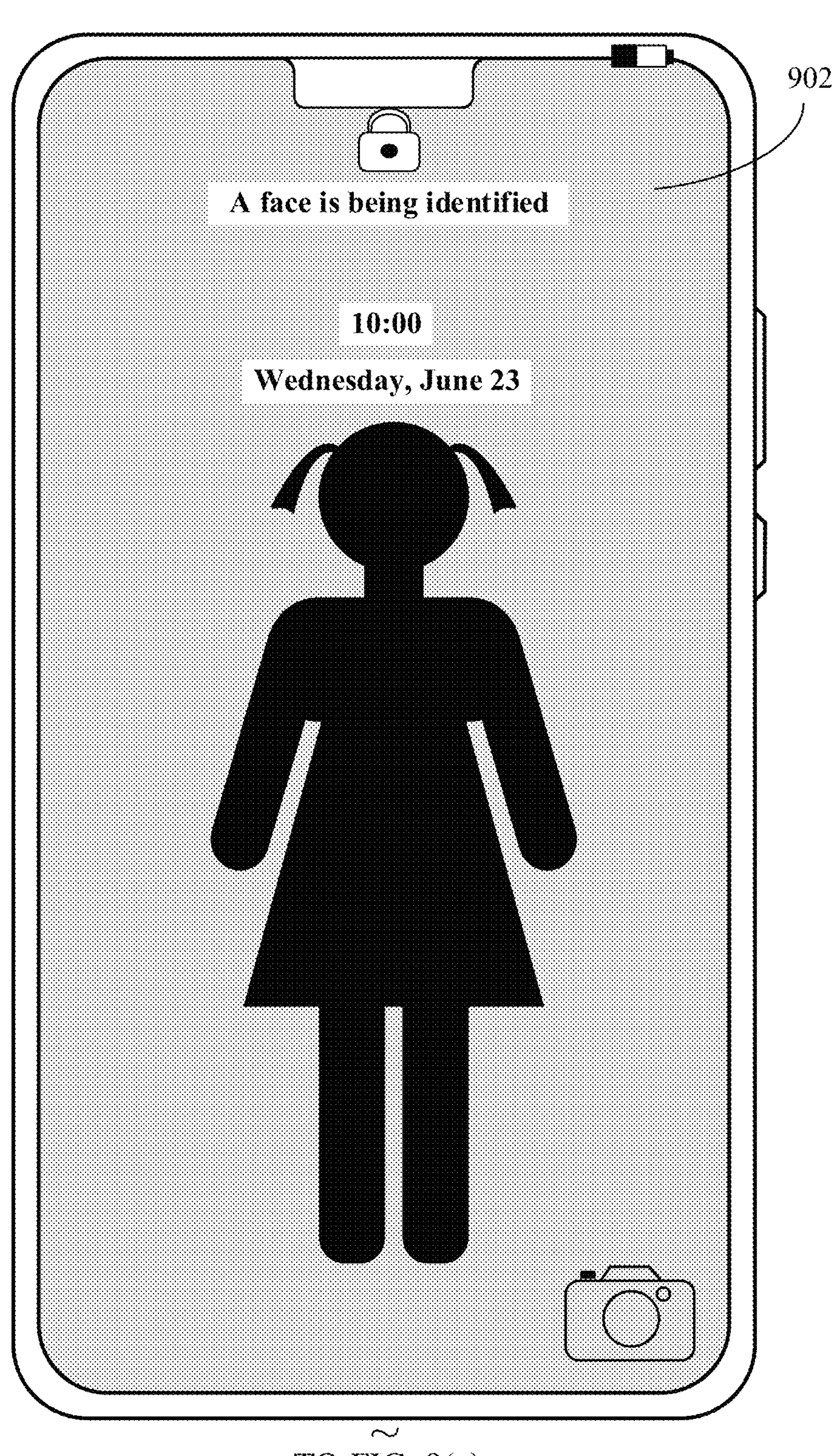
Figure 9C:
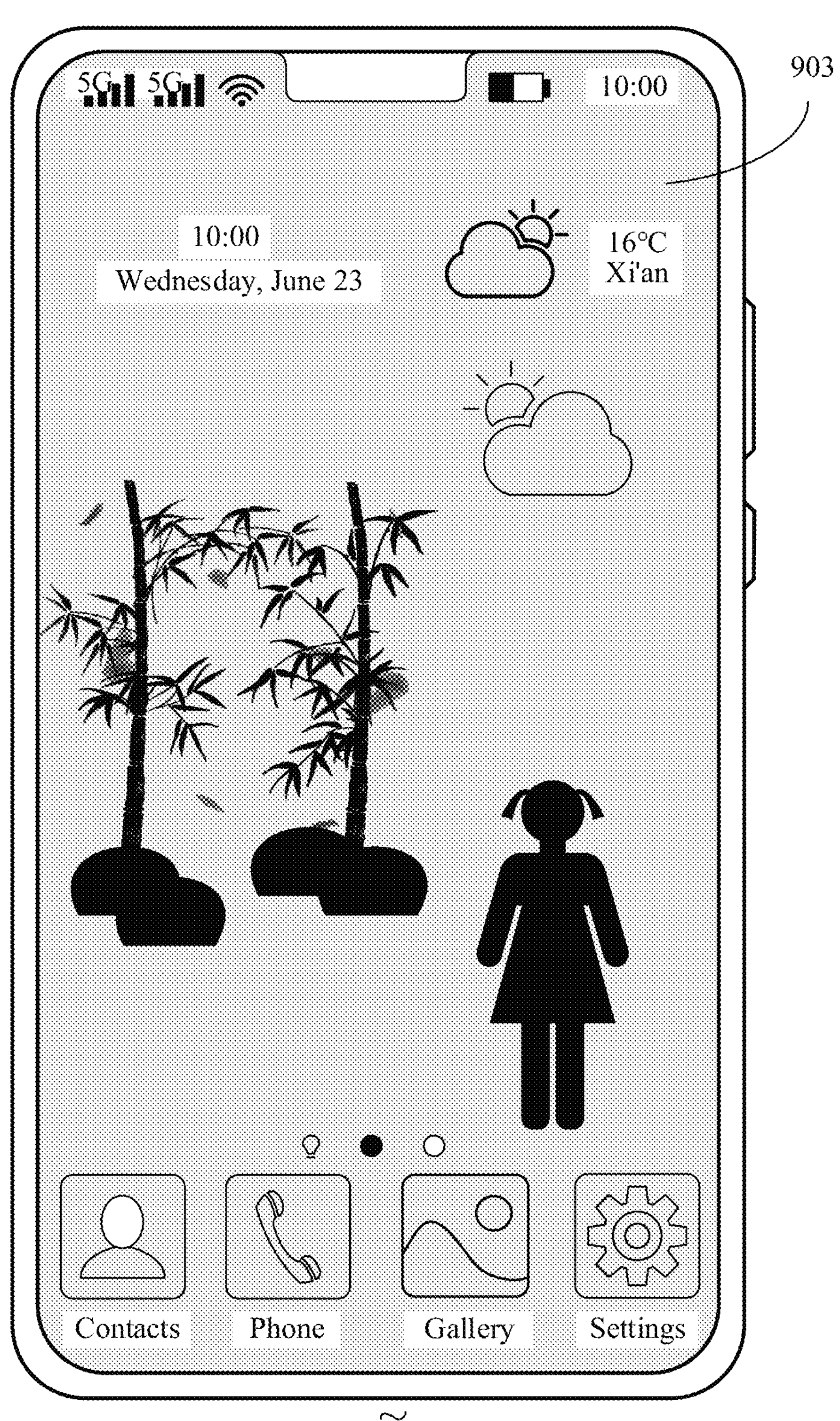
Figure 9D:
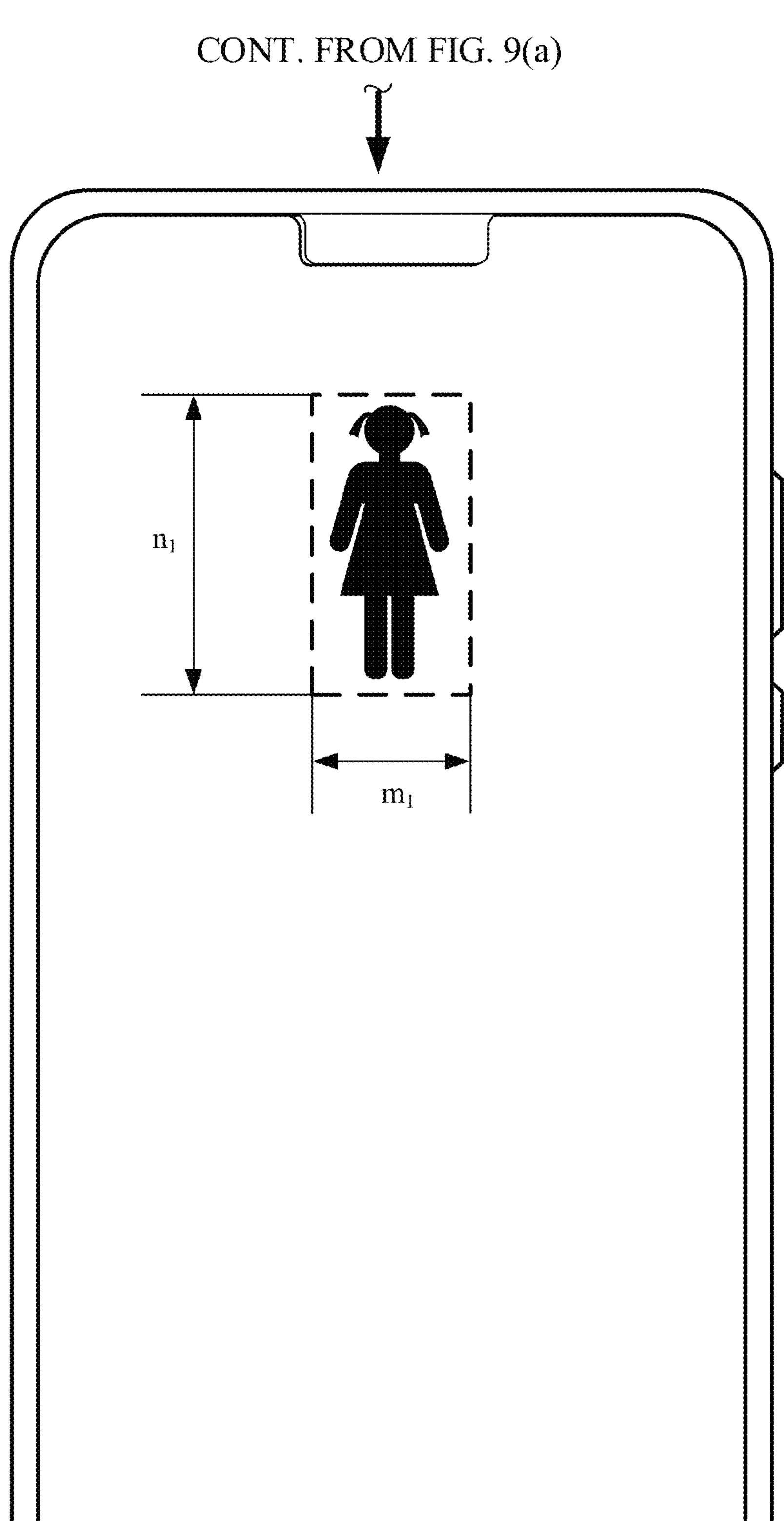
Figure 9E:
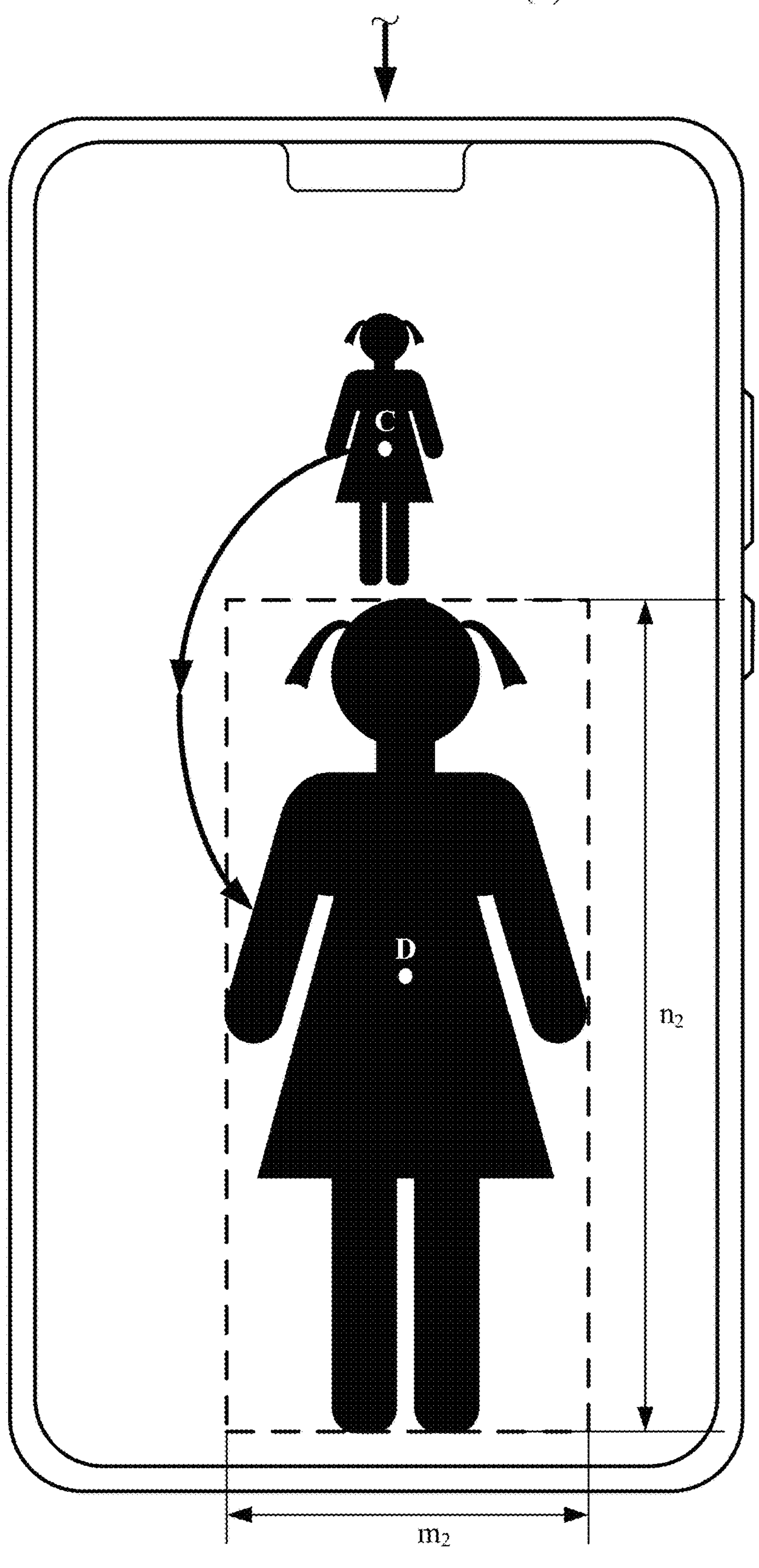
Figure 9F:
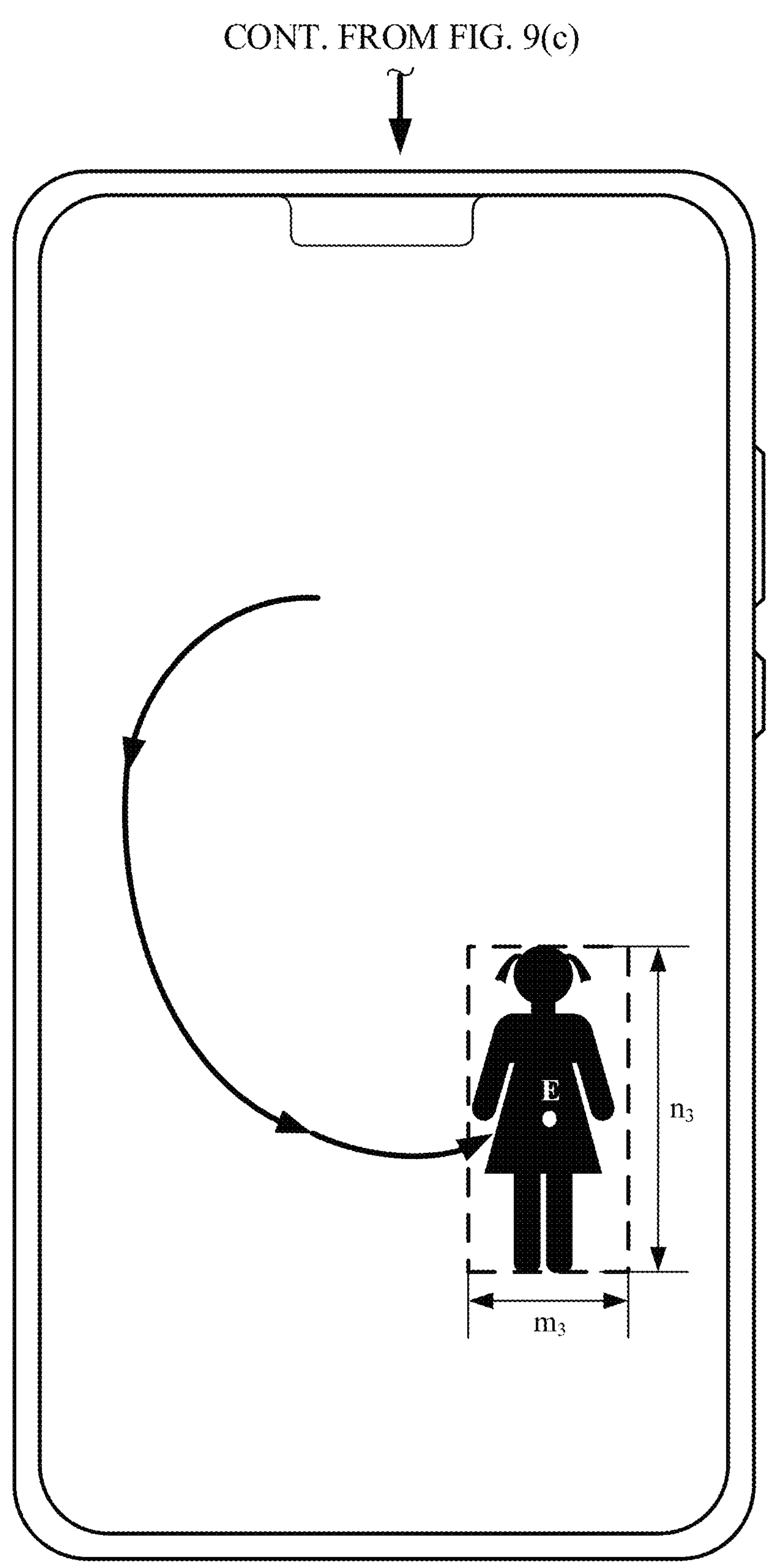

FIG. 6 is a block diagram of a software structure of an example of the electronic device 100 according to an embodiment of this application. The software is divided into several layers in a hierarchical architecture, and each layer has a clear role and responsibility. Layers communicate with each other through a software interface. In some embodiments, the Android® system is divided into four layers: an application layer, an application framework layer, an Android runtime (Android® runtime) and system library, and a kernel layer from top to bottom. The application layer may include a series of application packages.

As shown in FIG. 6, the application packages may include applications such as Camera, Gallery, Calendar, Phone, Map, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 6, the application framework layer may include a window manager, a content provider, a view system, a phone manager, a resource manager, a notification manager, and the like.

The window manager is configured to manage a window program. The window manager may obtain a size of a display, determine whether a screen has a status bar, or participate in performing operations such as screen locking and screen capturing.

The content provider is configured to: store and obtain data, and enable the data to be accessed by an application program. The stored data may include video data, image data, audio data, and the like, and may further include data such as call record data of dialing and answering, a browsing history of a user, and a bookmark. Details are not described herein again.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the electronic device 100, for example, management of a call status (including call connection and hang-up).

The resource manager provides various resources for an application, such as a localized character string, an icon, an image, a layout file, and a video file.

The notification manager enables an application program to display notification information in the status bar of the screen, and may be configured to transfer a message to the user.

The notification information may automatically disappear after the status bar stays for a short time, and the user does not need to perform an interaction process such as a close operation. For example, the notification manager may notify the user of a message such as download completion. The notification manager may alternatively be a notification appearing on the status bar on top of a system in a form of a chart or text in a scroll bar, for example, a notification of an application running in a background. Alternatively, the notification manager may be a notification appearing on a screen in a form of a dialog window, for example, prompting text information on the status bar. Alternatively, the notification manager may control the electronic device to make an alert tone, vibration of the electronic device, or blink of an indicator of the electronic device. Details are not described herein again.

The Android® runtime includes a kernel library and a virtual machine. The Android® runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to perform functions such as life cycle management, stack management, thread management, security and exception management, and garbage collection of an object.

The system library may include a plurality of function modules, such as a surface manager (surface manager), a media library (media library), a three-dimensional (three-dimensional, 3D) graphics processing library (for example, OpenGL ES), a two-dimensional (two-dimensional, 2D) graphics engine, and an image processing library.

The surface manager is configured to manage a display subsystem of the electronic device, and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, a mobile phone having the structures shown in FIGS. 5 and 6 is used as an example to describe in detail, with reference to the accompanying drawings and application scenarios, a theme wallpaper generation process provided in embodiments of this application.

In a possible implementation, the user may set a rule and a dynamic change effect for switching from the always on display screen to the lock screen interface and then to the unlock interface of the mobile phone by using a settings application.

FIGS. 7(*a*) to 7(*i*) are schematic diagrams of examples in which a user sets a theme wallpaper of a mobile phone by using a settings application according to an embodiment of this application.

For example, the user may sequentially perform operations shown in FIG. 7(*a*), FIG. 7(*b*), and FIG. 7(*c*). In response to the operations of the user, the mobile phone displays a themes interface 704 shown in FIG. 7(*d*). For this process, refer to related descriptions in FIGS. 3(*a*) to 3(*e*). For brevity, details are not described herein again.

Optionally, as shown in FIG. 7(*d*), the themes interface 704 may display a custom theme control 704-1, and a plurality of preset theme controls such as a starry sky theme, a milky way theme, and a colorful glaze theme. The custom theme control 704-1 may provide, for the user, an operation portal for adding a custom theme, and the user may add a custom theme wallpaper to a system by using the custom theme control 704-1.

For example, the user performs an operation shown in FIG. 7(*d*), to be specific, taps the custom theme control 704-1 on the themes interface 704. In response to the tap operation of the user, the mobile phone displays an interface 705 shown in FIG. 7(*e*). The interface 705 may include a control 705-1, a theme style selection area, a "show time and date" switch, a "show notifications and battery" switch, and the like.

Optionally, the interface 705 may further include a control 705-2, and the theme style selection area may include a control 705-3. The user may tap any one of the control 705-1, the control 705-2, and the control 705-3, to trigger the mobile phone to display a picture selection interface 706 shown in FIG. 7(*f*). This is not limited in this embodiment of this application.

For example, the user performs an operation shown in FIG. 7(*e*), to be specific, the user taps the control 705-3. In response to the tap operation of the user, the mobile phone displays a picture selection interface 706 shown in FIG. 7(*f*). The interface 706 may display a picture list, and the picture list may include one or more pictures.

Optionally, a picture included in the picture list may be from a local gallery of the mobile phone, or may be requested from another electronic device, a server, or the like in another manner. A source of one or more pictures included in the picture list is not limited in this embodiment of this application.

The user may click a selection box of any picture in the picture list. In this embodiment of this application, a picture selected by the user is referred to as a "target picture". It is assumed that display content (or referred to as a "display element", a "main element", or the like) of the target picture includes a bamboo forest, a sun and cloud, and a little girl.

It should be understood that, in this embodiment of this application, after selecting the "target picture", the user may generate an always on display screen, a lock screen interface, and an unlock interface of the mobile phone based on the "target picture". Specifically, a part or all of a display area of the "target picture" may be displayed on the always on display screen of the mobile phone, and the part or all of the display area of the "target picture" may further be used as a wallpaper of the lock screen interface and a wallpaper of the unlock interface. In other words, a new theme wallpaper may be generated for the mobile phone based on the "target picture" selected by the user.

Optionally, a part or all of a display area that is on the always on display screen of the mobile phone and in which the "target picture" is displayed and a part or all of a display area displayed when the "target picture" is used as the wallpaper of the lock screen interface (or the wallpaper of the unlock interface) may be different areas, or may be a same area. In other words, content that is of the "target picture" and that is displayed on the always on display screen of the mobile phone may be the same as or different from content displayed when the "target picture" is used as the wallpaper of the lock screen interface (or the wallpaper of the unlock interface).

Correspondingly, the part or all of the display area displayed when the "target picture" is used as the wallpaper of the lock screen interface and the part or all of the display area displayed when the "target picture" is used as the wallpaper of the unlock interface may be different areas, or may be a same area. In other words, content displayed when the "target picture" is used as the wallpaper of the lock screen interface may be the same as or different from content displayed when the "target picture" is used as the wallpaper of the unlock interface.

It should be further understood that the part or all of the display area of the "target picture" displayed on the lock screen interface is the "wallpaper of the lock screen interface", and the part or all of the display area of the "target picture" displayed on the unlock interface is the "wallpaper of the unlock interface". Optionally, the user may adjust, by using different operations, the display area of the "target picture" displayed on the always on display screen of the mobile phone, the display area that is when the "target picture" is used as the wallpaper of the lock screen interface, or the display area that is when the "target picture" is used as the wallpaper of the unlock interface.

For example, when the user performs an operation 1 shown in FIG. 7(*f*), to be specific, taps and selects a selection box of the target picture, and performs an operation 2 shown in FIG. 7(*f*), to be specific, taps an "OK" option, in response to the operations of the user, the mobile phone displays an interface 707 shown in FIG. 7(*g*).

It should be understood that, the interface 707 may also be referred to as a "wallpaper preview window of the unlock interface", and may display, for the user, a preview effect when the target picture is used as the wallpaper of the unlock interface after the mobile phone is unlocked. That is, the user may preview, by using the interface 707, the display area that is when the target picture is used as the wallpaper of the unlock interface, that is, preview and view content displayed when the target picture is used as the wallpaper of the unlock interface. For example, the display content of the interface 707 includes: a bamboo forest, a sun and cloud, and a little girl. Optionally, the user may tap any position on the interface 707 (or the target picture), and perform operations of sliding left (moving left) and sliding right (moving right), to adjust the display area of the wallpaper of the unlock interface. For example, the user may adjust a position of the target picture, so that display content (for example, a bamboo forest, a sun and cloud, or a little girl) in the target picture may be located in a central display area of the screen.

Alternatively, the user may perform an operation of selection and pinching with two fingers or selection and expanding with two fingers, to zoom out or zoom in on the target picture, to adjust a display area on the target picture when the target picture is used as the wallpaper of the unlock interface.

Alternatively, the user may perform an operation of selection and rotation with two fingers, changing a placement angle of the target picture, or the like. This is not limited in this embodiment of this application.

In a possible implementation, after adjusting the display area of the target picture, that is, after determining the display content of the target picture, the user may manually select, from the display content of the target picture, a target element to be presented on the always on display screen to the user.

Optionally, the user may determine the target element on the always on display screen by using a sliding track of a finger. The target element may include one or more elements. This is not limited in this embodiment of this application.

For example, the user may perform an operation 1 shown in FIG. 7(*g*). To be specific, the user taps a point A, uses the point A as a sliding start point, and slides to a point B along a direction indicated by a dashed line with an arrow. In response to the slide operation of the user, the mobile phone may automatically display a dashed-line box 707-1 on the interface 707 based on a sliding track A-B. An element included in the dashed-line box 707-1 is used as the target element of the always on display screen.

Optionally, after the dashed-line box 707-1 is automatically displayed on the interface 707, the user may perform an operation 2 shown in FIG. 7(*g*), to be specific, the user taps a "V (tick)" option. In response to the tap operation of the user, the mobile phone may be triggered to detect and identify an element included in the dashed-line box 707-1, perform image cropping processing on an identified target element, capture only the target element in the dashed-line box 707-1, and display the target element on the always on display screen.

It should be understood that the dashed-line box 707-1 determined by the sliding track A-B of the user may include one or more elements. The mobile phone may select one element from the dashed-line box 707-1 as the target element, or may simultaneously use a plurality of elements as the target element. This is not limited in this embodiment of this application.

Optionally, the mobile phone may determine the target element from the one or more elements according to a plurality of possible preset rules. For example, the preset rules may include any one or more of the following:

(1) The "target element" may be an owner user of the mobile phone. For example, when it is detected that the "target picture" includes facial information, whether the user is an owner user is determined based on the facial information. If the "target picture" includes the owner user, the owner user may be determined as the target element, and a display position of the dashed-line box 707-1 is determined based on a display area of the owner user. The mobile phone may determine, as the owner user, a user corresponding to the facial information that is entered by the user and that is for unlocking and identity verification.

(2) The "target element" may be fixed content set by the user. For example, the user sets the "target element" as a character. When the mobile phone detects that the target picture includes a plurality of types such as a character, an animal, and a plant, the mobile phone may determine the character as the "target element".

(3) The "target element" may be content that repeatedly appears most frequently in one or more pictures stored on the mobile phone.

For example, the mobile phone detects that a pet of the user repeatedly appears most frequently in N pictures stored in a local gallery. If it is detected that the target picture includes the pet of the user, the pet of the user is determined as the "target element".

Alternatively, the mobile phone obtains facial features that appear in a plurality of albums such as a family album and a friend album in the local gallery, and sorts the facial features in descending order of occurrence times of each facial feature. When detecting that the target picture includes a plurality of characters, the mobile phone may query a quantity of occurrence times of the plurality of characters in the local gallery, determine a character that appears most frequently as the target element, and then determine the display position of the dashed-line box 707-1 based on a display area of the target element. For example, if the dashed-line box 707-1 includes two characters, the mobile phone detects that both the two characters are family members of the user, and may use both the two characters as the target element to perform image cropping processing. If the mobile phone detects that only one of the two characters is a family member of the user, the mobile phone may use the family member of the user as the target element, and perform image cropping processing only on the family member of the user. Specifically, the mobile phone may perform feature comparison with a photo (for example, facial information that may be included in a family album) in a local gallery, to determine whether the dashed-line box 707-1 includes a family member, a friend, and the like of the user. Details are not described herein again.

(4) The "target element" may be content that is marked or added to favorites by the user most frequently in one or more pictures stored on the mobile phone. For example, the mobile phone detects that, in N pictures stored in a local gallery, a pet of the user is included in all of a plurality of pictures marked or added to favorites by the user. If it is detected that the target picture includes the pet of the user, the pet of the user is determined as the "target element".

(5) The "target element" may be content with a highest display priority in a preset element set, where the preset element set includes one or more types of elements, and each type of element corresponds to a different display priority. For example, the user sets priorities of a character, an animal, a building, a plant, and the like in descending order. If priorities corresponding to a plurality of elements included in the target picture are detected, an element with a highest priority is determined as the "target element".

Optionally, the plurality of preset rules listed above may also correspond to different priority orders. For example, when the foregoing plurality of preset rules exist at the same time, the electronic device may preferentially determine the target element according to the rule in (1). When the rule in (1) does not meet a current scenario, the electronic device may determine the target element according to the rule in (2). The rest is deduced by analog. This is not limited in this embodiment of this application.

In the operation 2 shown in FIG. 7(*g*), after the user taps the "V (tick)" option and the mobile phone identifies that the target element selected by the user is the "little girl", the mobile phone may perform image cropping processing on the target element "little girl", and display an interface 708 shown in FIG. 7(*h*). Optionally, the interface 708 may be understood as being configured to display a preview window of the always on display screen of the mobile phone for the user, and provide a manner of setting switching from the always on display screen to the lock screen interface for the user.

For example, as shown in FIG. 7(*h*), the interface 708 may include an always on display preview area 708-1 shown by a dashed-line box, and the always on display preview area 708-1 presents an effect of displaying the target element "little girl" on the always on display screen after image cropping processing is performed to the user. For example, in the always on display preview area 708-1, black is used as a background color, and the target element "little girl", time, and a date are displayed by using an always on display style set by the user.

Optionally, the user may tap any position in the always on display preview area 708-1. When detecting that the user performs a first tap operation, the mobile phone may display a preview window of the always on display screen in full screen, that is, display an always on display screen 901 shown in FIG. 9(*a*). Different from the always on display screen 201 shown in FIG. 2(*a*) and the always on display screen 401 shown in FIG. 4(*a*), the always on display screen 901 displayed in full screen may not include a circular control, but display only a target element "little girl" obtained after image cropping processing is performed. When it is detected that the user performs a second tap operation at any position on the preview window of the always on display screen displayed in full screen, the mobile phone may exit the preview window of the always on display screen displayed in full screen, and return to and display the interface 708 shown in FIG. 7(*h*). Details are not described herein again.

It should be understood that, in the accompanying drawings provided in embodiments of this application, to better present a contour of the target element "little girl" obtained after image cropping processing is performed, a "little girl" filled in black in the figure is changed to white and displayed on the always on display screen. The color change is merely used as an example, and does not constitute a limitation on the solution provided in this embodiment of this application. In an actual implementation process, the "little girl" may maintain an original color, and is displayed on the always on display screen only based on the contour. Details are not described subsequently.

In addition, the interface 708 may further include a transition animation selection area. The transition animation selection area provides the user with animation effects corresponding to a plurality of switching processes from the always on display screen to the lock screen interface, for example, a transition mode 1 and a transition mode 2. Each transition mode corresponds to a different animation effect.

Optionally, the animation effect includes but is not limited to one or more of move in, flip, fly, fall, dissolve, mesh, push, roll, zoom, and the like. The manner of transition from the always on display screen to the lock screen interface and the animation effect are not limited in this embodiment of this application. The user may further perform operations of sliding left (moving left) and sliding right (moving right) in the transition animation selection area, to view more transition modes. Details are not described herein again.

It should be understood that, in this embodiment of this application, each transition mode may correspond to a different configuration parameter. The configuration parameter may include information such as a display area and a display element of the target picture at each moment in a process of switching of the mobile phone from the always on display screen to the lock screen interface and then to the unlock interface, and information such as a size change, a coordinate change, and a position change of each element in the target picture. This is not limited in this embodiment of this application.

For example, the user may perform an operation 1 shown in FIG. 7(*h*). The user taps and selects a "transition mode 1" control, performs an operation 2, and taps a "next" option. In response to the operations of the user, the mobile phone may display an interface 709 shown in FIG. 7(*i*).

Optionally, the interface 709 may be understood as being configured to display a wallpaper preview window of the lock screen interface of the mobile phone for the user, and provide a manner of setting switching from the lock screen interface to the unlock interface for the user.

For example, as shown in FIG. 7(*i*), the interface 709 may include a lock screen preview area 709-1 shown in a dashed-line box. The lock screen preview area 709-1 presents display content and a display effect of a wallpaper of the lock screen interface to the user, and may specifically present a display effect of the target element "little girl" on the lock screen interface.

For example, in the lock screen preview area 709-1, a background of a part of the "little girl" on an original target picture is used as background content (for example, a background shown in gray in the lock screen preview area 709-1), and the target element "little girl" that is zoomed in by a specific multiple and on which image cropping processing is performed is displayed on the background content.

For example, as shown in FIG. 7(*i*), in the lock screen preview area 709-1, the following may be displayed: The target element "little girl" that undergoes image cropping is zoomed in at a large zoom-in ratio, a background of a partial area of the "little girl" on an original target picture is used as background content, and the background content and the target element "little girl" form a wallpaper of the lock screen interface. Optionally, the background of the partial area may be zoomed in by using a small zoom-in multiple as background content of the target element "little girl", or the background of the partial area may have a same zoom-in multiple as that of the target element "little girl". This is not limited in this embodiment of this application.

It should be understood that the "background content" or the "background" herein refers to all content or elements other than the target element "little girl" in the original target picture, such as a bamboo forest, a sun and cloud, and sky.

Optionally, in a specific implementation process, the lock screen preview area 709-1 may be a preview window on which user display is consistent with content on the lock screen interface, for example, may further include a lock screen icon, time and date. Alternatively, limited by a size of the lock screen preview area 709-1, the lock screen preview area may display only a wallpaper preview window of the lock screen interface for the user, that is, not include a lock screen icon, time and date. A wallpaper of the lock screen interface that is formed by the background content and the target element "little girl" is displayed for the user. This is not limited in this embodiment of this application.

Optionally, the user may tap any position in the lock screen preview area 709-1. When detecting that the user performs a first tap operation, the mobile phone may display a wallpaper preview window (without displaying a lock screen icon, time, a date, and the like) of the lock screen interface in full screen, or display a lock screen interface 902 (displaying a lock screen icon, time, a date, and the like) shown in FIG. 9(*b*), both of which may be referred to as a "full-screen preview window".

Different from the always on display screen 202 shown in FIG. 2(*b*) and the always on display screen 402 shown in FIG. 4(*b*), the lock screen interface 902 displayed in full screen may further display the target element "little girl"

obtained after the image cropping processing for the user, and the target element "little girl" on the lock screen interface 902 may be more prominently displayed after being zoomed in. When it is detected that the user performs a second tap operation at any position on the full-screen preview window, the mobile phone may exit the full-screen preview window, and return to and display the interface 709 shown in FIG. 7(*i*). Details are not described herein again.

In addition, the interface 709 may further include a transition animation selection area. The transition animation selection area provides the user with animation effects corresponding to a plurality of switching processes from the lock screen interface to the unlock interface (for example, a home screen wallpaper of a home screen), for example, a transition mode 4 and a transition mode 5. Each transition mode corresponds to a different animation effect. Optionally, the animation effect includes but is not limited to one or more of move in, flip, fly, fall, dissolve, mesh, push, roll, zoom, and the like. The manner of transition from the lock screen interface to the unlock interface and the animation effect are not limited in this embodiment of this application. The user may further perform operations of sliding left (moving left) and sliding right (moving right) in the transition animation selection area, to view more transition modes. Details are not described herein again.

For example, the user may perform an operation 1 shown in FIG. 7(*i*), to be specific, the user taps and selects a "transition mode 5" control; and perform an operation 2, to be specific, tap a "complete" option. In response to the operations of the user, a process of generating a custom theme of the mobile phone based on the target picture selected by the user is completed. The custom theme may implement a linkage effect of switching from the always on display screen to the lock screen interface and then to the unlock interface.

In another possible implementation, after the user selects the target picture and adjusts sizes of a display area and a display element of the target picture, the mobile phone may automatically detect and identify one or more elements in the display area of the target picture, and automatically determine the target element for the user according to a preset rule. Optionally, for the preset rule, refer to related descriptions in FIGS. 7(*a*) to 7(*i*). For brevity, details are not described herein again.

For example, in the interface 707 shown in FIG. 7(*g*), in a process in which the user previews a home screen wallpaper, the mobile phone may be triggered to automatically detect and identify one or more elements in the target picture (home screen wallpaper), determine an element in the one or more elements as the target element according to the preset rule, and automatically display the dashed-line box 707-1 on the interface 707. An element included in the dashed-line box 707-1 is the target element of the always on display screen.

Optionally, when the mobile phone automatically detects and identifies an element in the target picture (home screen wallpaper), determines the element as the target element, and automatically displays the dashed-line box 707-1 on the interface 707, if a result of the automatic identification is not expected by the user, for example, the user expects to use the "bamboo forest" as the target element instead of using the "little girl" as the target element, the user may manually drag the dashed-line box 707-1 to a display area of the bamboo forest. In response to the drag operation of the user, the mobile phone may re-determine the "bamboo forest" as the target element, and automatically adjust a size of the dashed-line box 707-1, so that the dashed-line box 707-1 can accommodate the "bamboo forest" in the target picture. Details are not described herein again.

It should be understood that in this embodiment of this application, a rule for determining the target element from the target picture by the mobile phone or a rule for determining the display position of the dashed-line box 707-1 may alternatively be set in more manners, through more detailed element classification, through more detailed priority ordering, or the like. This is not limited in this embodiment of this application.

In still another possible implementation, when the user selects the target picture, the mobile phone may automatically detect and identify one or more elements in the target picture. When detecting that the target picture includes a plurality of elements, the mobile phone may automatically display a plurality of dashed-line boxes 707-1 on the interface 707, that is, each element corresponds to one dashed-line box, to prompt the user of the plurality of detected elements. The user may tap any one of the plurality of dashed-line boxes, and determine an element in the tapped and selected dashed-line box as the target element.

For example, on the interface 707 shown in FIG. 7(*g*), in a process in which the user previews the home screen wallpaper, the mobile phone may be triggered to automatically detect and identify one or more elements in the target picture. When it is detected that the target picture includes three elements: a bamboo forest, a sun and cloud, and a little girl, three dashed-line boxes may appear. The user may tap the dashed-line box 707-1 in which the "little girl" is located. In response to the tap operation of the user, the mobile phone may determine the "little girl" in the tapped and selected dashed-line box 707-1 as the target element.

According to the foregoing implementation, in a process of generating the mobile phone theme based on the target picture selected by the user, a plurality of possible methods may be used. For example, the mobile phone may automatically detect and identify the target element in the target picture, or determine the target element in the target picture based on an operation of the user. The target element may be used as a display element on the always on display screen, or may be used as a prominent display element on the lock screen interface. A display process of the target element may better meet a display requirement of the user, thereby improving user experience.

In another possible implementation, in addition to setting, based on the method described in FIGS. 7(*a*) to 7(*i*) by using the settings application, a rule and a dynamic change effect for switching from the always on display screen to the lock screen interface and then to the unlock interface of the mobile phone, the user may further implement this process by using a gallery application.

FIGS. 8(*a*) to 8(*f*) are schematic diagrams of other examples in which a user sets a theme wallpaper of a mobile phone by using a gallery application according to an embodiment of this application. The user may tap an icon of the gallery application on the home screen 101 of the mobile phone shown in FIG. 1(*a*), to enter the gallery application and find an expected target picture. For this process, refer to implementation in an existing solution. For brevity, details are not described herein.

For example, the mobile phone displays a picture details interface 801 shown in FIG. 8(*a*). It is assumed that a picture on the picture details interface 801 is a target picture based on which the user expects to generate a theme wallpaper of the mobile phone. The picture details interface 801 further includes a menu bar in the bottom area, configured to display a share menu, a favorites menu, an edit menu, a delete menu, a more menu, and the like. The user may perform an operation shown in FIG. 8(*a*), to be specific, tap the more menu. In response to the tap operation of the user, the mobile phone may automatically display an interface 802 shown in FIG. 8(*b*). The interface 802 may include a window 802-1, and the window 802-1 includes more menus or more options that can be selected by the user, such as move, copy, add notes, editing tools, slideshow, print or export as PDF, rename, set as, and rotate. The menu or the option displayed in the window 802-1 is not limited in this embodiment of this application.

When the user performs an operation shown in FIG. 8(*b*), to be specific, taps the "set as" menu, in response to the tap operation of the user, the mobile phone displays an interface 803 shown in FIG. 8(*c*). The interface 803 may include a window 803-1. The window 803-1 includes one or more purposes of the picture, for example, a contact's photo option, an always on display option, and a super wallpaper option. The "contact's photo" option may be for setting the target picture to only a profile picture of any contact in a mobile phone address book. The "always on display" option may be for setting the target picture to only a picture displayed when a screen is off. The "super wallpaper" option may enable the mobile phone to generate, based on the target picture, a custom theme provided in this embodiment of this application. To be specific, the "target picture" is used as a picture of the always on display screen of the mobile phone, is used as a wallpaper of the lock screen interface when the mobile phone is in a screen-on and screen-locked state, and is used as a wallpaper of the unlock interface after the mobile phone is unlocked.

For example, the user performs an operation shown in FIG. 8(*c*), to be specific, taps the "super wallpaper" option. In response to the tap operation of the user, the mobile phone displays an interface 804 shown in FIG. 8(*d*). The interface 804 is a "wallpaper preview window of the unlock interface". For the interface 804 and a subsequent setting process, refer to the process described in FIGS. 7(*g*) to 7(*h*) and then to 7(*i*). For brevity, details are not described herein again. The following uses only one possible implementation as an example for description.

In a possible implementation, on the interface 804 shown in FIG. 8(*c*), the user may preview a display area, a display element, and a size of the display element when the target picture is used as the wallpaper of the unlock interface. In addition, the mobile phone may automatically detect and identify one or more elements in the target picture. When it is detected that the target picture includes a plurality of elements, the mobile phone may automatically display a plurality of dashed-line boxes on the interface 804. Each dashed-line box may accommodate one element or one type of element, to prompt the user of the plurality of detected elements.

For example, as shown in FIG. 8(*c*), a dashed-line box 804-1 may circle the identified "little girl", a dashed-line box 804-2 may circle the identified "bamboo forest", and a dashed-line box 804-3 may circle the identified "sun and cloud". The user performs an operation 1 shown in FIG. 8(*c*), and may tap any area in the dashed-line box 804-1. The mobile phone may determine an element "little girl" that is in the dashed-line box 804-1 and that is tapped by the user as the target element.

The user then performs an operation 2 shown in FIG. 8(*d*), and taps a "V (tick)" option. In response to the user operation, the mobile phone may perform image cropping processing on the target element "little girl", and display an interface 805 shown in FIG. 8(*e*). Still, the user performs, on the interface 805, an operation 1 and an operation 2 shown in FIG. 8(*e*), taps and selects a "transition mode 1" control, and taps a "next" option. In response to the operations of the user, the mobile phone may display an interface 806 shown in FIG. 8(*f*). Further, the user may perform an operation 1 and an operation 2 shown in FIG. 8(*f*), to be specific, tap and select a "transition mode 5" control, and then tap a "complete" option. In response to the operations of the user, a process of generating a custom theme of the mobile phone based on the target picture selected by the user is completed. The custom theme may implement a linkage effect of switching from the always on display screen to the lock screen interface and then to the unlock interface.

It should be understood that, in FIGS. 8(*e*) and 8(*f*), the user may not perform the operation 1, that is, the user does not need to manually select a transition mode, and a system may generate an interface switching animation in a default transition mode. Alternatively, the user may manually reselect an expected transition mode based on a requirement of the user. This is not limited in this embodiment of this application. It should be further understood that, for interface content of the interface 805 and the interface 806, refer to related descriptions of FIG. 7(*h*) and FIG. 7(*i*). For brevity, details are not described herein again.

The foregoing implementation provides, for a user, another method for generating a mobile phone theme based on a target picture. The user may generate, in any manner described in FIGS. 7(*a*) to 7(*i*) or FIGS. 8(*a*) to 8(*f*), a custom theme of a mobile phone based on the target picture selected by the user. The custom theme may enable a "target element" in the target picture to be displayed on an always on display screen. The "target element" may also be used as content that is mainly displayed on a lock screen interface, so that a display process of the target element can better meet a display requirement of the user. In this way, user experience is improved.

FIGS. 9(*a*) to 9(*f*) are schematic diagrams of examples of a presentation effect of a mobile phone from an always on display screen to an unlock interface according to an embodiment of this application;

As shown in FIGS. 9(*a*) to 9(*f*), when the mobile phone may display, in an always on display state, an always on display screen 901 shown in FIG. 9(*a*). The always on display screen 901 displays a target element "little girl" of the target picture, and white (or transparent-state) time and date content. The target element "little girl" is obtained after image cropping processing is performed on the target picture. In other words, the always on display screen 901 does not include a bamboo forest, a sun and cloud, and other content except the "little girl" on the target picture.

It should be understood that, on the always on display screen 901 of the mobile phone, a background color is generally black. Therefore, to better display "time and date content" to the user, color inversion processing may be generally performed. For example, a black always on display screen correspondingly displays white time and date content, so that the user can obtain time and date information more clearly and quickly. In this embodiment of this application, the always on display screen 901 may further include another background color. For different background colors, the "time and date content" may also be displayed in white or in a more obvious color. In this embodiment of this application, a color inversion processing process, a background color of the always on display screen, and a display color of the "time and date content" are not limited.

In a possible implementation, the background color of the always on display screen and the display color of the "time and date" may be determined based on a user-defined hue of the "target picture" or the "target element", so that the "target element" has a better visual effect on the always on display screen. For example, if the hue of the "target element" is a warm color such as orange and red, the background color of the always on display screen may also be displayed as a warm color of a type the same as yellow, and the display color of the "time and date" may be displayed as a cold color with a distinct contrast, for example, blue. This is not limited in this embodiment of this application.

In the foregoing process, first, the always on display screen 901 does not include a circular control area. Different from the always on display screen 201 shown in FIG. 2(*a*) and the always on display screen 401 shown in FIG. 4(*a*), the always on display screen 901 can avoid a large visual difference between picture content in the circular control area and a black always on display area, so that splicing or transition between content of the target picture and the always on display screen is smoother. The display effect is more beautiful, and visual experience of the user is improved.

In addition, when the mobile phone is in an always on display state, the user triggers the mobile phone to start facial identification and start unlocking. The mobile phone may be turned on and gradually display a lock screen interface 902 shown in FIG. 9(*b*) by using a dynamic effect of the "transition mode 1" set by the user. The lock screen interface 902 may display a lock screen icon, prompt information indicating that "a face is being identified", current time and date, a camera application icon, and the like.

Optionally, the target element "little girl" is used as a reference object, and a change effect in a process of switching the mobile phone from the always on display screen 901 to the lock screen interface 902 may include one or a combination of a plurality of the following effects.

(1) The target element "little girl" selected by the user may gradually increase from a smaller size at a specific change rate until a larger size on the lock screen interface 902 is displayed. For example, a size of the target element "little girl" may gradually change from a width and a height shown in FIG. 9(*d*) to a width and a height shown in FIG. 9(*e*).

(2) A display position of the target element "little girl" may gradually move from a first preset area on an upper part of the screen to a second preset area below a center of the screen. For example, a physical center of gravity (a hollow point) of the target element "little girl" is used as a reference point, and a change of the display position of the target element "little girl" may be shown in FIG. 9(*e*). The target element "little girl" moves gradually along a track of a black solid line with an arrow from a start position C to a position D shown in FIG. 9(*e*).

(3) When the target element "little girl" is displayed on the lock screen interface 902 for the user, a background of a partial area of the "little girl" in the original target picture is still used as background content, and a combination of the target element "little girl" and the background content is used as a wallpaper of the lock screen interface. For example, as shown in FIG. 9(*b*), the background content (for example, background content shown in gray) of the lock screen interface 902 of the mobile phone may be from a part of the background content (for example, background content shown in gray) of the original target picture shown in FIG. 8(*a*). Optionally, the background content of the lock screen interface 902 is obtained by magnifying a background of a partial area of the original target picture, and a zoom-in ratio may be the same as or different from a zoom-in ratio of the target element "little girl".

Optionally, the "partial area of the original target picture" may be an area that is centered on the target element "little girl" and that is within a preset range from a contour of the target element "little girl". This is not limited in this embodiment of this application.

In the foregoing described lock screen phase, in a process in which the mobile phone switches from the always on display screen 901 to the lock screen interface 902, a dynamic change effect of the target element "little girl" can be presented to the user. This process increases interest, and improves visual experience of the user.

Finally, when face information verification succeeds, the mobile phone is unlocked successfully, and an unlock interface 903 shown in FIG. 9(*c*) is displayed.

Optionally, in a process in which the lock screen interface 902 of the mobile phone is switched to the unlock interface 903, the unlock interface 903 shown in FIG. 9(*c*) may be gradually displayed by using a dynamic effect of a "transition mode 5" set by the user. The unlock interface 903 may use the original target picture shown in FIG. 8(*a*) as a wallpaper of the unlock interface, and display a weather and clock component in a bottom area of a home screen of the mobile phone, an application in the bottom area, and the like.

Optionally, the target element "little girl" is used as a reference object, and a change effect in a process of switching the mobile phone from the lock screen interface 902 to the unlock interface 903 may include one or a combination of a plurality of the following effects.

(1) The target element "little girl" selected by the user may gradually decrease from a larger size at a specific change rate until a final size on the lock screen interface 903 is displayed. For example, a size of the target element "little girl" may gradually change from a width and a height shown in FIG. 9(*e*) to a width and a height shown in FIG. 9(*f*).

(2) The display position of the target element "little girl" may gradually move from the second preset area below the center of the screen, until a preview effect of the wallpaper of the unlock interface that is set by the user and that is shown in FIG. 8(*d*) or FIG. 7(*g*) is restored. For example, a physical center of gravity (a hollow point) of the target element "little girl" is used as a reference point, and the display position of the target element "little girl" continues to move along a track of a black solid line with an arrow shown in FIG. 9(*f*) from the position D shown in FIG. 9(*e*), and finally stays at a position E shown in FIG. 9(*f*). In addition, a final position of the target element "little girl" may be a preview effect of the home screen wallpaper set in FIG. 8(*d*) or FIG. 7(*g*) by the user.

(3) In this process, a dynamic effect of gradually extending (gradually shrinking) the wallpaper of the lock screen interface 902 may also be presented. Finally, the wallpaper of the lock screen interface 902 may present a preview effect of the wallpaper set in FIG. 8(*d*) or FIG. 7(*g*) to the user, and the wallpaper of the unlock interface 903 is consistent with content of the display area selected by the user in the original target picture.

It should be understood that, in this embodiment of this application, each transition mode may correspond to a different configuration parameter. The configuration parameter may include information such as a display area and a display element of the target picture at each moment in a process of switching of the mobile phone from the always on display screen to the lock screen interface and then to the unlock interface, and information such as a size change, a coordinate change, and a position change of each element in the target picture. This is not limited in this embodiment of this application.

In the foregoing described unlocking phase, in a process in which the mobile phone switches from the lock screen interface 902 to the unlock interface 903, the target element can present a dynamic change effect to the user, and finally is displayed as a wallpaper of the unlock interface set by the user. This process increases interest and improves visual experience of the user.

In conclusion, according to the method in this embodiment of this application, the user may set any picture as the theme wallpaper of the mobile phone based on a preference and a requirement of the user. In the method, an effect of dynamic linkage in a process of switching from an always on display screen to a lock screen interface and then to an unlock interface may be presented to the user based on an image processing process customized by the user, such as detection and identification of the picture and image cropping of a target element in the picture, and different transition modes and transition animations that are set by the user and that are corresponding to the process of switching from the always on display screen to the lock screen interface and then to the unlock interface of the mobile phone, to provide smooth visual experience to the user.

In this way, the user may select any photo taken by the user, such as a photo of a family member, or a friend souvenir photo, and separately participate, based on the photo, in a process of displaying the always on display screen, the wallpaper of the lock screen interface, and the wallpaper of the unlock interface, and may highlight an element (for example, a child's portrait) expected by the user on the always on display screen, the lock screen interface, and the unlock interface of the mobile phone. In addition, different animation effects are added in a process of switching from the always on display screen to the lock screen interface and then to the unlock interface, to generate a theme wallpaper with a dynamic change effect for the user, and present a smooth playback effect to the user. This method may provide the user with unlimited theme selections, and avoid that the user can only rely on a theme preset by the system, to implement dynamic linkage in a process of switching from the always on display screen to the lock screen interface and then to the unlock interface, thereby meeting different use requirements of the user and improving user experience.

In the foregoing embodiment, a user-defined picture (that is, the "target picture") is used as an example to describe a process of separately generating the always on display screen, the lock screen interface, and the unlock interface of the mobile phone based on the picture. In a possible implementation, the user may select a plurality of pictures, and generate the always on display screen, the lock screen interface, and the unlock interface of the mobile phone based on the plurality of pictures.

Optionally, the plurality of pictures may be from a local gallery of the mobile phone, or from a plurality of frames of pictures of a video clip. Sources of the plurality of pictures are not limited in this embodiment of this application.

For example, on the picture selection interface 706 shown in FIG. 7(*f*), the user may click a selection box of any plurality of pictures in the picture list, use the plurality of pictures selected by the user as the "target picture", and use elements that are the same as the plurality of pictures as the "target element". For example, if the plurality of pictures include a "little girl", the "little girl" may be used as the target element. Further, the always on display screen, the lock screen interface, and the unlock interface of the mobile phone are generated.

Alternatively, for example, on the picture selection interface 706 shown in FIG. 7(*f*), one or more video clips of the mobile phone may be further displayed. The user taps a video clip, and may display a plurality of frames of pictures included in the video clip for the user. The user may select one or more frames from the plurality of frames of pictures of the video clip as the "target picture", and determine same elements in the one or more frames of pictures as the "target element". For example, one or more frames of pictures each include a "little girl", and the "little girl" may be used as the target element to further generate the always on display screen, the lock screen interface, and the unlock interface of the mobile phone. Details are not described herein again.

Figure 10:
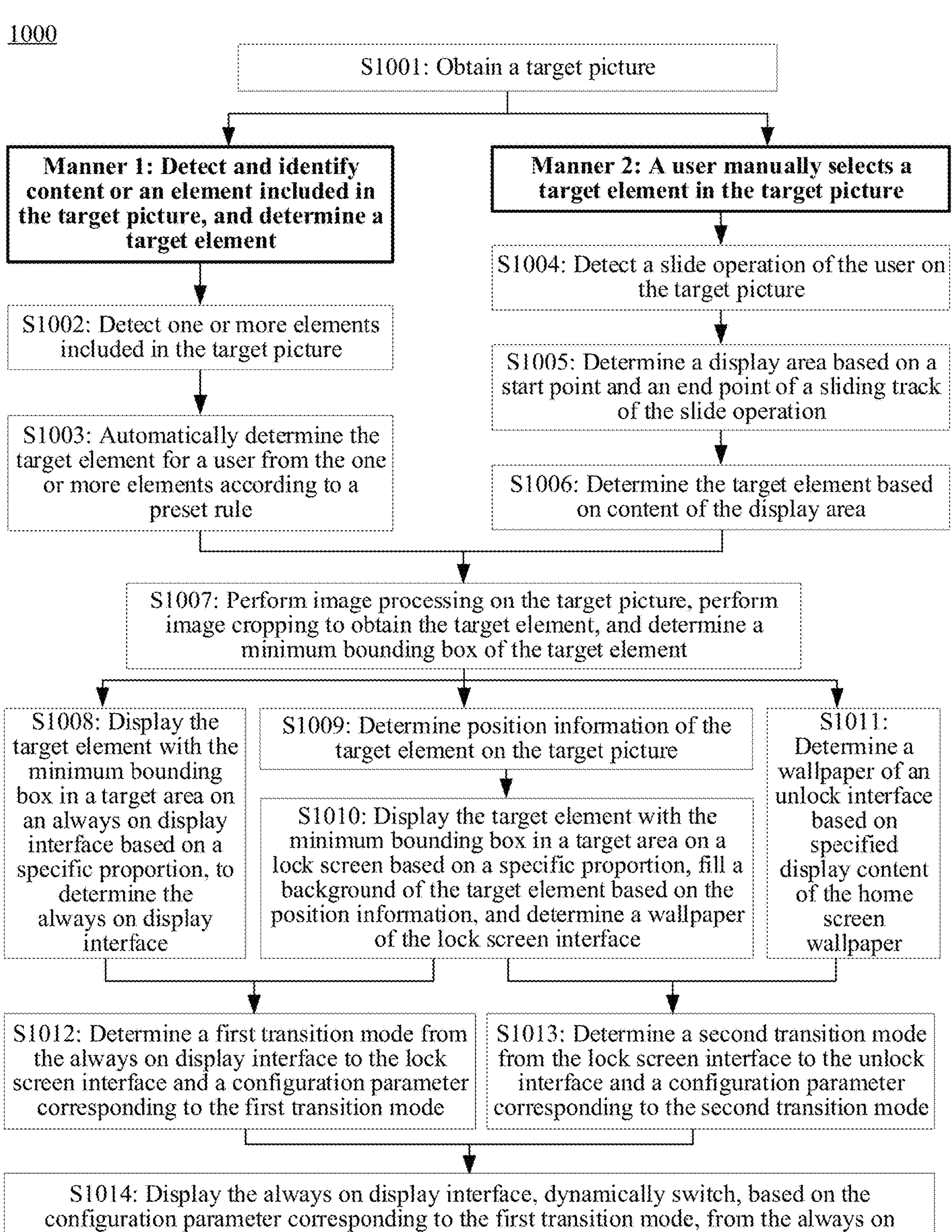
FIG. 10 is a schematic flowchart of an example of a theme wallpaper generation method according to an embodiment of this application.

With reference to FIGS. 1(*a*) to 9(*f*), the foregoing embodiments describes a theme wallpaper generation process from a perspective of user interaction. With reference to FIG. 10, the following describes, from a perspective of a software implementation policy, a specific implementation process of generating a theme wallpaper provided in embodiments of this application. It should be understood that the method may be implemented in the electronic device (such as a mobile phone or a tablet computer), shown in FIGS. 5 and 6, having a structure such as a touchscreen.

FIG. 10 is a schematic flowchart of an example of a theme wallpaper generation method according to an embodiment of this application. As shown in FIG. 10, the method 1000 may include the following steps.

S1001: Obtain a target picture.

It should be understood that the "target picture" may be any picture customized by a user. Optionally, the target picture may be from a local gallery of a mobile phone, or may be a picture requested from another electronic device, a server, or the like in another manner. A source of the picture is not limited in this embodiment of this application.

It should be further understood that the "target picture" selected by the user is used as a picture on an always on display screen of the mobile phone, a wallpaper of a lock screen interface when the mobile phone is in a screen-on and screen-locked state, and a wallpaper of an unlock interface after the mobile phone is unlocked. In other words, in this embodiment of this application, a new theme wallpaper is generated for the mobile phone based on the "target picture" selected by the user.

It should be further understood that "obtaining a target picture" in S1001 in this embodiment of this application may also be referred to as "determining a target picture". A trigger occasion of S1001 may be an operation of selecting a picture from a plurality of pictures as the target picture by the user and triggering an electronic device to generate a theme wallpaper based on the target picture.

For example, in the operation 1 shown in FIG. 7(*f*), when the user taps and selects the selection box of the target picture, and performs the operation 2 shown in FIG. 7(*f*), to be specific, taps the "OK" option, in response to the operation 2 performed by the user, the mobile phone may determine the target picture from a plurality of pictures, that is, obtain information about the target picture.

Alternatively, for example, the user performs the operation shown in FIG. 8(*c*), to be specific, taps the "super wallpaper" option. In response to the tap operation of the user, the mobile phone determines the target picture, that is, obtains information about the target picture. An occasion for obtaining the target picture is not limited in this embodiment of this application.

After determining the target picture selected by the user, the electronic device may determine, from the plurality of types of content and one or more elements included in the target picture, a main element that the user expects to display on the always on display screen and the lock screen interface, that is, the "target element" in the foregoing embodiments. Specifically, a process of determining the target element by the electronic device may include the following two different manners.

Manner 1: Detect and identify content or an element included in the target picture, and determine a target element In a scenario corresponding to Manner 1, the electronic device may automatically detect content or an element included in the target picture, and automatically determine the target element for the user based on the identified content or element included in the target picture and according to a preset rule.

For the target picture, a process of determining the target element may include the following steps.

S1002: The electronic device detects one or more elements included in the target picture.

Optionally, the electronic device may detect, based on an image detection and identification function, an element type included in the target picture, such as a character, an animal, a plant, a building, or a scenery.

Alternatively, further, the electronic device may identify a specific element included in the character type of the target picture, such as a family member such as a father, a mother, or a daughter, or a friend of the user.

S1003: The electronic device automatically determines the target element for the user from the one or more elements according to a preset rule.

Optionally, the target element may include one or more elements, for example, include one character or two characters. This is not limited in this embodiment of this application.

Optionally, the electronic device may determine the target element from the one or more elements according to a plurality of possible preset rules. For the preset rule, refer to related descriptions in FIGS. 7(*a*) to 7(*i*). For brevity, details are not described herein again.

In a possible implementation, after determining the target element according to any one or more preset rules, the electronic device may display a prompt mark on an interface of the electronic device, where the prompt mark is for prompting the user of the target element that is to be displayed on the always on display screen and the lock screen interface, and a display position of the target element on the target picture.

Optionally, the prompt mark may be a dashed-line box, a solid-line box, or the like; the prompt mark may be in different shapes such as a rectangle, a square, an ellipse, or a circle; and/or the prompt mark may be statically displayed or dynamically flickered. This is not limited in this embodiment of this application.

For example, as shown in FIG. 8(*d*), when it is detected that the target picture includes a plurality of elements, and the "little girl" is determined as the target element, the mobile phone may display only the dashed-line box 804-1 on the interface 804, and the dashed-line box 804-1 may circle the identified "little girl".

Alternatively, when it is detected that the target picture includes a plurality of elements, the mobile phone may automatically display a plurality of dashed-line boxes on the interface 804. Each dashed-line box may accommodate one element or one type of element, to prompt the user of the plurality of detected elements. As shown in FIG. 8(*c*), the dashed-line box 804-1 may circle the identified "little girl", the dashed-line box 804-2 may circle the identified "bamboo forest", and the dashed-line box 804-3 may circle the identified "sun and cloud". The user may tap and select any dashed-line box. For example, the user taps any area in the dashed-line box 804-1. The mobile phone may determine the element "little girl" that is in the dashed-line box 804-1 and that is tapped by the user as the target element.

According to the method provided in Manner 1, in a process of generating the mobile phone theme based on the target picture selected by the user, a plurality of possible methods may be used. For example, the mobile phone may automatically detect and identify the target element in the target picture, or determine the target element in the target picture based on an operation of the user. The target element may be used as a display element on the always on display screen, or may be used as a prominent display element on the lock screen interface. A display process of the target element may better meet a display requirement of the user, thereby improving user experience.

Manner 2: The user manually selects a target element in the target picture.

In a scenario corresponding to Manner 2, the user may manually select a display area of the target picture. For example, the user may circle a display area by using a finger slide operation in a process shown in FIG. 7(*g*), and the electronic device may determine, based on the display area circled by the user, an element in the display area as the target element. The process may include the following steps:

S1004: The electronic device detects a slide operation of the user on the target picture.

S1005: Determine the display area based on a start point and an end point of a sliding track of the slide operation.

S1006: Determine the target element based on content of the display area.

For example, the user may perform an operation 1 shown in FIG. 7(*g*). To be specific, the user taps a point A, uses the point A as a sliding start point, and slides to a point B along a direction indicated by a dashed line with an arrow. In response to the slide operation of the user, the mobile phone may automatically display a dashed-line box 707-1 on the interface 707 based on a sliding track A-B. An element included in the dashed-line box 707-1 is used as the target element of the always on display screen.

Optionally, the user may preset a shape of the display area, and the shape of the display area may be a regular pattern such as a rectangle, a circle, an ellipse, or a diamond.

Alternatively, the user may preset a shape of the display area as an irregular pattern following a finger sliding track of the user. Specifically, the user may slide on the target picture, and determine an irregular area as the display area based on the sliding track of the user. This is not limited in this embodiment of this application.

For example, as shown in FIG. 7(*g*), if the user sets a shape of the display area to be a rectangle, the rectangular dashed-line box 707-1 may be determined based on that the user may tap only the start point A and the end point B on the screen. In this scenario, a slide operation of the user may not be required, and only the start point and the end point on the screen that are tapped by the user need to be determined. This facilitates the user operation. Details are not described herein.

According to the method provided in Manner 2, the user may manually set the display area, and the electronic device may determine an element in the display area as the target element. A process of determining the target element more meets a display requirement of the user, to more accurately locate the target element that the user expects to display.

S1007: Perform image processing on the target picture, perform image cropping to obtain the target element, and determine a minimum bounding box of the target element.

Figure 11:
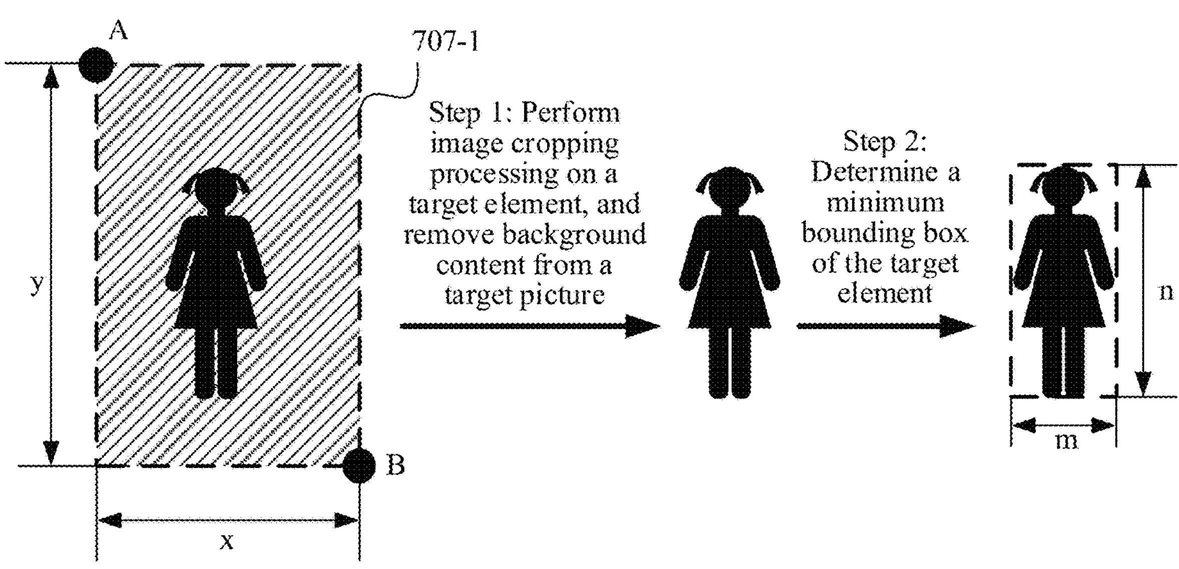
FIG. 11 is a schematic diagram of an example of a process of performing image processing on a target picture according to an embodiment of this application.
Figure 12:
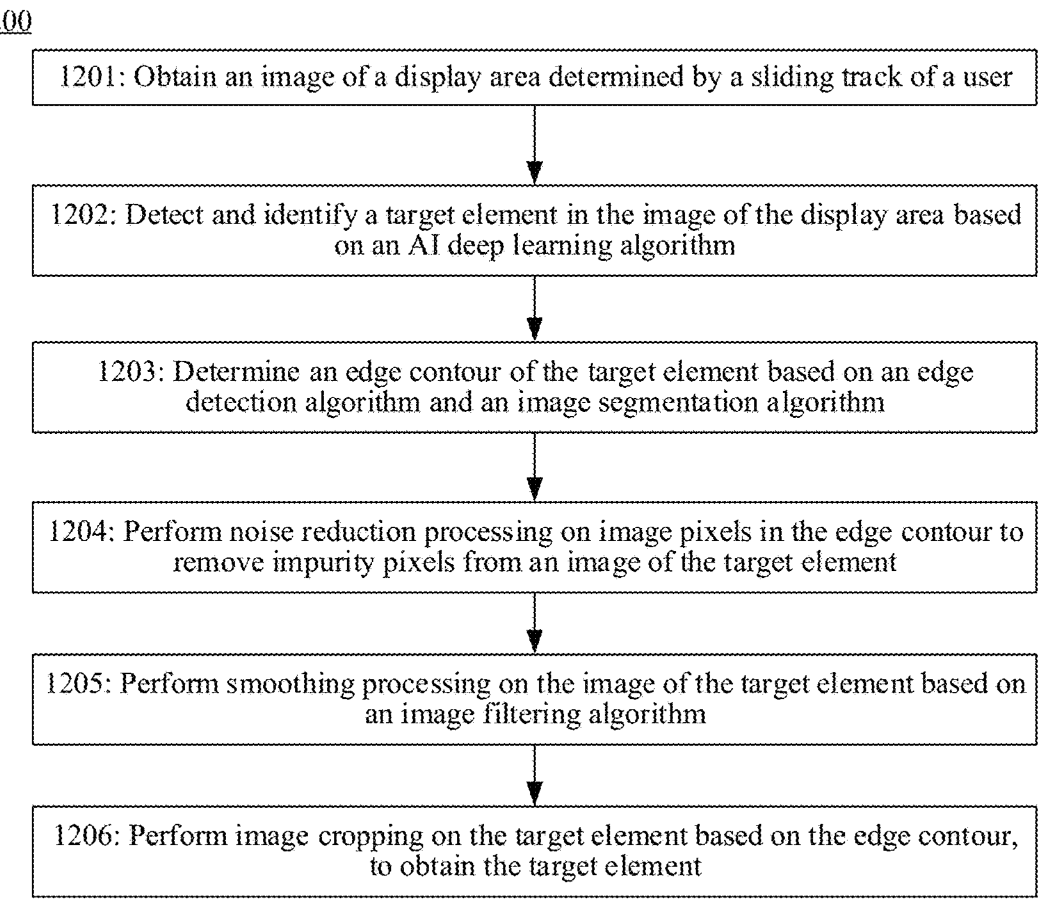
FIG. 12 is a flowchart of another example of a process of performing image processing on a target picture according to an embodiment of this application.

FIG. 11 is a schematic diagram of an example of a process of performing image processing on the target picture according to an embodiment of this application. FIG. 12 is a flowchart of another example of a process of performing image processing on the target picture according to an embodiment of this application. The following describes an implementation process of S1007 with reference to FIGS. 11 and 12.

For example, in the foregoing process of S1004 to S1006, the electronic device may determine a display area based on the slide operation of the user and the like. The display area may be an area included in the dashed-line box 707-1 whose height is x and width is y shown in FIG. 7(*g*). The electronic device may perform image processing on the area included in the dashed-line box 707-1, or the electronic device may perform image processing on the target picture. As shown in FIG. 11, S1007 may include two steps.

Step 1: Perform image cropping processing on the target element, and remove background content other than the target element from the target picture.

For example, as shown in FIG. 11, the electronic device may determine, based on the point A and the point B of the sliding track of the user, the area in the dashed-line box 707-1 whose height is x and width is y, detect content included in the area in the dashed-line box 707-1, identify the target element "little girl" and a contour of the "little girl" filled in black in FIG. 11, and remove all background content other than the contour of the "little girl" filled in black, only obtained the "little girl" filled in black.

Step 2: Determine the minimum bounding box of the target element.

For example, as shown in FIG. 11, the electronic device may further determine a display height n and a display width m based on the "little girl" filled in black. A dashed-line box (that is, the "minimum bounding box") formed by the display height n and the display width m can ensure that all pixels of the "little girl" filled in black are accommodated.

It should be understood that in this embodiment of this application, the "minimum bounding box" may be for determining a display height, a display width, and the like of the target element "little girl" obtained through image cropping processing.

It should be further understood that, the "minimum bounding box" obtained through processing in step 2 is different from the dashed-line box 707-1 determined by the slide operation of the user. The dashed-line box 707-1 further includes background content, and the "minimum bounding box" includes only the "little girl" filled in black, but does not include background content. In other words, all images in the "minimum bounding box" except the "little girl" filled in black are in a transparent state.

In a possible implementation, the image processing process in step 1 and step 2 may specifically include a part or all of steps in FIG. 12. As shown in a method 1200 in FIG. 12, the image processing process includes the following steps.

1201. Obtain an image of the display area determined by the sliding track of the user.

1202: Detect and identify a target element in the image of the display area based on an artificial intelligence (artificial intelligence, AI) deep learning algorithm.

1203. Determine an edge contour of the target element based on an edge detection algorithm and an image segmentation algorithm.

1204. Perform noise reduction processing on image pixels in the edge contour to remove impurity pixels from an image of the target element.

1205. Perform smoothing processing on an image of the target element based on an image filtering algorithm.

1206. Perform image cropping on the target element based on the edge contour, to obtain the target element.

It should be understood that, the noise reduction processing, the smoothing processing, and the like can eliminate impurity pixels of the image, thereby improving image quality.

Optionally, in this embodiment of this application, the AI deep learning algorithm, the edge detection algorithm, the image segmentation algorithm, the noise reduction processing algorithm, the image filtering algorithm, the image cropping algorithm, and the like may be for processing an image pixel in the display area based on a plurality of possible algorithms such as a Sobel operator, an Isotropic Sobel operator, a Roberts operator, a Prewitt operator, a Laplacian operator, and a Canny operator. For this process, refer to some existing solutions. A possible algorithm or implementation process is not described in this embodiment of this application.

According to the foregoing process, the target element "little girl" that undergoes image cropping and that is with the clear edge and the clear contour may be obtained. As shown in FIG. 11, a height of an image region of the target element "little girl" is n, and a width of the image region is m. The height n and the width m may determine the minimum bounding box of the target element "little girl".

S1008: Display the target element with the minimum bounding box in the target area on the always on display screen based on a specific proportion, to determine the always on display screen.

For example, S1008 may correspond to FIG. 9(*a*). The mobile phone displays, on the always on display screen 901, the target element "little girl" determined by the user in FIG. 8(*d*).

Figure 13:
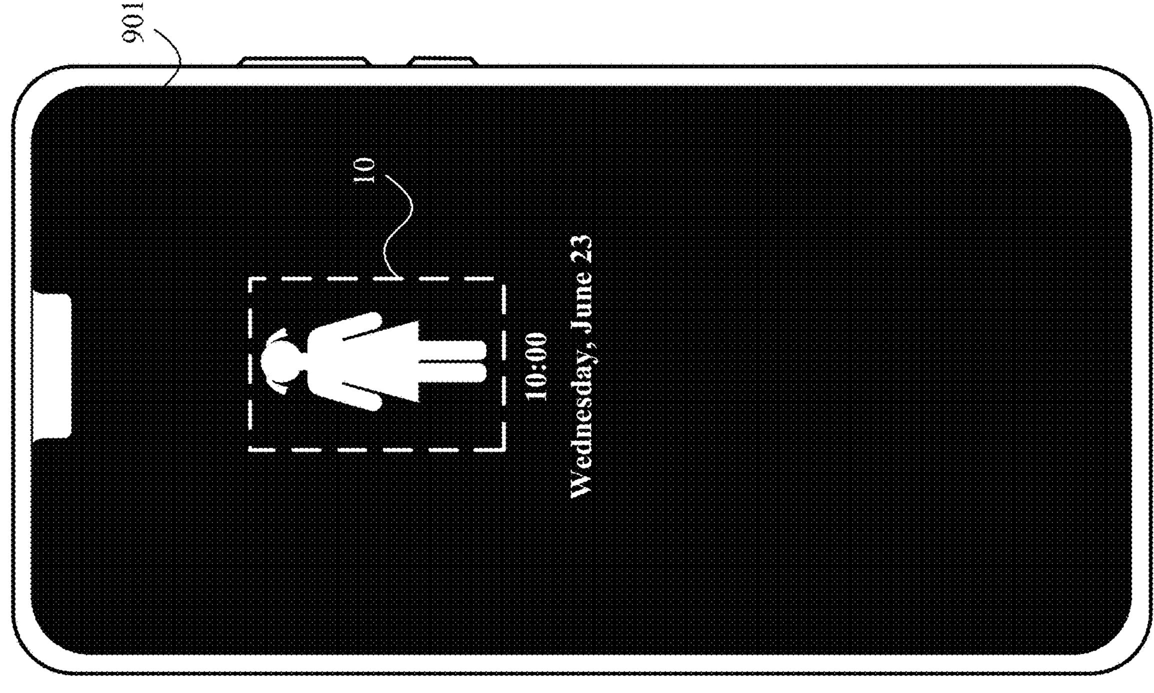
FIG. 13 is a schematic diagram of an example of displaying a target element on an always on display screen according to an embodiment of this application.
Figure 13:
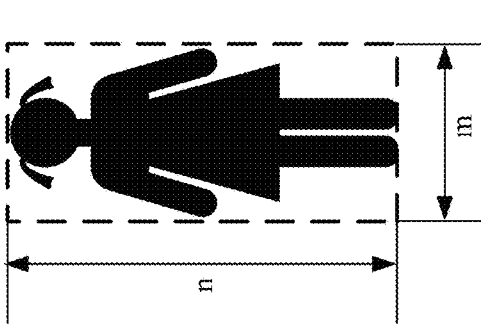

FIG. 13 is a schematic diagram of an example of displaying the target element on the always on display screen according to an embodiment of this application.

For example, based on S1007 and the processes of step 1 and step 2 described in FIG. 11, the electronic device has obtained the target element "little girl" obtained after image cropping processing, and the electronic device may display the target element "little girl" on the always on display screen 901 shown in FIG. 9(*a*). Specifically, as shown in FIG. 13, the process may correspond to the following step.

Step 3: Perform zoom-in or zoom-out processing on the target element with the minimum bounding box based on a specific proportion, and display the target element in the target display area 10 on the always on display screen.

Optionally, the "target display area 10" may be a fixed area on the screen, or a constantly changing area on the screen. A size of the "target display area 10" may be fixed. It is assumed that the "target display area 10" has a preset width w and a preset height h.

For example, as shown in FIG. 13, the electronic device determines that the target element "little girl" in the original target picture has a display height of n and a display width of m, and zooms in or out on the target element "little girl" (that is, the "minimum bounding box") with the height n and the width m based on a specific proportion, and display the target element "little girl" in the target display area 10 on the always on display screen.

First, the electronic device needs to determine a zoom ratio of the target element "little girl", or a zoom ratio of the minimum bounding box.

Figure 14:
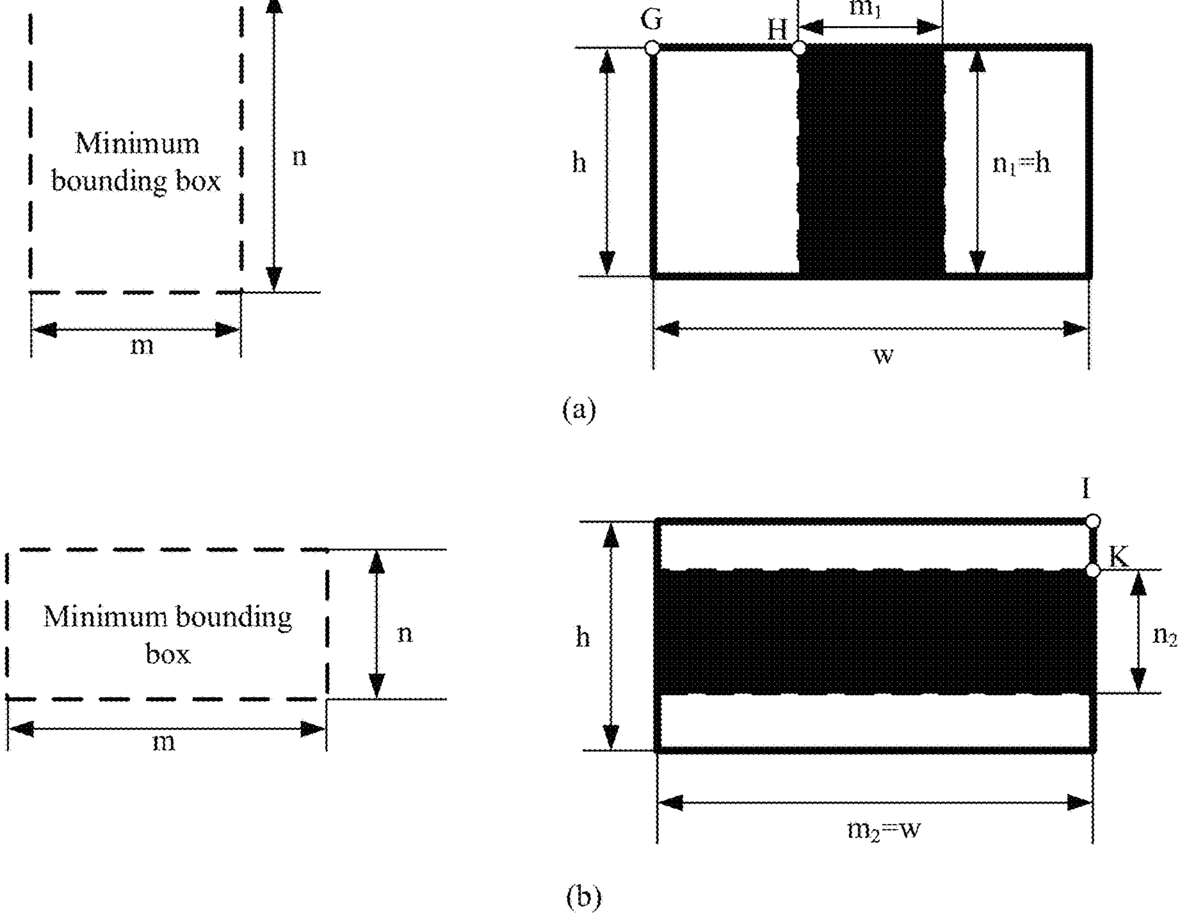
FIG. 14 is a schematic diagram of an example of calculating the zoom ratio according to an embodiment of this application.

FIG. 14 is a schematic diagram of an example of calculating the zoom ratio according to an embodiment of this application.

For example, in S1007, the display height n and the display width m of the target element "little girl" in the original target picture are obtained, where n and m may have the following relationships: n>m, n<m, and n=m. In this embodiment of this application, a rule for determining a zoom ratio of the target element may be referred to as a "long-side matching rule", and the "long-side matching rule" may be understood as follows: The electronic device determines the zoom ratio of the target element depending on a larger value of n and m, and then displays a target element "little girl" obtained through zoom processing in the target display area 10 with the width w and the height h. The following cases are specifically included.

Case 1: When n>m, the electronic device may determine the zoom ratio of the target element "little girl" based on n.

For example, as shown in (a) in FIG. 14, the height n of the minimum bounding box is greater than the width m, and the electronic device may calculate the zoom ratio according to Formula (1):

$$k_1 = \frac{h}{n} \quad \text{Formula (1)}$$

In this case, a final display size of the target element "little girl" is as follows: A height is $n_1=h$ and a width is $$m_1 = k_1 \times m = \frac{h}{n} \times m.$$

On one hand, when determining the zoom ratio $k_1$ of the target element "little girl", the electronic device may zoom in or out, based on a ratio $k_1$, on the target element "little girl" obtained through image cropping in S1007, to obtain the final display size (with the width m, and the height $n_1$) of the target element "little girl".

On the other hand, the electronic device needs to determine a display position of the target element "little girl" on the lock screen interface (screen). Optionally, the electronic device may display the zoomed target element "little girl" (with the width m, and the height $n_1$) in a middle area of the target display area 10 with the width w and the height h. In other words, it is ensured that a geometric center of the zoomed minimum bounding box (with the width m, and the height $n_1$) overlaps a geometric center of the target display area 10 with the width w and the height h. Therefore, the electronic device may determine, according to the principle, a displacement offset between an upper-left reference point G of the target display area 10 and an upper-left reference point H of the minimum bounding box, to accurately determine the display position of the target element "little girl", and display the target element "little girl" in the target display area 10 with the width w and the height h in FIG. 13.

Case 2: When n<m, the electronic device may determine the zoom ratio of the target element "little girl" based on m.

For example, as shown in (b) in FIG. 14, the height n of the minimum bounding box is less than the width m, and the electronic device may calculate the zoom ratio according to Formula (2):

$$k_2 = \frac{w}{m} \quad \text{Formula (2)}$$

In this case, a final display size of the target element "little girl" is as follows: A height is $$n_2 = k_2 \times n = \frac{w}{m} \times n$$

and a width is $m_2=w$.

On one hand, when determining the zoom ratio $k_2$ of the target element "little girl", the electronic device may zoom in or out, based on a ratio $k_2$, on the target element "little girl" obtained through image cropping in S1007, to obtain the final display size (with the width $m_2$ and the height $n_2$) of the target element "little girl".

On the other hand, the electronic device needs to determine a display position of the target element "little girl" on the lock screen interface (screen). Optionally, the electronic device may display the zoomed target element "little girl" (with the width $m_2$ and the height $n_2$) in a middle area of the target display area 10 with the width w and the height h in FIG. 13. In other words, it is ensured that a geometric center of the zoomed minimum bounding box (with the width $m_2$ and the height $n_2$) overlaps a geometric center of the target display area 10 with the width w and the height h. Therefore, the electronic device may determine, according to the principle, a displacement offset between an upper-right reference point I of the target display area 10 and an upper-right reference point K of the minimum bounding box, to accurately determine the display position of the target element "little girl", and display the target element "little girl" in the target display area 10 with the width w and the height h in FIG. 13.

Case 3: When n=m, the electronic device may calculate the zoom ratio based on the foregoing case 1 or case 2. Details are not described herein again.

In another possible implementation, in addition to the method described in FIG. 14, the zoom ratio may be a preset value, and the target display area 10 is also a preset area.

For example, the electronic device may zoom in or out on the target element "little girl" obtained through image cropping at a ratio corresponding to a preset value (for example, zoom in by 1.2 times or zoom out by 0.8 times), and set the target display area 10 to a position 0.1 below a geometric center of the target element "little girl" in a position area of the original target picture, to ensure that a center of gravity of the target element "little girl" is in an area on a lower part of the screen. This is not limited in this embodiment of this application.

According to the foregoing process, the electronic device may finally present a display effect of the always on display screen 901 in FIG. 9(*a*). The always on display screen 901 no longer displays, by using a circular control or the like, content of the target picture set by the user, and displays only the target element "little girl" obtained through image cropping processing, to avoid a large visual difference between picture content displayed by the circular control and a black always on display area, so that splicing or transition between content of the target picture and the always on display screen is smoother. The display effect is more beautiful, and visual experience of the user is improved.

S1009: Determine position information of the target element on the target picture.

S1010: Display the minimum bounding box in a target area on the lock screen based on a specific proportion, fill a background of the target element based on the position information, and determine the wallpaper of the lock screen.

It should be understood that a process of S1009 and S1010 may correspond to FIG. 9(*b*). To be specific, a process in which the electronic device generates, based on the target picture and the target element selected by the user, the lock screen interface 902 shown in FIG. 9(*b*).

In this implementation process, on one hand, the electronic device needs to determine a zoom ratio when the target element "little girl" is displayed on the lock screen interface 902. For this process, refer to related descriptions of S1008 and FIG. 14. Details are not described herein again.

On the other hand, the electronic device needs to determine background content of the target element "little girl" on the lock screen interface 902, display the wallpaper of the lock screen interface 902 based on the target element "little girl" and the background content of the target element "little girl", and then display a lock screen icon, prompt information indicating that "a face is being identified", current time and date, a camera application icon, and the like on the wallpaper of the lock screen interface 902, to generate the lock screen interface 902.

Figure 15:
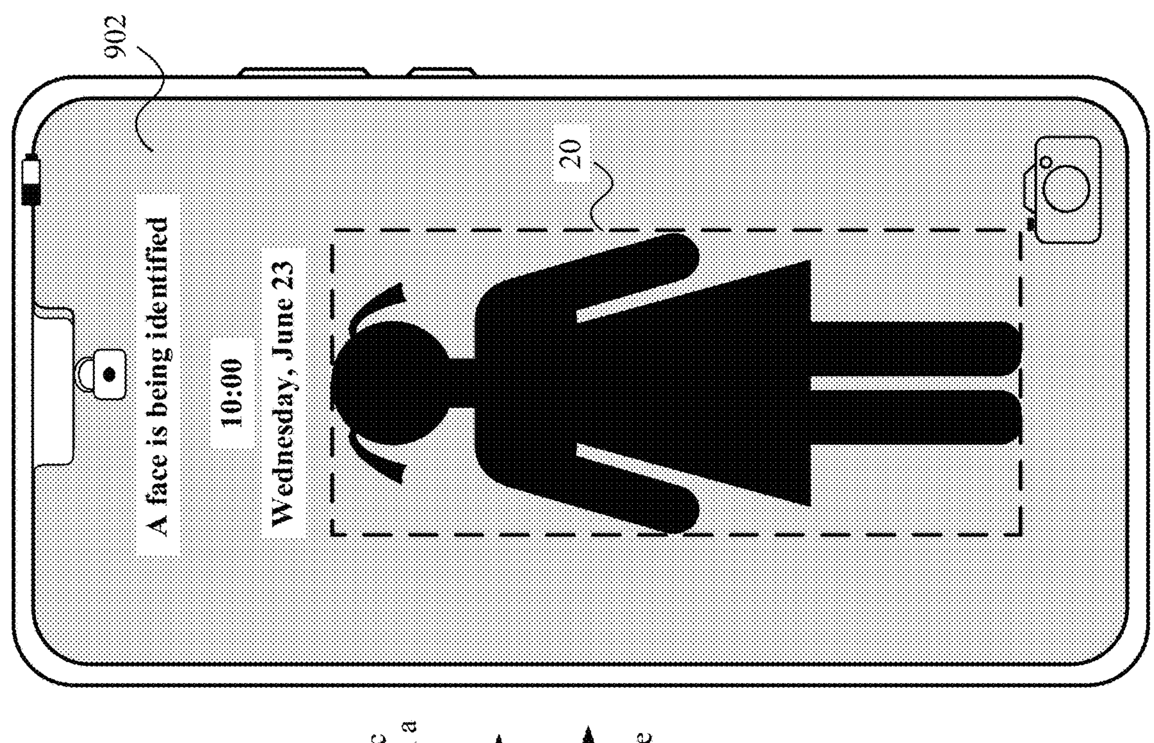
FIG. 15 is a schematic diagram of an example of displaying a target element on a lock screen interface according to an embodiment of this application.
Figure 15:
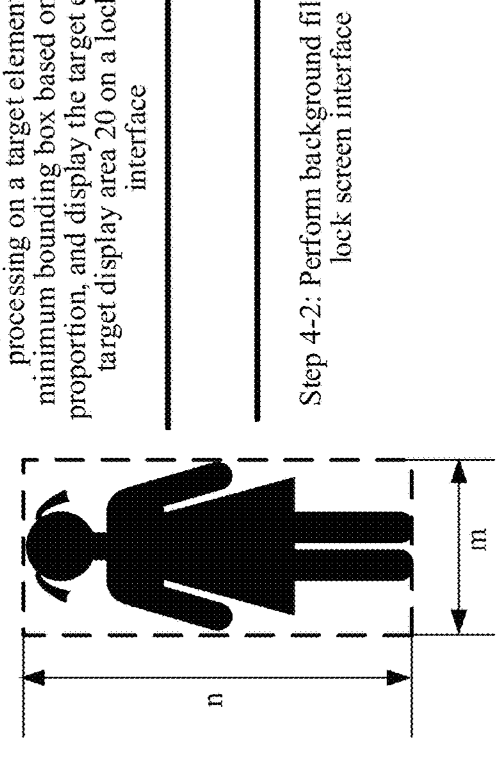

FIG. 15 is a schematic diagram of an example of displaying the target element on the lock screen interface according to an embodiment of this application.

For example, based on S1007 and the processes of step 1 and step 2 described in FIG. 11, the electronic device has obtained the target element "little girl" obtained after image cropping processing, and the electronic device may display the target element "little girl" on the lock screen interface 902 shown in FIG. 9(*b*). Specifically, as shown in FIG. 15, the process may include the following steps.

Step 4-1: Perform zoom-in or zoom-out processing on the target element with the minimum bounding box based on a specific proportion, and display the target element in a target display area 20 on the lock screen interface.

Optionally, the "target display area 20" may be a fixed area on the screen. A size of the "target display area 10" is fixed. It is assumed that the "target display area 10" has a preset width w and a preset height h. For this process, refer to related descriptions of S1008 and FIG. 14. For brevity, processes of calculating the zoom ratio and determining a display position of the target element are not described herein again.

Step 4-2: Perform background filling on the lock screen interface 902.

In a possible implementation, the electronic device may determine, based on the position information of the target element on the target picture in S1009, background content that is in the original target picture and that is adjacent to the target element, and fill the background content into the background of the target element, that is, combine the target element and the background of the target element into the wallpaper of the lock screen interface 902 shown in FIG. 9(*b*).

Optionally, the "background of the target element" may be zooming processing performed according to a zoom ratio different from that of the target element. For example, a zoom-in ratio of the target element "little girl" is greater than a zoom-in ratio of the bamboo forest, the sun, and the cloud in the original target picture. Alternatively, the "background content of the target element" and the target element may be zoomed in or out at a same zoom ratio. For example, the original target picture includes the "little girl" and a background area adjacent to the "little girl" that are zoomed in at the same time, and is used as the wallpaper of the lock screen interface 902. This is not limited in this embodiment of this application.

S1011: Determine a home screen wallpaper of the unlock interface based on specified display content of the home screen wallpaper.

Figure 16:
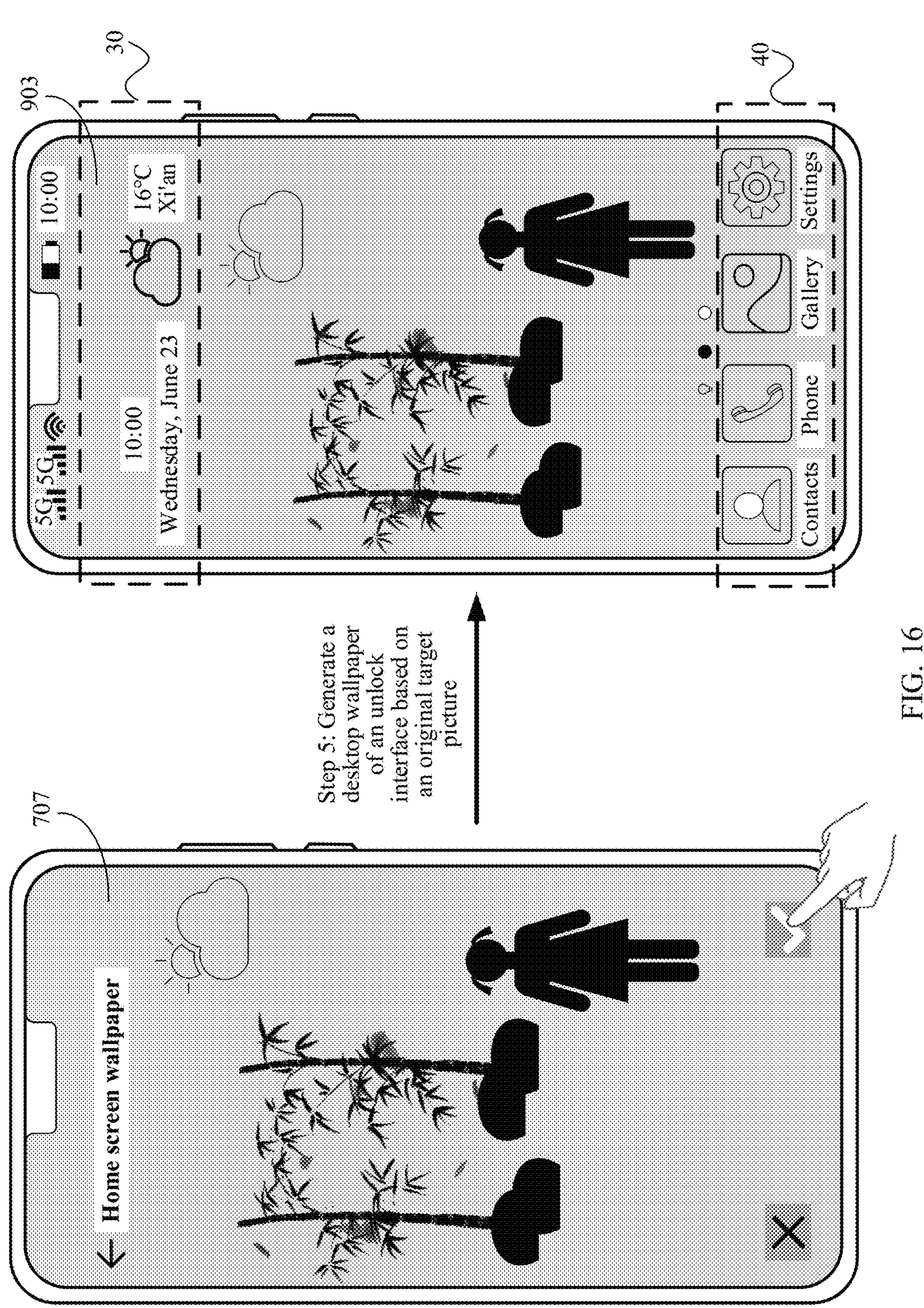
FIG. 16 is a schematic diagram of an example of generating a wallpaper of an unlock interface based on a target picture according to an embodiment of this application.

FIG. 16 is a schematic diagram of an example of generating the wallpaper of the unlock interface based on a target picture according to an embodiment of this application.

Optionally, as shown in FIG. 16, S1011 may be directly using the original target picture as the home screen wallpaper of the electronic device. That is, the process includes the following step.

Step 5: Generate the wallpaper of the unlock interface based on the original target picture. Optionally, when the unlock interface is a home screen of the electronic device, the unlock interface of the electronic device may further include a weather clock component display area 30 and an application display area 40. Details are not described herein again.

For example, in S1011, the wallpaper of the unlock interface may be displayed based on the interface 707 set by the user in FIG. 7(*g*) or the interface 804 set by the user in FIG. 8(*d*). That is, the display area of the original target picture is used as the wallpaper of the unlock interface according to a user setting, to better meet a display requirement of the user.

In the foregoing process, the electronic device may determine a display style of the always on display screen, a display style of the lock screen interface, and a display style of the unlock interface based on the target picture selected by the user and the target element included in the target picture. The following continues to describe a transition effect that may be achieved in a process of switching from the always on display screen to the lock screen interface and then to the unlock interface of the electronic device.

S1012: Determine a first transition mode from the always on display screen to the lock screen interface and a configuration parameter corresponding to the first transition mode.

Optionally, the target element "little girl" is used as a reference object, and a change effect in a process of switching the mobile phone from the always on display screen 901 to the lock screen interface 902 may include one or a combination of a plurality of effects. For specific content, refer to the foregoing descriptions. Details are not described herein again. Therefore, in a process in which the mobile phone switches from the always on display screen 901 to the lock screen interface 902, a dynamic change effect of the target element can be presented to the user. This process increases interest, and improves visual experience of the user.

S1013: Determine a second transition mode from the lock screen interface to the unlock interface and a configuration parameter corresponding to the second transition mode.

Optionally, the electronic device may receive a setting of the user, to be specific, the user manually selects the first transition mode of switching from the always on display screen 901 to the lock screen interface 902, and the user manually selects the second transition mode of switching from the lock screen interface 902 to the unlock interface 903. Each transition mode corresponds to a different animation effect.

Table 1 shows a plurality of possible transition modes. For example, in this embodiment of this application, each transition mode may be any one of the following or a combination of a plurality of transition modes. This is not limited in this embodiment of this application.

TABLE 1

| Transition Mode | Manifest | Switch | Fall | Aperture |
|---|---|---|---|---|
| Move in | Move | Wipe | Push | Mosaic |
| Turn | Fly | Fade | Dissolve | Mesh |
| Flip | Exchange | Fuzzy | Twist | Revolve |
| Roll | Zoom out | Zoom in | Straight-line path | Curve path |
| . . . | . . . | . . . | . . . | . . . |

It should be understood that, in this embodiment of this application, each transition mode may correspond to a different configuration parameter. The configuration parameter may include information such as a display area and a display element of the target picture at each moment in a process of switching of the mobile phone from the always on display screen to the lock screen interface and then to the unlock interface, and information such as a size change, a coordinate change, and a position change of each element in the target picture. This is not limited in this embodiment of this application.

Optionally, the target element “little girl” is used as a reference object, and a change effect in a process of switching the mobile phone from the lock screen interface 902 to the unlock interface 903 may include one or a combination of a plurality of the following effects. For specific content, refer to the foregoing descriptions. Details are not described herein again.

S1014: Display the always on display screen, dynamically switch, based on the configuration parameter corresponding to the first transition mode, from the always on display screen to the lock screen interface for display, and dynamically switch, based on the configuration parameter corresponding to the second transition mode, from the always on display screen the unlock interface for display.

In conclusion, according to the method in this embodiment of this application, the user may set any photo, a plurality of photos, or a video as the theme wallpaper of the mobile phone based on a preference and a requirement of the user, to separately implement, based on the photo or the video, a process of displaying the always on display screen, the wallpaper of the lock screen interface, and the wallpaper of the unlock interface, that is, generate the always on display screen, the lock screen interface, and the unlock interface of the mobile phone based on the photo or the video. In addition, different animation effects are added to a process of switching from the always on display screen to the lock screen interface and then to the unlock interface, to generate a theme wallpaper with a dynamic change effect for the user, present a smooth playback effect to the user, and provide the user with unlimited theme selections. In this way, the user not only can rely on a theme preset by a system to share the target element in the process of switching from the always on display screen to the lock screen interface and then to the unlock interface, but also can implement a dynamic linkage effect of continuous playback, thereby meeting different use requirements of the user, and improving user experience.

It may be understood that, to implement the foregoing functions, the electronic device includes corresponding hardware and/or software modules for performing the functions. In combination with example algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in embodiments, division into the modules is an example, and is merely logical function division. During actual implementation, another division manner may be used.

When each function module is obtained through division based on a corresponding function, the electronic device in the foregoing embodiments may include a display unit, a detection unit, and a processing unit. The display unit, the detection unit, and the processing unit cooperate with each other, and may be configured to support the electronic device in performing the foregoing processes and the like, and/or used in another process of the technology described in this specification.

It should be noted that all related content of the steps in the foregoing method embodiments may be cited in function description of corresponding functional modules. Details are not described herein again.

The electronic device provided in embodiments is configured to perform the foregoing theme wallpaper generation method, and therefore can achieve a same effect as the foregoing implementation method.

When an integrated unit is used, the electronic device may include a processing module, a storage module, and a communication module. The processing module may be configured to control and manage an action of the electronic device, for example, may be configured to support the electronic device in performing the steps performed by the display unit, the detection unit, and the processing unit. The storage module may be configured to support the electronic device in storing program code, data, and the like. The communication module may be configured to support communication between the electronic device and another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 5.

An embodiment further provides a computer-readable storage medium. The computer-readable storage medium stores computer instructions. When the computer instructions are run on an electronic device, the electronic device is enabled to perform the foregoing related method steps to implement the theme wallpaper generation method in the foregoing embodiments.

An embodiment further provides a computer program product. When the computer program product runs on a computer, the computer is enabled to perform the foregoing related steps, to implement the theme wallpaper generation method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the theme wallpaper generation method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to an electronic device, wherein the method comprises:

determining a first display area of a target picture for generating a theme wallpaper of the electronic device, and determining an unlock interface of the electronic device based on the first display area;

detecting a target element in content of the first display area;

zooming out or zooming in, based on a first coefficient of proportionality, on the target element to determine display content of an always on display screen of the electronic device, and determining the always on display screen to include the display content;

determining a second display area based on a position of the target element in the target picture, and determining a lock screen interface based on the second display area, wherein a wallpaper of the lock screen interface comprises the target element and the target element is zoomed out or zoomed in based on a second coefficient of proportionality;

displaying the always on display screen based on the display content of the always on display screen;

receiving an unlock operation of a user, and in response to the unlock operation, performing, based on a configuration parameter corresponding to a first transition mode, switching from the always on display screen to the lock screen interface for display; and performing, based on a configuration parameter corresponding to a second transition mode, switching from the lock screen interface to the unlock interface for display, wherein a wallpaper of the unlock interface comprises the content of the first display area.

2. The method according to claim 1, wherein the detecting a target element in content of the first display area comprises:

receiving a slide operation of the user in the first display area, and determining a third display area based on a start point and an end point of a sliding track corresponding to the slide operation; and determining an element comprised in the third display area as the target element.

3. The method according to claim 1, wherein the target element is fixed content set by the user;

the target element is content that repeatedly appears most frequently in one or more pictures stored on the electronic device;

the target element is content that is marked or added to favorites by the user most frequently in one or more pictures stored on the electronic device; or the target element is content with a highest display priority in a preset element set, wherein the preset element set comprises one or more types of elements, and each type of element corresponds to a different display priority.

4. The method according to claim 1, wherein the zooming out or zooming in, based on the first coefficient of proportionality, on the target element-to determine display content of the always on display screen of the electronic device, and determining the always on display screen comprises:

determining a height and a width of the target element;

obtaining a first preset area on the always on display screen and a height and a width of the first preset area;

determining the first coefficient of proportionality based on a ratio of the height of the target element to the height of the first preset area when the height of the target element is greater than the width of the target element; or determining the first coefficient of proportionality based on a ratio of the width of the target element to the width of the first preset area when the height of the target element is less than or equal to the width of the target element; and zooming out or zooming in, based on the first coefficient of proportionality, on the target element, and displaying the target element in the first preset area on the always on display screen.

5. The method according to claim 1, wherein the determining the second display area based on the position of the target element in the target picture, and determining the lock screen interface based on the second display area comprises:

determining the height and the width of the target element and position information of the target element in the target picture;

determining, as the second display area based on the position information of the target element in the target picture and by using the target element as a center, an area that is in the target picture and that is at a distance within a preset range from the target element;

obtaining a second preset area on the lock screen interface, and a height and a width of the second preset area;

determining the second coefficient of proportionality based on a ratio of the height of the target element to the height of the second preset area when the height of the target element is greater than the width of the target element; or determining the second coefficient of proportionality based on a ratio of the width of the target element to the width of the second preset area when the height of the target element is less than or equal to the width of the target element; and determining the lock screen interface based on content of the second display area and the target element that is zoomed out or zoomed in based on the second coefficient of proportionality.

6. The method according to claim 1, further comprising:

displaying a first interface, wherein the first interface comprises one or more pictures; and receiving a first operation of the user, and in response to the first operation, determining, from the one or more pictures, the target picture for generating the theme wallpaper of the electronic device.

7. The method according to claim 1, wherein the determining the first display area of the target picture comprises:

determining a fixed area of the target picture as the first display area; or receiving a second operation of the user, and determining the first display area of the target picture in response to the second operation.

8. The method according to claim 1, wherein the first transition mode and the second transition mode are preset manners, or are manually set by the user.

9. The method according to claim 1, wherein the configuration parameter corresponding to the first transition mode comprises one or more of the following parameters: a parameter corresponding to a display area of the target picture, and size parameters, coordinate parameters, and position parameters of the target element at different moments in a process of switching from the always on display screen to the lock screen interface; and the configuration parameter corresponding to the second transition mode comprises one or more of the following parameters: a parameter corresponding to the display area of the target picture, and size parameters, coordinate parameters, and position parameters of the target element at different moments in a process of switching from the lock screen interface to the unlock interface.

10. An electronic device, comprising:

a display;

one or more processors;

one or more memories; and a module on which a plurality of applications are installed, wherein the memory stores one or more programs; and when the one or more programs are executed by the processor, the electronic device is enabled to perform the following steps:

determining a first display area of a target picture for generating a theme wallpaper of the electronic device, and determining an unlock interface of the electronic device based on the first display area;

detecting a target element in content of the first display area;

zooming out or zooming in, based on a first coefficient of proportionality, on the target element to determine display content of an always on display screen of the electronic device, and determining the always on display screen to include the display content;

determining a second display area based on a position of the target element in the target picture, and determining a lock screen interface based on the second display area, wherein a wallpaper of the lock screen interface comprises the target element and the target element is zoomed out or zoomed in based on a second coefficient of proportionality;

displaying the always on display screen based on the display content of the always on display screen;

receiving an unlock operation of a user, and in response to the unlock operation, performing, based on a configuration parameter corresponding to a first transition mode, switching from the always on display screen to the lock screen interface for display; and performing, based on a configuration parameter corresponding to a second transition mode, switching from the lock screen interface to the unlock interface for display, wherein a wallpaper of the unlock interface comprises the content of the first display area.

11. The electronic device according to claim 10, wherein when the one or more programs are executed by the processor, the electronic device is further enabled to perform the following steps:

receiving a slide operation of the user in the first display area, and determining a third display area based on a start point and an end point of a sliding track corresponding to the slide operation; and determining an element comprised in the third display area as the target element.

12. The electronic device according to claim 10, wherein the target element is fixed content set by the user;

the target element is content that repeatedly appears most frequently in one or more pictures stored on the electronic device;

the target element is content that is marked or added to favorites by the user most frequently in one or more pictures stored on the electronic device; or the target element is content with a highest display priority in a preset element set, wherein the preset element set comprises one or more types of elements, and each type of element corresponds to a different display priority.

13. The electronic device according to claim 10, wherein when the one or more programs are executed by the processor, the electronic device is further enabled to perform the following steps:

determining a height and a width of the target element;

obtaining a first preset area on the always on display screen and a height and a width of the first preset area;

determining the first coefficient of proportionality based on a ratio of the height of the target element to the height of the first preset area when the height of the target element is greater than the width of the target element; or determining the first coefficient of proportionality based on a ratio of the width of the target element to the width of the first preset area when the height of the target element is less than or equal to the width of the target element; and zooming out or zooming in, based on the first coefficient of proportionality, on the target element, and displaying the target element in the first preset area on the always on display screen.

14. The electronic device according to claim 10, wherein when the one or more programs are executed by the processor, the electronic device is further enabled to perform the following steps:

determining the height and the width of the target element and position information of the target element in the target picture;

determining, as the second display area based on the position information of the target element in the target picture and by using the target element as a center, an area that is in the target picture and that is at a distance within a preset range from the target element;

obtaining a second preset area on the lock screen interface, and a height and a width of the second preset area;

determining the second coefficient of proportionality based on a ratio of the height of the target element to the height of the second preset area when the height of the target element is greater than the width of the target element; or determining the second coefficient of proportionality based on a ratio of the width of the target element to the width of the second preset area when the height of the target element is less than or equal to the width of the target element; and determining the lock screen interface based on content of the second display area and the target element that is zoomed out or zoomed in based on the second coefficient of proportionality.

15. The electronic device according to claim 10, wherein when the one or more programs are executed by the processor, the electronic device is further enabled to perform the following steps:

displaying a first interface, wherein the first interface comprises one or more pictures; and receiving a first operation of the user, and in response to the first operation, determining, from the one or more pictures, the target picture for generating the theme wallpaper of the electronic device.

16. The electronic device according to claim 10, wherein when the one or more programs are executed by the processor, the electronic device is further enabled to perform the following steps:

determining a fixed area of the target picture as the first display area; or receiving a second operation of the user, and determining the first display area of the target picture in response to the second operation.

17. The electronic device according to claim 10, wherein the first transition mode and the second transition mode are preset manners, or are manually set by the user.

18. The electronic device according to claim 10, wherein the configuration parameter corresponding to the first transition mode comprises one or more of the following parameters: a parameter corresponding to a display area of the target picture, and size parameters, coordinate parameters, and position parameters of the target element at different moments in a process of switching from the always on display screen to the lock screen interface; and the configuration parameter corresponding to the second transition mode comprises one or more of the following parameters: a parameter corresponding to the display area of the target picture, and size parameters, coordinate parameters, and position parameters of the target element at different moments in a process of switching from the lock screen interface to the unlock interface.

19. A non-transitory computer-readable storage medium storing computer instructions, that when executed by one or more processors of an electronic device, cause the electronic device to perform operations of:

determining a first display area of a target picture for generating a theme wallpaper of the electronic device, and determining an unlock interface of the electronic device based on the first display area;

detecting a target element in content of the first display area;

zooming out or zooming in, based on a first coefficient of proportionality, on the target element to determine display content of an always on display screen of the electronic device, and determining the always on display screen to include the display content;

determining a second display area based on a position of the target element in the target picture, and determining a lock screen interface based on the second display area, wherein a wallpaper of the lock screen interface comprises the target element and the target element is zoomed out or zoomed in based on a second coefficient of proportionality;

displaying the always on display screen based on the display content of the always on display screen;

receiving an unlock operation of a user, and in response to the unlock operation, performing, based on a configuration parameter corresponding to a first transition mode, switching from the always on display screen to the lock screen interface for display; and performing, based on a configuration parameter corresponding to a second transition mode, switching from the lock screen interface to the unlock interface for display, wherein a wallpaper of the unlock interface comprises the content of the first display area.

* * * * *